US012711907B2

(12) United States Patent
Lee et al.

(10) Patent No.: US 12,711,907 B2

(45) Date of Patent: Aug. 18, 2026

(54) PIXEL, METHOD OF DRIVING THE PIXEL, AND ELECTRONIC DEVICE INCLUDING THE PIXEL

(71) Applicant: Samsung Display Co., LTD., Yongin-si (KR)

(72) Inventors: Sun Hwa Lee, Yongin-si (KR); Kwi Hyun Kim, Yongin-si (KR); Ji Sun Kim, Yongin-si (KR); Se Hyun Lee, Yongin-si (KR); Kyung Hoon Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/020,386

(22) Filed: Jan. 14, 2025

(65) Prior Publication Data

US 2026/0004712 A1 Jan. 1, 2026

(30) Foreign Application Priority Data

Jun. 27, 2024 (KR) ........................ 10-2024-0084563

(51) Int. Cl.
*G09G 3/32* (2016.01)

(52) U.S. Cl.
CPC ....... *G09G 3/32* (2013.01); *G09G 2300/0426* (2013.01); *G09G 2310/08* (2013.01)

(58) Field of Classification Search
CPC ............. G09G 3/32; G09G 2300/0426; G09G 2310/08
See application file for complete search history.

(56) References Cited

U.S. PATENT DOCUMENTS 7,518,141 B2 * 4/2009 Nakamura ........... H10K 59/876 257/40
11,296,171 B2 * 4/2022 Mou .................... H10K 59/123
(Continued)

FOREIGN PATENT DOCUMENTS

CN 116229897 A 6/2023
CN 117693786 A 3/2024
(Continued)

OTHER PUBLICATIONS

International Search Report dated Sep. 8, 2025 for corresponding PCT Application No. PCT/KR2025/007665 (4 pages).

*Primary Examiner* — Ke Xiao
*Assistant Examiner* — Jennifer L Zubajlo
(74) *Attorney, Agent, or Firm* — Womble Bond Dickinson (US) LLP

(57) ABSTRACT

A pixel includes a (1-1)-th emission control transistor including a first semiconductor pattern and a first emission control gate electrode overlapping a (1-1)-th emission control channel area of the first semiconductor pattern, a (2-1)-th emission control transistor including a second semiconductor pattern and a second emission control gate electrode overlapping a (2-1)-th emission control channel area of the second semiconductor pattern, a first emission control signal line configured to transmit a first emission control signal and connected to the first emission control gate electrode, a second emission control signal line configured to transmit a second emission control signal and connected to the second emission control gate electrode, a first light emitting element connected to the (1-1)-th emission control transistor and configured to emit light of a first color, and a second light emitting element connected to the (2-1)-th emission control transistor and emit light of a second color.

21 Claims, 35 Drawing Sheets

PXL: SP1, SP2, SP3

(56) References Cited

U.S. PATENT DOCUMENTS

| | | | | |
|---|---|---|---|---|
| 12,300,168 | B2 * | 5/2025 | Yuan | G09G 3/3225 |
| 12,451,047 | B2 * | 10/2025 | Park | G09G 3/3266 |
| 2023/0112698 | A1 | 4/2023 | Lee et al. | |
| 2023/0410741 | A1 * | 12/2023 | Lee | G09G 3/3233 |
| 2024/0078971 | A1 | 3/2024 | Han et al. | |
| 2024/0312399 | A1 * | 9/2024 | Watsuda | G09G 3/2003 |

FOREIGN PATENT DOCUMENTS

| | | | |
|---|---|---|---|
| JP | 2007-294421 | A | 11/2007 |
| KR | 10-2022-0106914 | A | 8/2022 |
| KR | 10-2023-0044077 | A | 4/2023 |

* cited by examiner

PIXEL, METHOD OF DRIVING THE PIXEL, AND ELECTRONIC DEVICE INCLUDING THE PIXEL

CROSS-REFERENCE TO RELATED APPLICATION

The present application claims priority to and the benefit of Korean Patent Application No. 10-2024-0084563, filed on Jun. 27, 2024, in the Korean Intellectual Property Office, the entire disclosure of which is incorporated by reference herein.

BACKGROUND

1. Field

The present disclosure relates to a pixel, a method of driving the pixel, and an electronic device including the pixel.

2. Description of the Related Art

A light emitting element (for example, a micro LED) may generate light by receiving a current. In order for the light emitting element to generate light with optimal efficiency, a current density (for example, expressed in a unit such as A/cm2) of the injected current is required to be appropriately adjusted.

SUMMARY

The present disclosure provides a pixel with improved emission efficiency and a method of driving the same.

According to one or more embodiments of the present disclosure, a pixel includes a (1-1)-th emission control transistor including a first semiconductor pattern and a first emission control gate electrode overlapping a (1-1)-th emission control channel area of the first semiconductor pattern, a (2-1)-th emission control transistor including a second semiconductor pattern and a second emission control gate electrode overlapping a (2-1)-th emission control channel area of the second semiconductor pattern, a first emission control signal line configured to transmit a first emission control signal and connected to the first emission control gate electrode, a second emission control signal line configured to transmit a second emission control signal and connected to the second emission control gate electrode, a first light emitting element connected to the (1-1)-th emission control transistor and configured to emit light of a first color, and a second light emitting element connected to the (2-1)-th emission control transistor and configured to emit light of a second color.

In one or more embodiments, the pixel may further include a first anode electrode connected to a second terminal of the (1-1)-th emission control transistor, a second anode electrode connected to a second terminal of the (2-1)-th emission control transistor and spaced from the first anode electrode, and a cathode electrode spaced from the first and second anode electrodes.

In one or more embodiments, the first light emitting element may be connected between the first anode electrode and the cathode electrode, and the second light emitting element may be connected between the second anode electrode and the cathode electrode.

In one or more embodiments, the first light emitting element may include a (1-1)-th semiconductor layer having a first polarity, a (1-2)-th semiconductor layer having a second polarity, and a first active layer interposed between the (1-1)-th semiconductor layer and the (1-2)-th semiconductor layer, and the second light emitting element may include a (2-1)-th semiconductor layer having the first polarity, a (2-2)-th semiconductor layer having the second polarity, and a second active layer interposed between the (2-1)-th semiconductor layer and the (2-2)-th semiconductor layer.

In one or more embodiments, a material configuring the first active layer may be different from a material configuring the second active layer.

In one or more embodiments, the pixel may further include a (1-2)-th emission control transistor including the first semiconductor pattern and the first emission control gate electrode overlapping a (1-2)-th emission control channel area of the first semiconductor pattern, and a (2-2)-th emission control transistor including the second semiconductor pattern and the second emission control gate electrode overlapping a (2-2)-th emission control channel area of the second semiconductor pattern.

In one or more embodiments, the pixel may further include a first driving transistor connected between a first terminal of the (1-1)-th emission control transistor and a second terminal of the (1-2)-th emission control transistor, and including a first driving gate electrode overlapping the first semiconductor pattern and a first driving channel area of the first semiconductor pattern, and a second driving transistor connected between a first terminal of the (2-1)-th emission control transistor and a second terminal of the (2-2)-th emission control transistor, and including a second driving gate electrode overlapping the second semiconductor pattern and a second driving channel area of the second semiconductor pattern.

In one or more embodiments, a channel length of the first driving channel area may be less than a channel length of the second driving channel area, and a channel width of the first driving channel area may be greater than a channel width of the second driving channel area.

In one or more embodiments, the pixel may further include a first data line configured to transmit a first data signal, a second data line configured to transmit a second data signal, a first data write transistor connected between a first terminal of the first driving transistor and the first data line, and including a first data write gate electrode overlapping the first semiconductor pattern and a first data write channel area of the first semiconductor pattern, and a second data write transistor connected between a first terminal of the second driving transistor and the second data line, and including a second data write gate electrode overlapping the second semiconductor pattern and a second data write channel area of the second semiconductor pattern.

In one or more embodiments, a channel width of the (1-1)-th emission control channel area of the first semiconductor pattern may be greater than a channel width of the (2-1)-th emission control channel area of the second semiconductor pattern.

In one or more embodiments, a resistance of conductive areas adjacent to the (1-1)-th emission control channel area of the first semiconductor pattern may be less than a resistance of conductive areas adjacent to the (2-1)-th emission control channel area of the second semiconductor pattern.

In one or more embodiments, a channel width of the (1-2)-th emission control channel area of the first semiconductor pattern may be greater than a channel width of the (2-2)-th emission control channel area of the second semiconductor pattern.

In one or more embodiments, a resistance of conductive areas adjacent to the (1-2)-th emission control channel area of the first semiconductor pattern may be less than a resistance of conductive areas adjacent to the (2-2)-th emission control channel area of the second semiconductor pattern.

In one or more embodiments, the first emission control signal line and the second emission control signal line may be disposed at a same layer.

In one or more embodiments, each of the first and second emission control signal lines may overlap the first and second semiconductor patterns.

In one or more embodiments, the pixel may further include a (3-1)-th emission control transistor including a third semiconductor pattern and a third emission control gate electrode overlapping a (3-1)-th emission control channel area of the third semiconductor pattern, and a third light emitting element connected to the (3-1)-th emission control transistor and configured to emit light of a third color. The third emission control gate electrode may be connected to the second emission control signal line.

In one or more embodiments, the third emission control gate electrode may be formed integrally with the second emission control gate electrode.

In one or more embodiments, the second semiconductor pattern and the third semiconductor pattern may have planar shapes that are symmetrical to each other.

In one or more embodiments, the light of the first color may be light of a red color having a peak wavelength at 610 nm or longer and 650 nm or shorter, the light of the second color may be light of a green color having a peak wavelength at 500 nm or longer and 540 nm or shorter, and the light of the third color may be light of a blue color having a peak wavelength at 440 nm or longer and 480 nm or shorter.

According to one or more embodiments, a method of driving a pixel, which includes a (1-1)-th emission control transistor including a first semiconductor pattern and a first emission control gate electrode overlapping a (1-1)-th emission control channel area of the first semiconductor pattern, a (2-1)-th emission control transistor including a second semiconductor pattern and a second emission control gate electrode overlapping a (2-1)-th emission control channel area of the second semiconductor pattern, a first emission control signal line configured to transmit a first emission control signal and connected to the first emission control gate electrode, a second emission control signal line configured to transmit a second emission control signal and connected to the second emission control gate electrode, a first light emitting element connected to the (1-1)-th emission control transistor and configured to emit light of a first color, and a second light emitting element connected to the (2-1)-th emission control transistor and configured to emit light of a second color, is provided. The method includes outputting the second emission control signal of a turn-on level to the second emission control signal line in a first period, and outputting the first emission control signal of a turn-on level to the first emission control signal line in a second period. The second period is in the first period. The second period is shorter than the first period.

According to one or more embodiments, an electronic device including a display panel, the display panel including a plurality of pixels, a pixel from among the plurality of pixels including: a (1-1)-th emission control transistor comprising a first semiconductor pattern and a first emission control gate electrode overlapping a (1-1)-th emission control channel area of the first semiconductor pattern; a (2-1)-th emission control transistor comprising a second semiconductor pattern and a second emission control gate electrode overlapping a (2-1)-th emission control channel area of the second semiconductor pattern; a first emission control signal line configured to transmit a first emission control signal and connected to the first emission control gate electrode; a second emission control signal line configured to transmit a second emission control signal and connected to the second emission control gate electrode; a first light emitting element connected to the (1-1)-th emission control transistor and configured to emit light of a first color; and a second light emitting element connected to the (2-1)-th emission control transistor and configured to emit light of a second color, wherein each of the first and second emission control signal lines overlaps the first and second semiconductor patterns.

According to one or more embodiments, the electronic device comprises a smart watch, a mobile phone, a smart phone, a portable computer, a tablet personal computer (PC), a watch phone, an automotive display, smart glasses, a portable multimedia player (PMP), a navigation device, and an ultra-mobile personal computer (UMPC), a head mounted display (HMD) device, a virtual reality (VR) device, a mixed reality (MR) device, or an augmented reality (AR) device.

According to one or more embodiments of the present disclosure, the first light emitting element of a first sub-pixel may emit light based on the first emission control signal configured to transmit through the first emission control signal line, and the second light emitting element of a second sub-pixel may emit light based on the second emission control signal configured to transmit through the second emission control signal line separated from the first emission control signal line.

Accordingly, the first emission control signal suitable for an optimal driving characteristic of the first light emitting element may be set, and the second emission control signal suitable for an optimal driving characteristic of the second light emitting element may be set separately from the first emission control signal.

Therefore, emission efficiency of the pixel may be improved.

BRIEF DESCRIPTION OF THE DRAWINGS

The above and other features of the present disclosure will become more apparent by describing in further detail embodiments thereof with reference to the accompanying drawings, in which.

DETAILED DESCRIPTION

Figure 1:
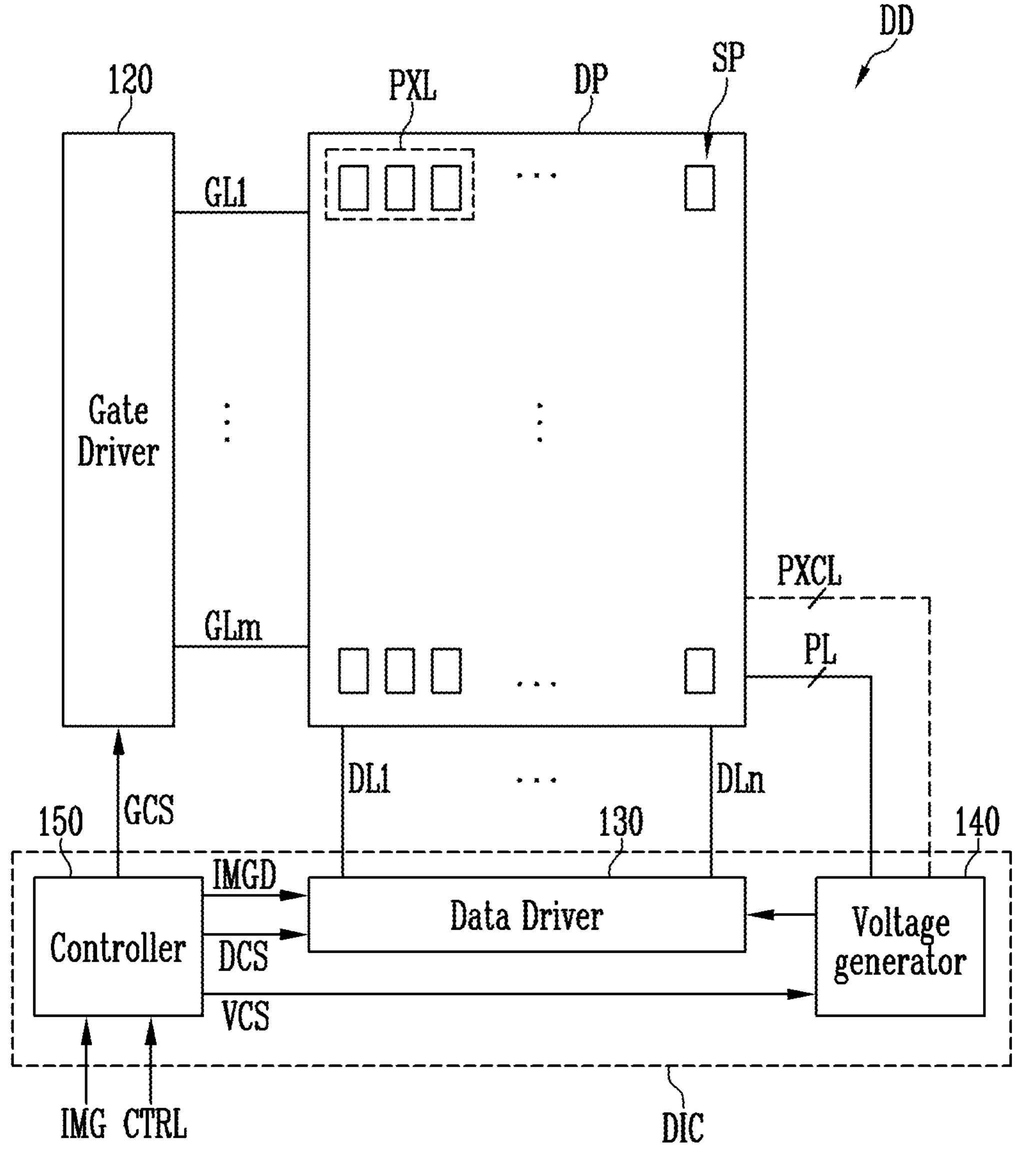
FIG. 1 is a block diagram illustrating a display device according to one or more embodiments of the present disclosure.

Hereinafter, embodiments according to the present disclosure is described in detail with reference to the accompanying drawings. It should be noted that in the following description, only portions necessary for understanding an operation according to the present disclosure are described, and descriptions of other portions are omitted in order not to obscure the subject matter of the present disclosure. In addition, the present disclosure may be embodied in other forms without being limited to embodiments described herein. However, embodiments described herein are provided to describe in detail enough to implement (e.g., easily implement) the technical spirit and scope of the present disclosure to those skilled in the art to which the present disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the present disclosure. Throughout the specification, in a case where a certain portion "includes", the case means that the portion may further include another component without excluding another component unless otherwise stated. "At least one of X, Y, or Z" and "at least one selected from an array consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and/or the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in one or more embodiments, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

FIG. 1 is a block diagram illustrating a display device according to one or more embodiments of the present disclosure.

Referring to FIG. 1, the display device DD may include a display panel DP, a gate driver 120, a data driver 130, a voltage generator 140, and a controller 150.

The display panel DP may include sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

The sub-pixels SP may generate of light of two or more colors. For example, each of the sub-pixels SP may generate light such as red, green, blue, cyan, magenta, or yellow.

Two or more sub-pixels from among the sub-pixels SP may configure one pixel PXL. For example, the pixel PXL may include three sub-pixels as shown in FIG. 1. The pixel PXL may emit light of various colors and various luminances according to a combination of light emitted from the sub-pixels included in the pixel PXL.

The gate driver 120 may be connected to the sub-pixels SP arranged in a row direction through the first to m-th gate lines GL1 to GLm. The gate driver 120 may output gate signals to the first to m-th gate lines GL1 to GLm in response to a gate control signal GCS. In one or more embodiments, the gate control signal GCS may include a start signal indicating a start of each frame, a horizontal synchronization signal, and/or the like.

The gate driver 120 may be disposed on one side of the display panel DP. However, the present disclosure is not limited thereto. For example, the gate driver 120 may be divided into two or more physically and/or logically divided drivers, and such drivers may be disposed on one side of the display panel DP and another side of the display panel DP opposite the one side. As described above, the gate driver 120 may be disposed around the display panel DP in various shapes according to one or more embodiments.

The data driver 130 may be connected to the sub-pixels SP arranged in a column direction through the first to n-th data lines DL1 to DLn. The data driver 130 may receive image data IMGD and a data control signal DCS from the controller 150. The data driver 130 may operate in response to the data control signal DCS. In one or more embodiments, the data control signal DCS may include a source start signal, a source shift clock, a source output enable signal, and/or the like.

The data driver 130 may receive voltages from the voltage generator 140. The data driver 130 may apply data signals having grayscale voltages corresponding to the image data IMGD to the first to n-th data lines DL1 to DLn using the received voltages. When the gate signal is applied to each of the first to m-th gate lines GL1 to GLm, the data signals corresponding to the image data IMGD may be applied to the data lines DL1 to DLn. Accordingly, the sub-pixels SP may generate light corresponding to the data signals, and the display panel DP may display an image.

In one or more embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 may be configured to generate a plurality of voltages and provide the generated voltages to components of the display device DD, such as the gate driver 120, the data driver 130, and the controller 150. The voltage generator 140 may generate the plurality of voltages by receiving an input voltage from an outside of the display device DD and regulating the received voltage.

The voltage generator 140 may generate a first power voltage and a second power voltage. The generated first and second power voltages may be provided to the sub-pixels SP through power lines PL. In one or more embodiments, at least one of the first and second power voltages may be provided from the outside of the display device DD.

In addition, the voltage generator 140 may provide various voltages and/or signals. For example, the voltage generator 140 may provide one or more initialization voltages applied to the sub-pixels SP. For example, during a sensing operation for sensing electrical characteristics of transistors and/or light emitting elements of the sub-pixels SP, a reference voltage (e.g., a predetermined reference voltage) may be applied to the first to n-th data lines DL1 to DLn, and the voltage generator 140 may generate the reference voltage and transmit the reference voltage to the data driver 130. For example, during a display operation for displaying an image on the display panel DP, common pixel control signals may be applied to the sub-pixels SP, and the voltage generator 140 may generate the pixel control signals. In one or more embodiments, the voltage generator 140 may provide the pixel control signals to the sub-pixels SP through pixel control lines PXCL. In FIG. 1, the pixel control lines PXCL are connected between the voltage generator 140 and the display panel DP, but the present disclosure is not limited thereto. For example, the pixel control lines PXCL may be connected between the gate driver 120 and the display panel DP. In this case, the pixel control signals may be transmitted from the voltage generator 140 to the pixel control lines PXCL through the gate driver 120.

The controller 150 may control overall operations of the display device DD. The controller 150 may receive input image data IMG and a control signal CTRL corresponding thereto from the outside. The controller 150 may provide the gate control signal GCS, the data control signal DCS, and the voltage control signal VCS in response to the control signal CTRL.

The controller 150 may convert the input image data IMG so that the input image data IMG is suitable for the display device DD or the display panel DP and output the image data IMGD. In one or more embodiments, the controller 150 may output the image data IMGD by aligning the input image data IMG so that the input image data IMG is suitable for the sub-pixels SP of a row unit.

Two or more components of the data driver 130, the voltage generator 140, and the controller 150 may be mounted on one integrated circuit. As shown in FIG. 1, the data driver 130, the voltage generator 140, and the controller 150 may be included in a driver integrated circuit DIC. In this case, the data driver 130, the voltage generator 140, and the controller 150 may be functionally divided components in one driver integrated circuit DIC. In one or more other embodiments, at least one of the data driver 130, the voltage generator 140, or the controller 150 may be provided as a component distinguished from the driver integrated circuit DIC.

Figure 2:
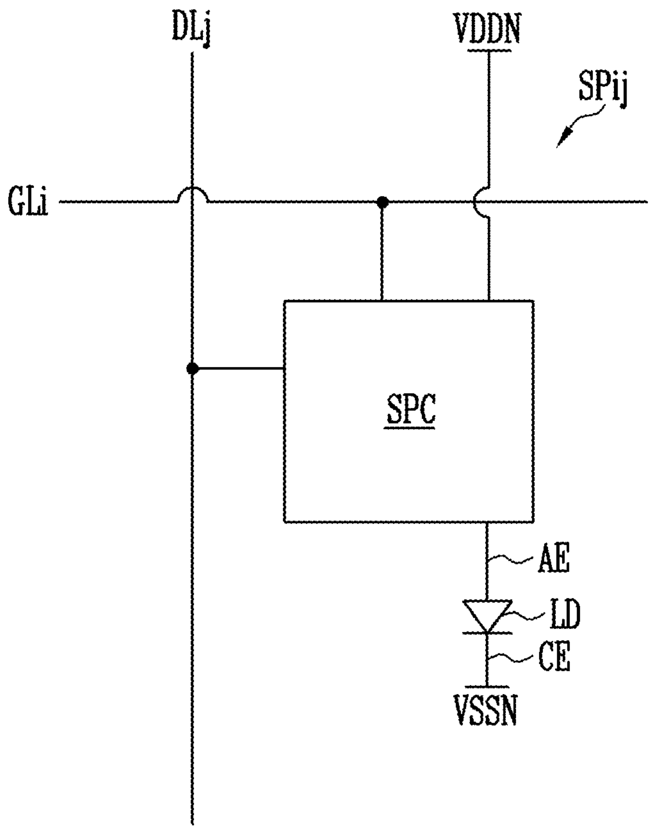
FIG. 2 is a block diagram illustrating one sub-pixel from among sub-pixels included in the display device of FIG. 1.

FIG. 2 is a block diagram illustrating one sub-pixel from among the sub-pixels included in the display device of FIG. 1. In FIG. 2, from among the sub-pixels SP of FIG. 1, a sub-pixel SPij arranged in an i-th row (i is an integer greater than or equal to 1 and less than or equal to m) and a j-th column (j is an integer greater than or equal to 1 and less than or equal to n) is shown as an example.

Referring to FIG. 2, the sub-pixel SPij may include a sub-pixel circuit SPC and a light emitting element LD.

The light emitting element LD may be connected between a first power voltage node VDDN and a second power voltage node VSSN. The first power voltage node VDDN may be connected to one of the power lines PL of FIG. 1 and receives the first power voltage. The second power voltage node VSSN may be connected to another one of the power lines PL of FIG. 1 and receives the second power voltage. The first power voltage may have a voltage level higher than that of the second power voltage.

The light emitting element LD may be connected between an anode electrode AE and a cathode electrode CE. The anode electrode AE may be connected to the first power voltage node VDDN through the sub-pixel circuit SPC. For example, the anode electrode AE may be connected to the first power voltage node VDDN through one or more transistors included in the sub-pixel circuit SPC. The cathode electrode CE may be connected to the second power voltage node VSSN. The light emitting element LD may be configured to emit light according to a current flowing from the anode electrode AE to the cathode electrode CE.

The sub-pixel circuit SPC may be connected to an i-th gate line GLi from among the first to m-th gate lines GL1 to GLm of FIG. 1, and a j-th data line DLj among the first to n-th data lines DL1 to DLn of FIG. 1. In response to a gate signal received through the i-th gate line GLi, the sub-pixel circuit SPC may control the light emitting element LD to emit light according to a data signal received through the j-th data line DLj. In one or more embodiments, the sub-pixel circuit SPC may be further connected to the pixel control lines PXCL of FIG. 1. In this case, the sub-pixel circuit SPC may control the light emitting element LD in further response to the pixel control signals received through the pixel control lines PXCL.

For such operations, the sub-pixel circuit SPC may include circuit elements, for example, transistors and one or more capacitors.

The transistors of the sub-pixel circuit SPC may include P-type transistors and/or N-type transistors. In one or more embodiments, the transistors of the sub-pixel circuit SPC may include a metal oxide silicon field effect transistor (MOSFET). In one or more embodiments, the transistors of the sub-pixel circuit SPC may include an amorphous silicon semiconductor, a monocrystalline silicon semiconductor, a polycrystalline silicon semiconductor, an oxide semiconductor, and/or the like.

Figure 3:
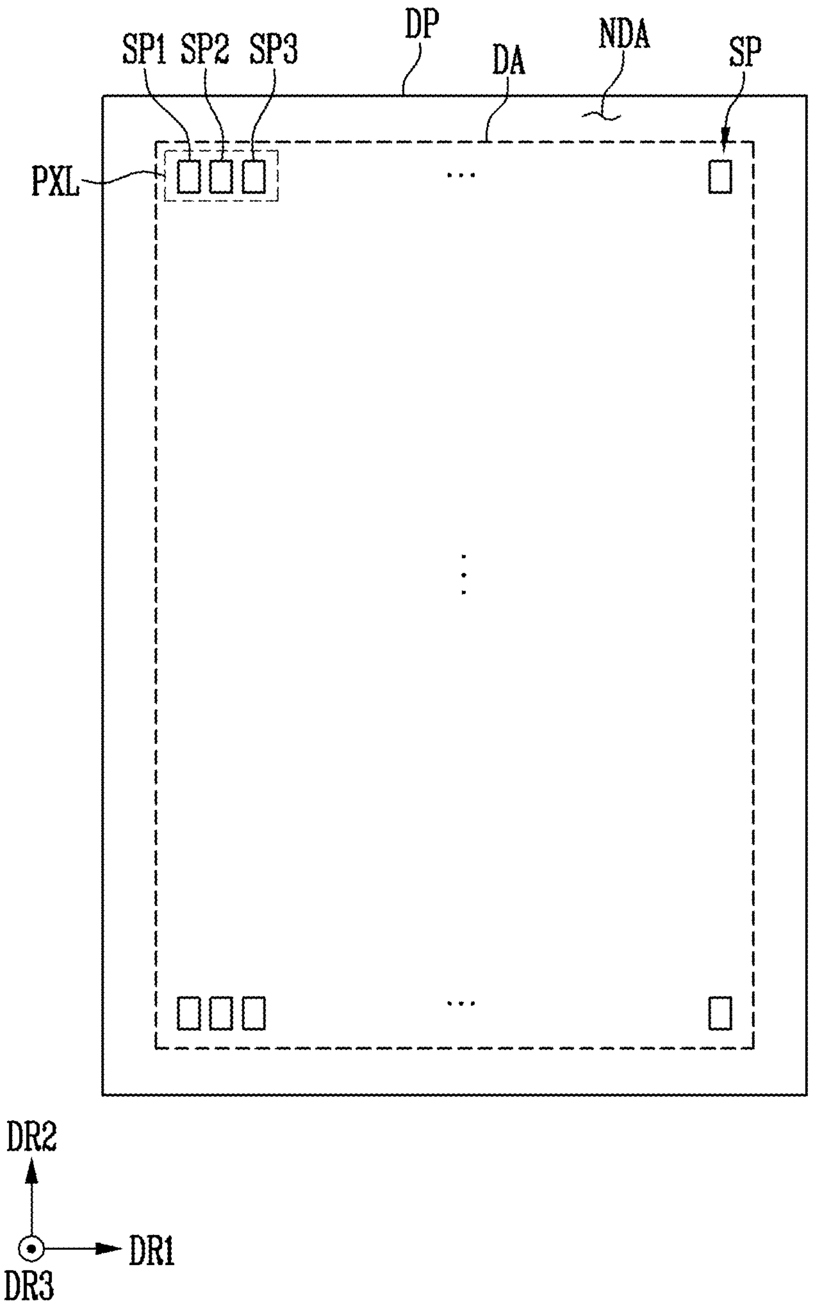
FIG. 3 is a plan view illustrating a display panel configuring the display device of FIG. 1.

FIG. 3 is a plan view illustrating the display panel configuring the display device of FIG. 1.

Referring to FIG. 3, the display panel DP may include a display area DA and a non-display area NDA disposed along an edge or a periphery of the display area DA. The display panel DP may display an image through the display area DA. The non-display area NDA may be disposed around the display area DA.

The display panel DP may include the sub-pixels SP in the display area DA. The sub-pixels SP may be arranged along a first direction DR1 and a second direction DR2 crossing the first direction DR1. For example, the sub-pixels SP may be arranged in a matrix form along the first direction DR1 and the second direction DR2. For example, the sub-pixels SP may be arranged along rows and columns of a matrix form along the first direction DR1 and the second direction DR2. As another example, the sub-pixels SP may be arranged in a zigzag form along the first direction DR1 and the second direction DR2. An arrangement of the sub-pixels SP may vary according to one or more embodiments. The first direction DR1 may be a column direction, and the second direction DR2 may be a row direction.

Two or more sub-pixels from among the sub-pixels SP may configure one pixel PXL. In FIG. 3, the pixel PXL includes three sub-pixels SP1, SP2, and SP3, but the present disclosure is not limited thereto. For example, the pixel PXL may include two sub-pixels. Hereinafter, for clear and concise description, it is assumed that the pixel PXL includes the first to third sub-pixels SP1, SP2, and SP3.

Each of the first to third sub-pixels SP1, SP2, and SP3 may generate light of one of various colors such as red, green, blue, cyan, magenta, and/or yellow. Hereinafter, for clear and concise description, it is assumed that the first sub-pixel SP1 is configured to generate light of a red color, the second sub-pixel SP2 is configured to generate light of a green color, and the third sub-pixel SP3 is configured to generate light of a blue color. Here, the light of the red color may be light having a peak wavelength at about 610 nm or longer and about 650 nm or shorter, the light of the green color may be light having a peak wavelength at about 500 nm or longer and about 540 nm or shorter, and the light of the blue color may be light having a peak wavelength at about 440 nm or longer and about 480 nm or shorter. Hereinafter, the red color may be referred to as a first color, the green color may be referred to as a second color, and the blue color may be referred to as a third color.

Each of the first to third sub-pixels SP1, SP2, and SP3 may include at least one light emitting element configured to generate light. In one or more embodiments, the light emitting elements of the first to third sub-pixels SP1, SP2, and SP3 may generate light of different colors. For example, the light emitting elements of the first to third sub-pixels SP1, SP2, and SP3 may generate red, green, and blue light, respectively.

As the display panel DP, a display panel capable of self-emission, such as a light emitting diode display panel (LED display panel) using a micro scale or nano scale of emitting diode as the light emitting element, an organic light emitting display panel (OLED panel) using an organic light emitting diode (OLED) as the light emitting element, and/or the like, may be used.

Component for controlling the sub-pixels SP may be disposed in the non-display area NDA. Lines connected to the sub-pixels SP, for example, the first to m-th gate lines GL1 to GLm of FIG. 1, the first to n-th data lines DL1 to DLn, the power lines PL, and the pixel control lines PXCL may be disposed in the non-display area NDA.

At least one of the gate driver 120, the data driver 130, the voltage generator 140, and the controller 150 of FIG. 1 may be disposed in the non-display area NDA of the display panel DP. In one or more embodiments, the gate driver 120 may be disposed in the non-display area NDA. In this case, the data driver 130, the voltage generator 140, and the controller 150 may be implemented with a driver integrated circuit DIC of FIG. 1, separate from the display panel DP, and the driver integrated circuit DIC may be connected to the lines disposed in the non-display area NDA. In other embodiments, the gate driver 120 may be implemented with one integrated circuit separate from the display panel DP, together with the data driver 130, the voltage generator 140, and the controller 150.

In one or more embodiments, the display area DA may have various shapes. The display area DA may have a closed loop shape including sides of a straight line and/or a curved line. For example, the display area DA may have shapes of a polygon, a circle, a semicircle, an ellipse, and/or the like.

In one or more embodiments, the display panel DP may have a flat display surface. In other embodiments, the display panel DP may have a display surface that is at least partially round.

In one or more embodiments, the display panel DP may be bendable, foldable, and/or rollable. In such cases, the display panel DP and/or a substrate of the display panel DP may include materials having a flexible property.

Figure 4:
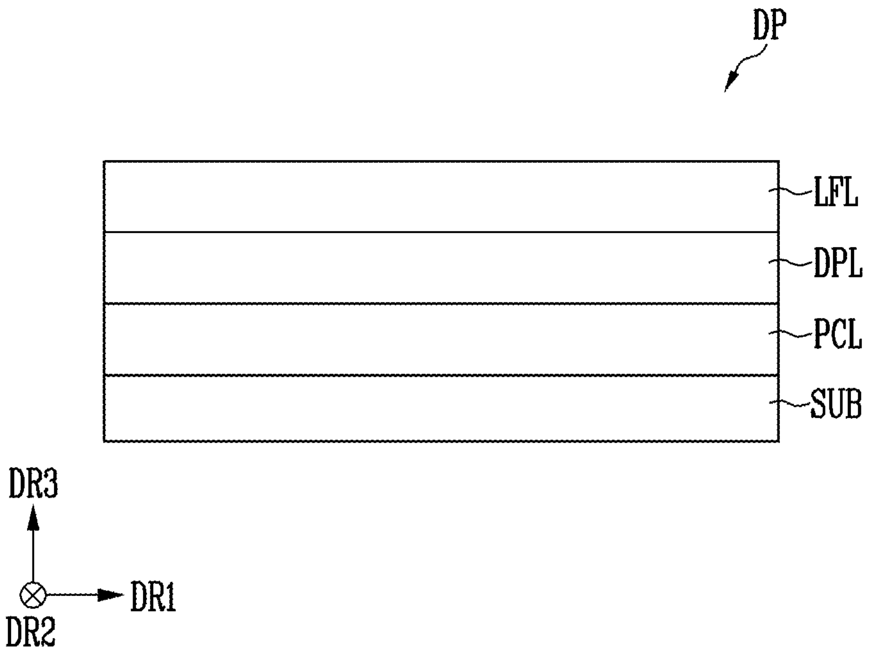
FIG. 4 is a cross-sectional view illustrating an embodiment of the display panel of FIG. 3.

FIG. 4 is a cross-sectional view illustrating an embodiment of the display panel of FIG. 3.

Referring to FIG. 4, the display panel DP may include a substrate SUB, and a pixel circuit layer PCL, a display element layer DPL, and a light functional layer LFL sequentially stacked on the substrate SUB in a third direction DR3 crossing the first and second directions DR1 and DR2.

The substrate SUB may be formed of an insulating material such as glass and/or resin. For example, the substrate SUB may include a glass substrate. As another example, the substrate SUB may include a polyimide (PI) substrate. As still another example, the substrate SUB may include a silicon wafer substrate formed using a semiconductor process.

In one or more embodiments, the substrate SUB may be formed of a flexible material that may be bent and/or folded, and may have a single-layer structure or a multi-layer structure. For example, as the flexible material, polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and/or cellulose acetate propionate may be used. However, the present disclosure is not limited thereto.

The pixel circuit layer PCL may be disposed on the substrate SUB. The pixel circuit layer PCL may include insulating layers and semiconductor patterns and conductive patterns disposed between the insulating layers. The conductive patterns of the pixel circuit layer PCL may function as circuit elements, lines, and/or the like.

The circuit elements of the pixel circuit layer PCL may include the sub-pixel circuit SPC (refer to FIG. 2) of each of the sub-pixels SP of FIG. 3. In other words, the circuit elements of the pixel circuit layer PCL may be provided as transistors and one or more capacitors of the sub-pixel circuit SPC.

The lines of the pixel circuit layer PCL may include lines connected to the sub-pixels SP. The lines of the pixel circuit layer PCL may include various signal lines and/or voltage lines necessary to drive the display element layer DPL.

The display element layer DPL may be disposed on the pixel circuit layer PCL. The display element layer DPL may include light emitting elements of the sub-pixels SP.

The light functional layer LFL may be disposed on the display element layer DPL. The light functional layer LFL may include light scattering patterns having scattering particles and/or a color filter layer including color filters. A color filter may selectively transmit light of a specific wavelength (or a specific color). In one or more embodiments, the light functional layer LFL may be omitted.

A window for protecting an exposed surface (or an upper surface) of the display panel DP may be provided on the light functional layer LFL. The window may protect the display panel DP from external shock. The window may be coupled to the light functional layer LFL through an optically transparent adhesive (or cohesive) member. The window may have a multiple layer structure including a glass substrate, a plastic film, and/or a plastic substrate. The multi-layer structure may be formed through a continuous process or an adhesion process using an adhesive layer. All or a portion of the window may be flexible.

Figure 5:
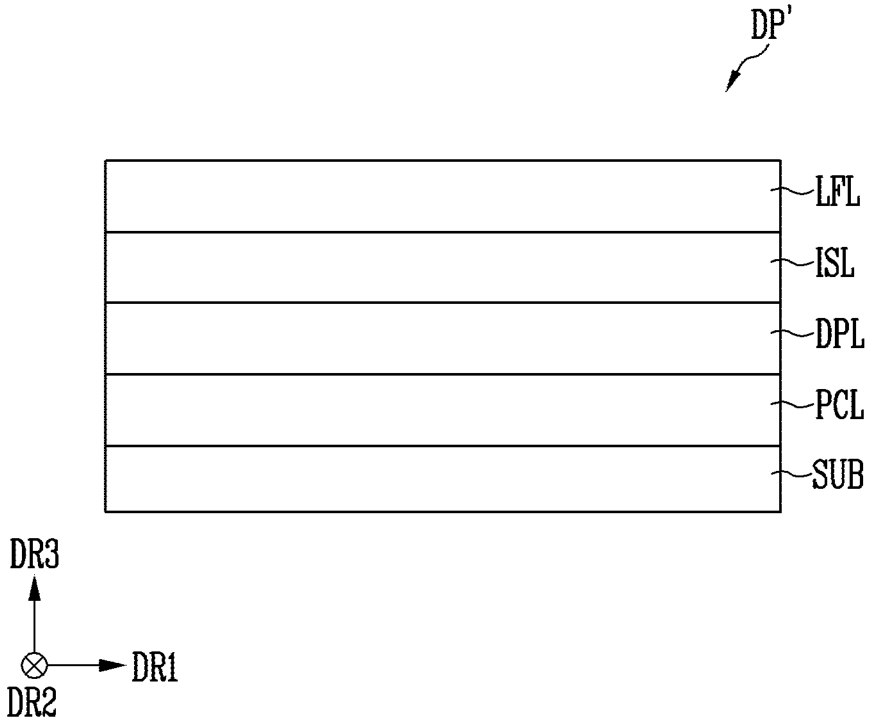
FIG. 5 is a cross-sectional view illustrating another embodiment of the display panel of FIG. 3.

FIG. 5 is a cross-sectional view illustrating another embodiment of the display panel of FIG. 3.

Referring to FIG. 5, the display panel DP' may include the substrate SUB, the pixel circuit layer PCL, the display element layer DPL, an input sensing layer ISL, and the light functional layer LFL. The substrate SUB, the pixel circuit layer PCL, the display element layer DPL, and the light functional layer LFL may be described substantially identically to those described with reference to FIG. 4. Therefore, an overlapping description is omitted.

The input sensing layer ISL may sense a user's input on an upper surface (or a display surface) of the display panel DP'. The input sensing layer ISL may include components suitable for sensing an external object such as a user's hand, and/or a pen. For example, the input sensing layer ISL may include touch electrodes.

Figure 6:
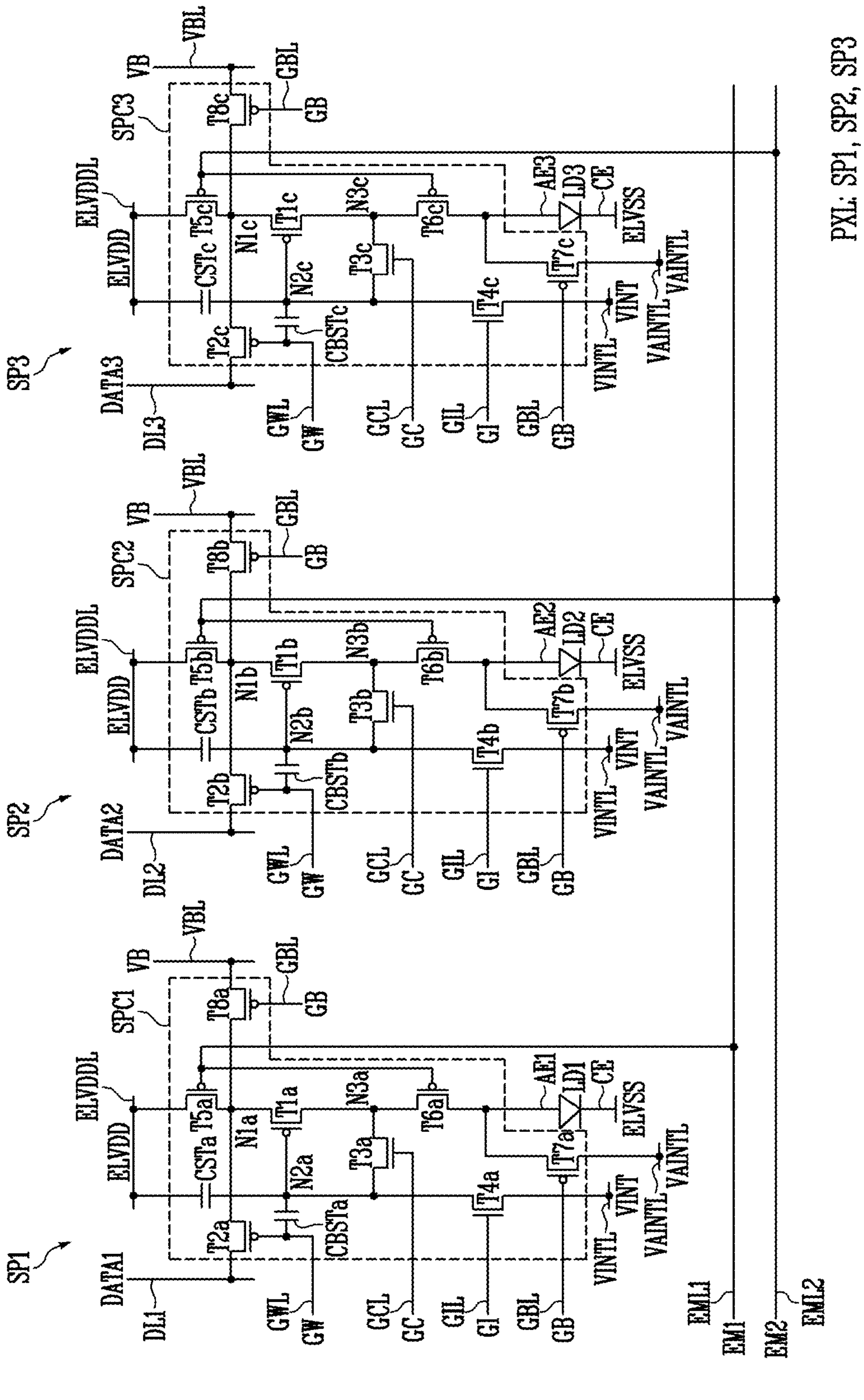
FIG. 6 is a circuit diagram illustrating an embodiment of one pixel from among pixels included in the display panel of FIG. 3.

FIG. 6 is a circuit diagram illustrating an embodiment of one pixel from among the pixels included in the display panel of FIG. 3.

Referring to FIG. 6, the pixel PXL may include the first to third sub-pixels SP1, SP2, and SP3. The first sub-pixel SP1 may include a first sub-pixel circuit SPC1 and a first light emitting element LD1 connected to the first sub-pixel circuit SPC1. The second sub-pixel SP2 may include a second sub-pixel circuit SPC2 and a second light emitting element LD2 connected to the second sub-pixel circuit SPC2. The third sub-pixel SP3 may include a third sub-pixel circuit SPC3 and a third light emitting element LD3 connected to the third sub-pixel circuit SPC3.

The pixel PXL may include signal lines connected to the first to third sub-pixel circuits SPC1, SPC2, and SPC3. The signal lines may include first to third data lines DL1, DL2, and DL3, first to fourth gate lines GWL, GCL, GIL, and GBL, first and second emission control signal lines EML1 and EML2, a bias control line VBL, an initialization line VINTL, an anode initialization line VAINTL, and a first power line ELVDDL. Here, the first power line ELVDDL may be connected to the first power voltage node VDDN (refer to FIG. 2) or the power line PL (refer to FIG. 1) connected thereto, to receive a first power voltage ELVDD.

Hereinafter, the first sub-pixel SP1 including the first sub-pixel circuit SPC1 and the first light emitting element LD1 connected thereto is described.

The first sub-pixel circuit SPC1 may include first to eighth transistors T1*a*, T2*a*, T3*a*, T4*a*, T5*a*, T6*a*, T7*a*, and T8*a*, a first storage capacitor CSTa, and a first boosting capacitor CBSTa.

The first transistor T1*a* may be a driving transistor, and the second to eighth transistors T2*a*, T3*a*, T4*a*, T5*a*, T6*a*, T7*a*, and T8*a* may be switching transistors. According to a type (P type or N type) of a transistor and/or an operation condition, a first terminal of each of the first to eighth transistors T1*a*, T2*a*, T3*a*, T4*a*, T5*a*, T6*a*, T7*a*, and T8*a* may be a source terminal or a drain terminal, and the second terminal may be a terminal different from the first terminal. For example, when the first terminal is the source terminal, the second terminal may be the drain terminal. Hereinafter, the source terminal and the drain terminal may be referred to interchangeably with a source electrode and a drain electrode.

In one or more embodiments, the third and fourth transistors T3*a* and T4*a* may be N type transistors, and the first, second, and fifth to eighth transistors T1*a*, T2*a*, T5*a*, T6*a*, T7*a*, and T8*a* may be P type transistors. However, the present disclosure is not limited thereto. Those skilled in the art will be able to easily design a circuit configured of various combinations of a P type transistor and an N-type transistor by varying a polarity of a voltage applied to a gate electrode.

In one or more embodiments, the P type transistor may be a poly-silicon semiconductor transistor. A channel of the poly-silicon semiconductor transistor may include a poly-silicon semiconductor. The poly-silicon semiconductor transistor may be, for example, a low temperature poly-silicon LTPS thin film transistor. The poly-silicon semiconductor transistor has high electron mobility and thus has a fast driving characteristic.

In one or more embodiments, the N type transistor may be an oxide semiconductor transistor. A channel of the oxide semiconductor transistor may include an oxide semiconductor. The oxide semiconductor transistor may be, for example, a low temperature polycrystalline oxide (LTPO) thin film transistor. The oxide semiconductor transistor has charge mobility lower than that of the poly-silicon semiconductor transistor. Therefore, a leakage current amount generated in a turn-off state of the oxide semiconductor transistor may be less than that of the poly-silicon semiconductor transistor.

The first transistor T1*a* may be connected between the first power line ELVDDL and a first anode electrode AE1. The first transistor T1*a* may be connected to the first power line ELVDDL via the fifth transistor T5*a*, and may be connected to the first anode electrode AE1 via the sixth transistor T6*a*. The first transistor T1*a* may include a gate electrode connected to a second node N2*a*, a first terminal connected to a first node Na, and a second terminal connected to a third node N3*a*. The first transistor T1*a* may supply a first driving current to the first anode electrode AE1 by receiving a first data signal DATA1 according to a switching operation of the second transistor T2*a*.

In one or more embodiments, the first transistor Ta may be referred to as a first driving transistor, and the gate electrode of the first transistor T1*a* may be referred to as a first driving gate electrode.

The second transistor T2*a* may be connected between the first data line DL1 and the first node N1*a*. The second transistor T2*a* may include a gate electrode connected to the first gate line GWL, a first terminal connected to the first data line DL1, and a second terminal connected to the first node N1*a*. The second transistor T2*a* may be turned on according to a first gate signal GW received through the first gate line GWL, to perform a switching operation of transmitting the first data signal DATA1 received through the first data line DL1 to the first node N1*a*.

In one or more embodiments, the second transistor T2*a* may be referred to as a first data write transistor.

The third transistor T3*a* may be connected between the second node N2*a* and the third node N3*a*. The third transistor T3*a* may include a gate electrode connected to the second gate line GCL, a first terminal connected to the second node N2*a*, and a second terminal connected to the third node N3*a*. The third transistor T3*a* may be turned on according to a second gate signal GC received through the second gate line GCL to compensate for a threshold voltage of the first transistor T1*a* by diode-connecting the first transistor T1*a*.

In one or more embodiments, the third transistor T3*a* may be referred to as a first diode transistor.

The fourth transistor T4*a* may be connected between the second node N2*a* and the initialization line VINTL. The fourth transistor T4*a* may include a gate electrode connected to the third gate line GIL, a first terminal connected to the second node N2*a*, and a second terminal connected to the initialization line VINTL. The fourth transistor T4*a* may be turned on according to a third gate signal G1 received through the third gate line GIL to initialize the gate electrode of the first transistor T1*a* by transmitting an initialization voltage VINT to the gate electrode of the first transistor T1*a*.

In one or more embodiments, the fourth transistor T4*a* may be referred to as a first initialization transistor.

The fifth transistor T5*a* may be connected between the first power line ELVDDL and the first node N1*a*. The fifth transistor T5*a* may include a gate electrode connected to the first emission control signal line EML1, a first terminal connected to the first power line ELVDDL, and a second terminal connected to the first node N1*a*.

The sixth transistor Toa may be connected between the third node N3*a* and the first anode electrode AE1. The sixth transistor Toa may include a gate electrode connected to the first emission control signal line EML1, a first terminal connected to the third node N3*a*, and a second terminal connected to the first anode electrode AE1.

The fifth and sixth transistors T5*a* and Toa may be concurrently (e.g., simultaneously) turned on according to a first emission control signal EM1 received through the first emission control signal line EML1, and thus the first driving current may be provided to the first anode electrode AE1.

In one or more embodiments, the sixth transistor T6*a* may be referred to as a (1-1)-th emission control transistor, and the fifth transistor T5*a* may be referred to as a (1-2)-th emission control transistor.

The seventh transistor T7*a* may be connected between the first anode electrode AE1 and the anode initialization line VAINTL. The seventh transistor T7*a* may include a gate electrode connected to the fourth gate line GBL, a first terminal connected to the anode initialization line VAINTL, and a second terminal connected to the first anode electrode AE1. The seventh transistor T7*a* may be turned on according to a fourth gate signal GB received through the fourth gate line GBL to initialize the first anode electrode AE1 by transmitting an anode initialization voltage VAINT to the first anode electrode AE1.

In one or more embodiments, the seventh transistor T7*a* may be referred to as a first anode initialization transistor.

The eighth transistor T8*a* may be connected between the first node N1*a* and the bias control line VBL. The eighth transistor T8*a* may include a gate electrode connected to the fourth gate line GBL, a first terminal connected to the bias control line VBL, and a second terminal connected to the first node Na. The eighth transistor T8*a* may be turned on according to a fourth gate signal GB received through the fourth gate line GBL to preset a voltage suitable for a subsequent operation of the first transistor T1*a* to the first terminal of the first transistor Ta by applying a bias voltage VB to the first terminal of the first transistor T1*a*.

In one or more embodiments, the eighth transistor T8*a* may be referred to as a first bias transistor.

The first storage capacitor CSTa may include a first electrode and a second electrode. The first electrode of the first storage capacitor CSTa may be connected to the gate electrode of the first transistor T1*a* (e.g., the second node N2*a*), and the second electrode may be connected to the first power line ELVDDL. The first storage capacitor CSTa may serve to maintain a voltage applied to the gate electrode of the first transistor T1*a* by storing and maintaining a voltage corresponding to a voltage difference between the first power line ELVDDL and the gate electrode of the first transistor T1*a*.

The first boosting capacitor CBSTa may include a first electrode and a second electrode. The first electrode of the first boosting capacitor CBSTa may be connected to the first gate line GWL, and the second electrode may be connected to the gate electrode of the first transistor T1*a*. The first boosting capacitor CBSTa may serve to improve black visual perception by compensating for a voltage applied to the gate electrode of the first transistor T1*a* when the first gate signal GW transitions from a turn-on level to a turn-off level.

The first light emitting element LD1 may be connected between the first anode electrode AE1 and the cathode electrode CE. The first light emitting element LD1 may include a micro scale or nano scale of light emitting diode. In one or more embodiments, the first light emitting element LD1 may be configured to generate the light of the first color.

The cathode electrode CE may be connected to the second power supply voltage node VSSN (refer to FIG. 2) or the power line PL (refer to FIG. 1) connected thereto, to receive a second power supply voltage ELVSS.

Hereinafter, the second sub-pixel SP2 including the second sub-pixel circuit SPC2 and the second light emitting element LD2 connected thereto is described.

In describing the second sub-pixel circuit SPC2 included in the second sub-pixel SP2, a difference compared to the first sub-pixel circuit SPC1 is mainly described, and a part omitted from the description is replaced with the content described above.

The second sub-pixel circuit SPC2 may include first to eighth transistors T1*b*, T2*b*, T3*b*, T4*b*, T5*b*, T6*b*, T7*b*, and T8*b*, a second storage capacitor CSTb, and a second boosting capacitor CBSTb.

The first transistor T1*b* may be connected to the first power line ELVDDL via the fifth transistor T5*b*, and may be connected to a second anode electrode AE2 via the sixth transistor T6*b*. The first transistor T1*b* may include a gate electrode connected to a second node N2*b*, a first terminal connected to a first node N1*b*, and a second terminal connected to a third node N3*b*. The first transistor T1*b* may supply a second driving current to the second anode electrode AE2 by receiving a second data signal DATA2 according to a switching operation of the second transistor T2*b*.

In one or more embodiments, the first transistor T1*b* may be referred to as a second driving transistor, and the gate electrode of the first transistor T1*b* may be referred to as a second driving gate electrode.

The second transistor T2*b* may be connected between the second data line DL2 and the first node N1*b*. The second transistor T2*b* may include a gate electrode connected to the first gate line GWL, a first terminal connected to the second data line DL2, and a second terminal connected to the first node N1*b*. The second transistor T2*b* may be turned on according to the first gate signal GW received through the first gate line GWL, to perform a switching operation of transmitting the second data signal DATA2 received through the second data line DL2 to the first node N1*b*.

In one or more embodiments, the second transistor T2*b* may be referred to as a second data write transistor.

The third transistor T3*b* may be connected between the second node N2*b* and the third node N3*b*. The third transistor T3*b* may include a gate electrode connected to the second gate line GCL, a first terminal connected to the second node N2*b*, and a second terminal connected to the third node N3*b*.

In one or more embodiments, the third transistor T3*b* may be referred to as a second diode transistor.

The fourth transistor T4*b* may be connected between the second node N2*b* and the initialization line VINTL. The fourth transistor T4*b* may include a gate electrode connected to the third gate line GIL, a first terminal connected to the second node N2*b*, and a second terminal connected to the initialization line VINTL.

In one or more embodiments, the fourth transistor T4*b* may be referred to as a second initialization transistor.

The fifth transistor T5*b* may be connected between the first power line ELVDDL and the first node N1*b*. The fifth transistor T5*b* may include a gate electrode connected to the second emission control signal line EML2, a first terminal connected to the first power line ELVDDL, and a second terminal connected to the first node N1*b*.

The sixth transistor T6*b* may be connected between the third node N3*b* and the second anode electrode AE2. The sixth transistor T6*b* may include a gate electrode connected to the second emission control signal line EML2, a first terminal connected to the third node N3*b*, and a second terminal connected to the second anode electrode AE2.

The fifth and sixth transistors T5*b* and T6*b* may be concurrently (e.g., simultaneously) turned on according to a second emission control signal EM2 received through the second emission control signal line EML2, and thus the second driving current may be provided to the second anode electrode AE2.

In one or more embodiments, the sixth transistor T6*b* may be referred to as a (2-1)-th emission control transistor, and the fifth transistor T5*b* may be referred to as a (2-2)-th emission control transistor.

The seventh transistor T7*b* may be connected between the second anode electrode AE2 and the anode initialization line VAINTL. The seventh transistor T7*b* may include a gate electrode connected to the fourth gate line GBL, a first terminal connected to the anode initialization line VAINTL, and a second terminal connected to the second anode electrode AE2.

In one or more embodiments, the seventh transistor T7*b* may be referred to as a second anode initialization transistor.

The eighth transistor T8*b* may be connected between the first node N1*b* and the bias control line VBL. The eighth transistor T8*b* may include a gate electrode connected to the fourth gate line GBL, a first terminal connected to the bias control line VBL, and a second terminal connected to the first node N1*b*.

In one or more embodiments, the eighth transistor T8*b* may be referred to as a second bias transistor.

The second storage capacitor CSTb may include a first electrode and a second electrode. The first electrode of the second storage capacitor CSTb may be connected to the gate electrode of the first transistor T1*b*, and the second electrode may be connected to the first power line ELVDDL.

The second boosting capacitor CBSTb may include a first electrode and a second electrode. The first electrode of the second boosting capacitor CBSTb may be connected to the first gate line GWL, and the second electrode may be connected to the gate electrode of the first transistor T1*b*.

The second light emitting element LD2 may be connected between the second anode electrode AE2 and the cathode electrode CE. The second light emitting element LD2 may include a micro scale or nano scale of light emitting diode. In one or more embodiments, the second light emitting element LD2 may be configured to generate the light of the second color.

Hereinafter, the third sub-pixel SP3 including the third sub-pixel circuit SPC3 and the third light emitting element LD3 connected thereto is described.

In describing the third sub-pixel circuit SPC3 included in the third sub-pixel SP3, a difference compared to the first sub-pixel circuit SPC1 is mainly described, and a part omitted from the description is replaced with the content described above.

The third sub-pixel circuit SPC3 may include first to eighth transistors T1c, T2c, T3c, T4c, T5c, T6c, T7c, and T8c, a third storage capacitor CSTc, and a third boosting capacitor CBSTc.

The first transistor T1c may be connected to the first power line ELVDDL via the fifth transistor T5c, and may be connected to a third anode electrode AE3 via the sixth transistor T6c. The first transistor T1c may include a gate electrode connected to a second node N2c, a first terminal connected to a first node N1c, and a second terminal connected to a third node N3c. The first transistor T1c may supply a third driving current to the third anode electrode AE3 by receiving a third data signal DATA3 according to a switching operation of the second transistor T2c.

In one or more embodiments, the first transistor T1c may be referred to as a third driving transistor, and the gate electrode of the first transistor T1c may be referred to as a third driving gate electrode.

The second transistor T2c may be connected between the third data line DL3 and the first node N1c. The second transistor T2c may include a gate electrode connected to the first gate line GWL, a first terminal connected to the third data line DL3, and a second terminal connected to the first node N1c. The second transistor T2c may be turned on according to the first gate signal GW received through the first gate line GWL, to perform a switching operation of transmitting the third data signal DATA3 received through the third data line DL3 to the first node N1c.

In one or more embodiments, the second transistor T2c may be referred to as a third data write transistor.

The third transistor T3c may be connected between the second node N2c and the third node N3c. The third transistor T3c may include a gate electrode connected to the second gate line GCL, a first terminal connected to the second node N2c, and a second terminal connected to the third node N3c.

In one or more embodiments, the third transistor T3c may be referred to as a third diode transistor.

The fourth transistor T4c may be connected between the second node N2c and the initialization line VINTL. The fourth transistor T4c may include a gate electrode connected to the third gate line GIL, a first terminal connected to the second node N2c, and a second terminal connected to the initialization line VINTL.

In one or more embodiments, the fourth transistor T4c may be referred to as a third initialization transistor.

The fifth transistor T5c may be connected between the first power line ELVDDL and the first node N1c. The fifth transistor T5c may include a gate electrode connected to the second emission control signal line EML2, a first terminal connected to the first power line ELVDDL, and a second terminal connected to the first node N1c.

The sixth transistor T6c may be connected between the third node N3c and the third anode electrode AE3. The sixth transistor T6c may include a gate electrode connected to the second emission control signal line EML2, a first terminal connected to the third node N3c, and a second terminal connected to the third anode electrode AE3.

The fifth and sixth transistors T5c and T6c may be concurrently (e.g., simultaneously) turned on according to the second emission control signal EM2 received through the second emission control signal line EML2, and thus the third driving current may be provided to the third anode electrode AE3.

In one or more embodiments, the sixth transistor T6c may be referred to as a (3-1)-th emission control transistor, and the fifth transistor T5c may be referred to as a (3-2)-th emission control transistor.

The seventh transistor T7c may be connected between the third anode electrode AE3 and the anode initialization line VAINTL. The seventh transistor T7c may include a gate electrode connected to the fourth gate line GBL, a first terminal connected to the anode initialization line VAINTL, and a second terminal connected to the third anode electrode AE3.

In one or more embodiments, the seventh transistor T7c may be referred to as a third anode initialization transistor.

The eighth transistor T8c may be connected between the first node N1c and the bias control line VBL. The eighth transistor T8c may include a gate electrode connected to the fourth gate line GBL, a first terminal connected to the bias control line VBL, and a second terminal connected to the first node N1c.

In one or more embodiments, the eighth transistor T8c may be referred to as a third bias transistor.

The third storage capacitor CSTc may include a first electrode and a second electrode. The first electrode of the third storage capacitor CSTc may be connected to the gate electrode of the first transistor T1c, and the second electrode may be connected to the first power line ELVDDL.

The third boosting capacitor CBSTc may include a first electrode and a second electrode. The first electrode of the third boosting capacitor CBSTc may be connected to the first gate line GWL, and the second electrode may be connected to the gate electrode of the first transistor T1c.

The third light emitting element LD3 may be connected between the third anode electrode AE3 and the cathode electrode CE. The third light emitting element LD3 may include a micro scale or nano scale of light emitting diode. In one or more embodiments, the third light emitting element LD3 may be configured to generate the light of the third color.

Figure 7:
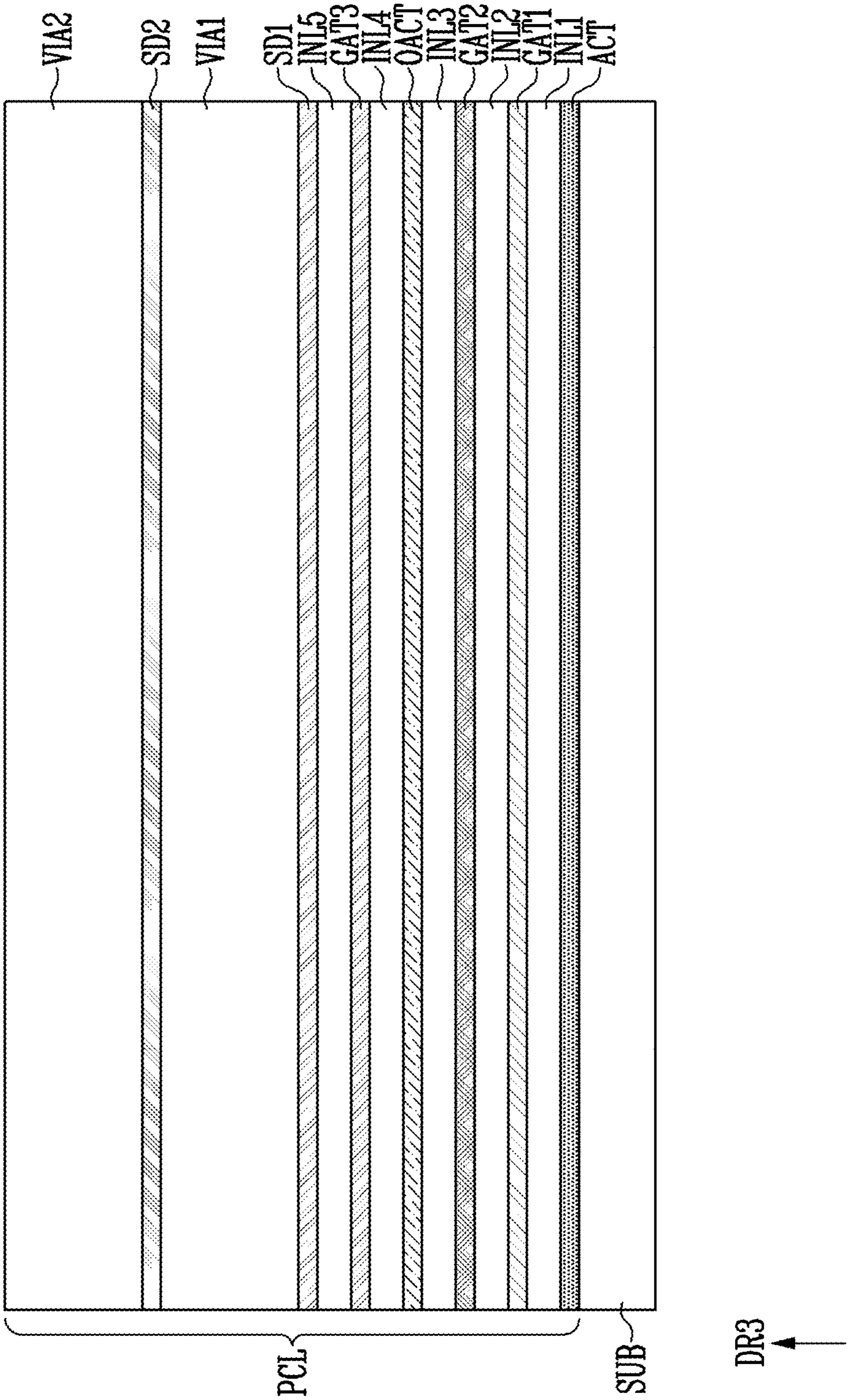
FIG. 7 is a cross-sectional view illustrating an embodiment of a pixel circuit layer included in the pixel of FIG. 6.

FIG. 7 is a cross-sectional view illustrating an embodiment of the pixel circuit layer included in the pixel of FIG. 6.

Referring to FIG. 7, the pixel circuit layer PCL may be disposed on the substrate SUB. The pixel circuit layer PCL may include a semiconductor pattern layer ACT, a first insulating layer INL1, a first gate conductive layer GAT1, a second insulating layer INL2, a second gate conductive layer GAT2, a third insulating layer INL3, an oxide semiconductor pattern layer OACT, a fourth insulating layer INL4, a third gate conductive layer GAT3, a fifth insulating layer INL5, a first SD conductive layer SD1, a first via insulating layer VIA1, a second SD conductive layer SD2, and a second via insulating layer VIA2 sequentially stacked along the third direction DR3.

The first to third gate conductive layers GAT1, GAT2, and GAT3 and the first and second SD conductive layers SD1 and SD2 may include a conductive material. For example, each of the first to third gate conductive layers GAT1, GAT2, and GAT3 and the first and second SD conductive layers SD1 and SD2 may have a single layer structure or a multiple layer structure including copper (Cu), molybdenum (Mo), tungsten (W), aluminum neodymium (AlNd), titanium (Ti), aluminum (Al), silver (Ag), and/or an alloy thereof, independently.

The semiconductor pattern layer ACT may include a silicon semiconductor. For example, the semiconductor pattern layer ACT may include a poly-silicon semiconductor (for example, LTSP). In contrast, the oxide semiconductor pattern layer OACT may include an oxide semiconductor (for example, LTPO).

The first to fifth insulating layers INL1, INL2, INL3, INL4, and INL5 may be provided to electrically separate the semiconductor pattern layer ACT, the oxide semiconductor pattern layer OACT, the first to third gate conductive layers GAT1, GAT2, and GAT3, and the first conductive layer SD1. In this case, if necessary, two or more components from among the semiconductor pattern layer ACT, the oxide semiconductor pattern layer OACT, the first to third gate conductive layers GAT1, GAT2, and GAT3 and the first SD conductive layer SD1 may be connected to each other through a contact hole formed in the first to fifth insulating layers INL1, INL2, INL3, INL4, and INL5.

The first to fifth insulating layers INL1, INL2, INL3, INL4, and INL5 may include an inorganic insulating material. For example, each of the first to fifth insulating layers INL1, INL2, INL3, INL4, and INL5 may independently include metal oxides such as silicon oxide, silicon nitride, silicon oxynitride, and/or aluminum oxide. Each of the first to fifth insulating layers INL1, INL2, INL3, INL4, and INL5 may independently have a single layer structure or a multiple layer structure.

The first and second via insulating layers VIA1 and VIA2 may be provided to electrically separate the first and second SD conductive layers SD1 and SD2. In this case, if necessary, the first and second SD conductive layers SD1 and SD2 may be connected to each other through a contact hole formed in the first and second via insulating layers VIA1 and VIA2.

The first and second via insulating layers VIA1 and VIA2 may include an insulating material. For example, the first and second via insulating layers VIA1 and VIA2 may include an inorganic insulating layer including an inorganic material and/or an organic insulating layer including an organic material. The inorganic insulating layer may include, for example, silicon oxide, silicon nitride, silicon oxynitride, and/or aluminum oxide. The organic insulating layer may include, for example, acrylic resin, epoxy resin, phenol resin, polyamide resin, polyimide resin, unsaturated polyester resin, polyphenylene ether resin, polyphenylene sulfide resin, and/or benzocyclobutene resin.

FIGS. 8-14 are plan views illustrating the pixel circuit layer of FIG. 7.

Figure 8:
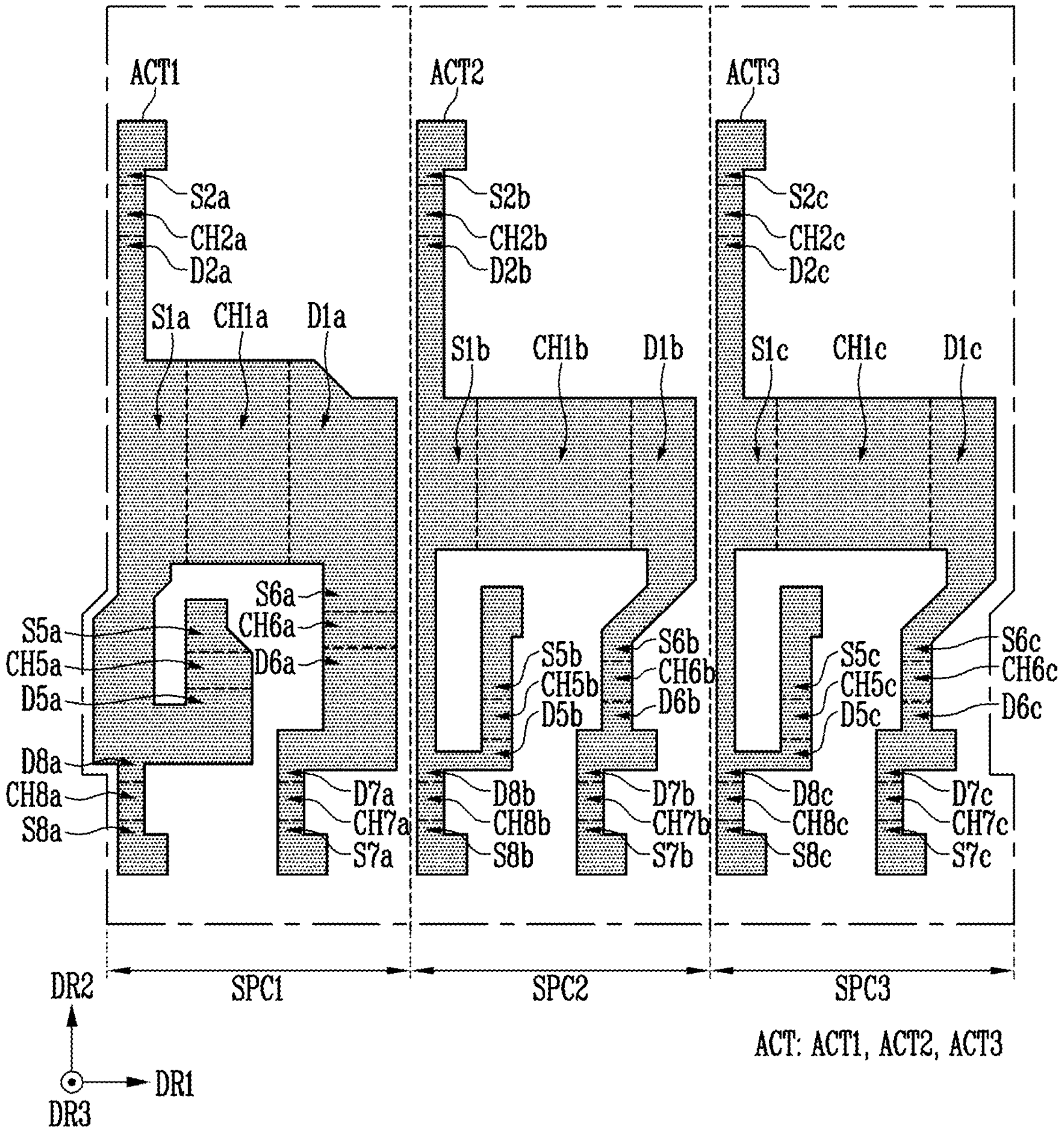
FIGS. 8-14 are plan views illustrating the pixel circuit layer of FIG. 7.

Referring to FIG. 8, patterns implemented with the semiconductor pattern layer ACT are shown.

The semiconductor pattern layer ACT may include first to third semiconductor patterns ACT1, ACT2, and ACT3.

The first semiconductor pattern ACT1 may be disposed in an area where the first sub-pixel circuit SPC1 is provided. The second semiconductor pattern ACT2 may be disposed in an area where the second sub-pixel circuit SPC2 is provided. The third semiconductor pattern ACT3 may be disposed in an area where the third sub-pixel circuit SPC3 is provided.

The first semiconductor pattern ACT1 may include first, second, and fifth to eighth channel areas CH1*a*, CH2*a*, CH5*a*, CH6*a*, CH7*a*, and CH8*a*. The first, second, and fifth to eighth channel areas CH1*a*, CH2*a*, CH5*a*, CH6*a*, CH7*a*, and CH8*a* may be areas doped with an impurity at a relatively low concentration or may be areas that are not substantially doped with an impurity. That is, the first, second, and fifth to eighth channel areas CH1*a*, CH2*a*, CH5*a*, CH6*a*, CH7*a*, and CH8*a* may be areas that exhibit a semiconductor property. The first, second, and fifth to eighth channel areas CH1*a*, CH2*a*, CH5*a*, CH6*a*, CH7*a*, and CH8*a* may function as channels of the first, second, and fifth to eighth transistors T1*a*, T2*a*, T5*a*, T6*a*, T7*a*, and T8*a* of the first sub-pixel circuit SPC1.

In one or more embodiments, the first channel area CH1*a* may be referred to as a first driving channel area, the second channel area CH2*a* may be referred to as a first data write channel area, the fifth channel area CH5*a* may be referred to as a (1-2)-th emission control channel area, and the sixth channel area CH6*a* may be referred to as a (1-1)-th emission control channel area.

Areas excluding the first, second, and fifth to eighth channel areas CH1*a*, CH2*a*, CH5*a*, CH6*a*, CH7*a*, and CH8*a* in the first semiconductor pattern ACT1 may be conductive areas doped with an impurity. These areas may function as terminals of transistors or lines connecting them to each other.

One area S1*a* adjacent to the first channel area CH1*a* may function as the first terminal of the first driving transistor T1*a*, and another area D1*a* may function as the second terminal of the first driving transistor T1*a*.

One area S2*a* adjacent to the second channel area CH2*a* may function as the first terminal of the first data write transistor T2*a*, and another area D2*a* may function as the second terminal of the first data write transistor T2*a*.

One area S5*a* adjacent to the fifth channel area CH5*a* may function as the first terminal of the (1-2)-th emission control transistor T5*a*, and another area D5*a* may function as the second terminal of the (1-2)-th emission control transistor T5*a*.

One area S6*a* adjacent to the sixth channel area CH6*a* may function as the first terminal of the (1-1)-th emission control transistor T6*a*, and another area D6*a* may function as the second terminal of the (1-1)-th emission control transistor T6*a*.

One area S7*a* adjacent to the seventh channel area CH7*a* may function as the first terminal of the first anode initialization transistor T7*a*, and another area D7*a* may function as the second terminal of the first anode initialization transistor T7*a*.

One area S8*a* adjacent to the eighth channel area CH8*a* may function as the first terminal of the first bias transistor T8*a*, and another area D8*a* may function as the second terminal of the first bias transistor T8*a*.

The second semiconductor pattern ACT2 may include first, second, and fifth to eighth channel areas CH1*b*, CH2*b*, CH5*b*, CH6*b*, CH7*b*, and CH8*b*. The first, second, and fifth to eighth channel areas CH1*b*, CH2*b*, CH5*b*, CH6*b*, CH7*b*, and CH8*b* may be areas exhibiting a semiconductor property. The first, second, and fifth to eighth channel areas CH1*b*, CH2*b*, CH5*b*, CH6*b*, CH7*b*, and CH8*b* may function as channels of the first, second, and fifth to eighth transistors T1*b*, T2*b*, T5*b*, T6*b*, T7*b*, and T8*b* of the second sub-pixel circuit SPC2.

In one or more embodiments, the first channel area CH1*b* may be referred to as a second driving channel area, the second channel area CH2*b* may be referred to as a second data write channel area, the fifth channel area CH5*b* may be referred to as a (2-2)-th emission control channel area, and the sixth channel area CH6*b* may be referred to as a (2-1)-th emission control channel area.

Areas excluding the first, second, and fifth to eighth channel areas CH1*b*, CH2*b*, CH5*b*, CH6*b*, CH7*b*, and CH8*b* in the second semiconductor pattern ACT2 may be conductive areas. These areas may function as terminals of transistors or lines connecting them to each other.

One area S1*b* adjacent to the first channel area CH1*b* may function as the first terminal of the second driving transistor T1*b*, and another area D1*b* may function as the second terminal of the first driving transistor T1*b*.

One area S2*b* adjacent to the second channel area CH2*b* may function as the first terminal of the second data write transistor T2*b*, and another area D2*b* may function as the second terminal of the second data write transistor T2*b*.

One area S5*b* adjacent to the fifth channel area CH5*b* may function as the first terminal of the (2-2)-th emission control transistor T5*b*, and another area D5*b* may function as the second terminal of the (2-2)-th emission control transistor T5*b*.

One area S6*b* adjacent to the sixth channel area CH6*b* may function as the first terminal of the (2-1)-th emission control transistor T6*b*, and another area D6*b* may function as the second terminal of the (2-1)-th emission control transistor T6*b*.

One area S7*b* adjacent to the seventh channel area CH7*b* may function as the first terminal of the second anode initialization transistor T7*b*, and another area D7*b* may function as the second terminal of the second anode initialization transistor T7*b*.

One area S8*b* adjacent to the eighth channel area CH8*b* may function as the first terminal of the second bias transistor T8*b*, and another area D8*b* may function as the second terminal of the second bias transistor T8*b*.

The third semiconductor pattern ACT3 may include first, second, and fifth to eighth channel areas CH1*c*, CH2*c*, CH5*c*, CH6*c*, CH7*c*, and CH8*c*. The first, second, and fifth to eighth channel areas CH1*c*, CH2*c*, CH5*c*, CH6*c*, CH7*c*, and CH8*c* may be areas exhibiting a semiconductor property. The first, second, and fifth to eighth channel areas CH1*c*, CH2*c*, CH5*c*, CH6*c*, CH7*c*, and CH8*c* may function as channels of the first, second, and fifth to eighth transistors T1*c*, T2*c*, T5*c*, T6*c*, T7*c*, and T8*c* of the third sub-pixel circuit SPC3.

In one or more embodiments, the first channel area CH1*c* may be referred to as a third driving channel area, the second channel area CH2*c* may be referred to as a third data write channel area, the fifth channel area CH5*c* may be referred to as a (3-2)-th emission control channel area, and the sixth channel area CH6*c* may be referred to as a (3-1)-th emission control channel area.

Areas excluding the first, second, and fifth to eighth channel areas CH1*c*, CH2*c*, CH5*c*, CH6*c*, CH7*c*, and CH8*c* in the third semiconductor pattern ACT3 may be conductive areas. These areas may function as terminals of transistors or lines connecting them to each other.

One area S1*c* adjacent to the first channel area CH1*c* may function as the first terminal of the third driving transistor T1*c*, and another area D1*c* may function as the second terminal of the third driving transistor T1*c*.

One area S2*c* adjacent to the second channel area CH2*c* may function as the first terminal of the third data write transistor T2*c*, and another area D2*c* may function as the second terminal of the third data write transistor T2*c*.

One area S5*c* adjacent to the fifth channel area CH5*c* may function as the first terminal of the (3-2)-th emission control transistor T5*c*, and another area D5*c* may function as the second terminal of the (3-2)-th emission control transistor T5*c*.

One area S6*c* adjacent to the sixth channel area CH6*c* may function as the first terminal of the (3-1)-th emission control transistor T6*c*, and another area D6*c* may function as the second terminal of the (3-1)-th emission control transistor T6*c*.

One area S7*c* adjacent to the seventh channel area CH7*c* may function as the first terminal of the third anode initialization transistor T7*c*, and another area D7*c* may function as the second terminal of the third anode initialization transistor T7*c*.

One area S8*c* adjacent to the eighth channel area CH8*c* may function as the first terminal of the third bias transistor T8*c*, and another area D8*c* may function as the second terminal of the third bias transistor T8*c*.

In one or more embodiments, a channel length of the first channel area CH1*a* of the first semiconductor pattern ACT1 may be less than a channel length of the first channel area CH1*b* of the second semiconductor pattern ACT2, and may be less than a channel length of the first channel area CH1*c* of the third semiconductor pattern ACT3.

In addition, a channel width of the first channel area CH1*a* of the first semiconductor pattern ACT1 may be greater than a channel width of the first channel area CH1*b* of the second semiconductor pattern ACT2, and may be greater than a channel width of the first channel area CH1*c* of the third semiconductor pattern ACT3.

Here, 'channel length' may be defined as the shortest distance between conductive areas (for example, S1*a* and D1*a*) when a channel area (for example, CH1*a*) is interposed between the conductive areas (for example, S1*a* and D1*a*) adjacent to the channel area. For example, the channel length of the first channel area CH1*a* of the first semiconductor pattern ACT1 may be a length of the first channel area CH1*a* in the first direction DR1.

'Channel width' may be a width of the channel area (for example, CH1*a*) in a direction intersecting the above-described 'channel length'. For example, the channel width of the first channel area CH1*a* of the first semiconductor pattern ACT1 may be a width of the first channel area CH1*a* in the second direction DR2.

As the channel length and the channel width of the first channel area CH1*a* of the first semiconductor pattern ACT1 satisfy the above-described condition, an intensity of the first driving current provided to the first anode electrode AE1 may increase. Accordingly, emission efficiency of the first light emitting element LD1 may be further improved. More details are described later with reference to FIGS. 32 and 33.

In one or more embodiments, a channel width of the fifth channel area CH5*a* of the first semiconductor pattern ACT1 may be greater than a channel width of the fifth channel area CH5*b* of the second semiconductor pattern ACT2, and may be greater than a channel width of the fifth channel area CH5*c* of the third semiconductor pattern ACT3. Here, the channel width of the fifth channel area CH5*a* of the first semiconductor pattern ACT1 may be a width of the fifth channel area CH5*a* in the first direction DR1, as defined above, and the channel width of the fifth channel area CH5*b* of the second semiconductor pattern ACT2 and the channel width of the fifth channel area CH5*c* of the third semiconductor pattern ACT3 may also be defined similarly.

As the channel width of the fifth channel area CH5*a* of the first semiconductor pattern ACT1 satisfies the above-described condition, a resistance of a path through which the first driving current flows in the first sub-pixel circuit SPC1 may be relatively decreased. In this case, especially when the intensity of the first driving current provided to the first anode electrode AE1 is relatively large as described above, driving efficiency of the first sub-pixel SP1 may be improved.

In one or more embodiments, a channel width of the sixth channel area CH6*a* of the first semiconductor pattern ACT1 may be greater than a channel width of the sixth channel area CH6*b* of the second semiconductor pattern ACT2, and may be greater than a channel width of the sixth channel area CH6*c* of the third semiconductor pattern ACT3. In this case, especially when the intensity of the first driving current provided to the first anode electrode AE1 is relatively large as described above, driving efficiency of the first sub-pixel SP1 may be improved.

In one or more embodiments, a resistance of the conductive areas S5*a* and D5*a* adjacent to the fifth channel area CH5*a* of the first semiconductor pattern ACT1 may be less than a resistance of the conductive areas S5*b* and D5*b* adjacent to the fifth channel area CH5*b* of the second semiconductor pattern ACT2, and may be less than a resistance of the conductive areas S5*c* and D5*c* adjacent to the fifth channel area CH5*c* of the third semiconductor pattern ACT3. For example, a width in the first direction DR1 of each of the conductive areas S5*a* and D5*a* adjacent to the fifth channel area CH5*a* of the first semiconductor pattern ACT1 may be provided relatively large. In this case, especially when the intensity of the first driving current provided to the first anode electrode AE1 is relatively large as described above, driving efficiency of the first sub-pixel SP1 may be improved.

In one or more embodiments, a resistance of the conductive areas S6*a* and D6*a* adjacent to the sixth channel area CH6*a* of the first semiconductor pattern ACT1 may be less than a resistance of the conductive areas S6*b* and D6*b* adjacent to the sixth channel area CH6*b* of the second semiconductor pattern ACT2, and may be less than a resistance of the conductive areas S6*c* and D6*c* adjacent to the sixth channel area CH6*c* of the third semiconductor pattern ACT3. For example, the width of the first direction DR1 of each of the conductive areas S6*a* and D6*a* adjacent to the sixth channel area CH6*a* of the first semiconductor pattern ACT1 may be provided relatively large. In this case, especially when the intensity of the first driving current provided to the first anode electrode AE1 is relatively large as described above, driving efficiency of the first sub-pixel SP1 may be improved.

Figure 9:
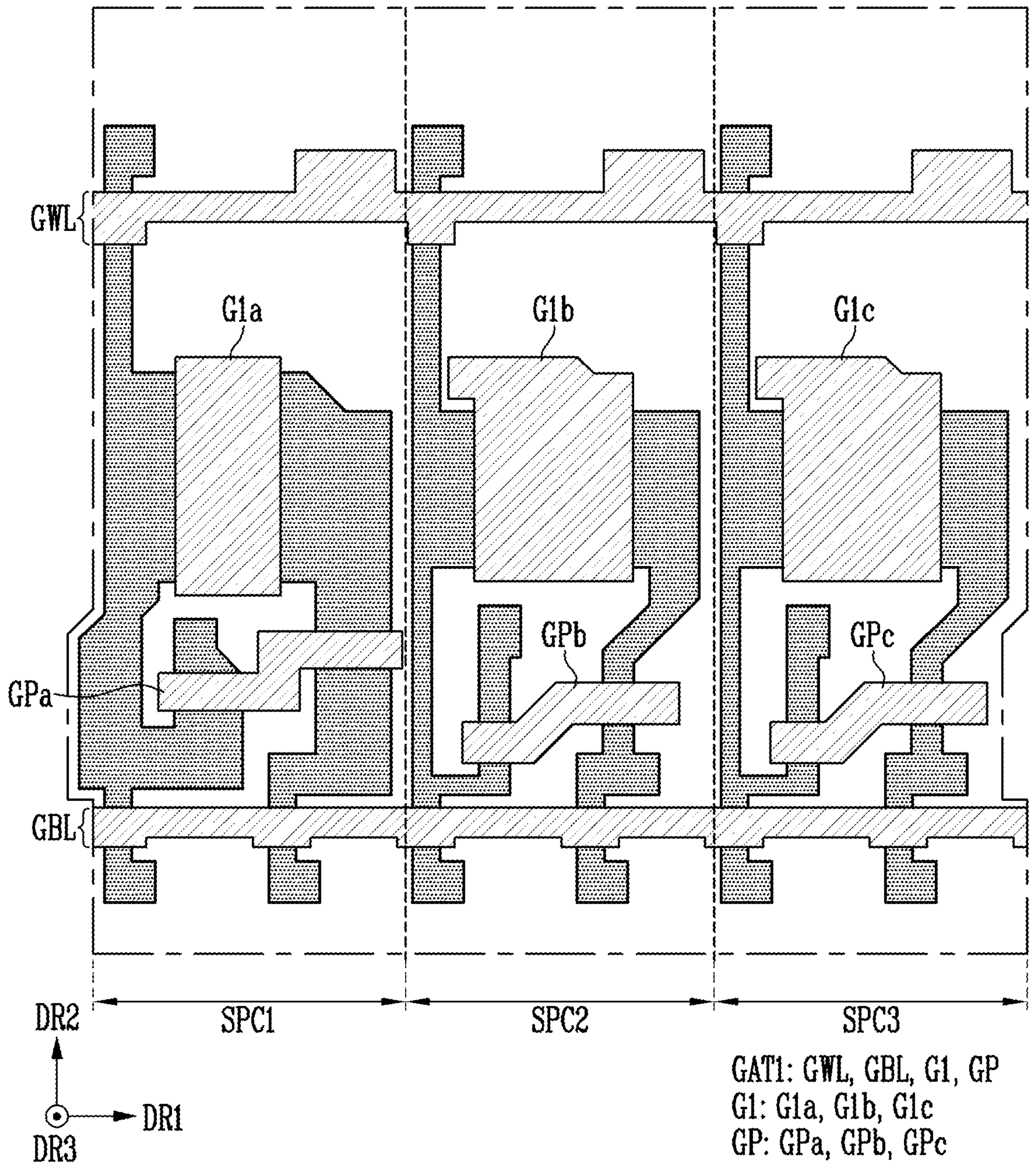

Referring to FIG. 9, patterns implemented with the first gate conductive layer GAT1 and the semiconductor pattern layer ACT described with reference to FIG. 8 are shown.

The first gate conductive layer GAT1 may include the first gate line GWL, the fourth gate line GBL, a first gate electrode pattern G1, and an emission control gate electrode pattern GP.

The first gate line GWL may overlap the first to third semiconductor patterns ACT1, ACT2, and ACT3 on a plane (e.g., in a plan view).

A portion of the first gate line GWL that overlaps the second channel area CH2*a* of the first semiconductor pattern ACT1 on a plane may function as the gate electrode of the first data write transistor T2*a*. A portion of the first gate line GWL that overlaps the second channel area CH2*b* of the second semiconductor pattern ACT2 on a plane may function as the gate electrode of the second data write transistor T2*b*. A portion of the first gate line GWL that overlaps the second channel area CH2*c* of the third semiconductor pattern ACT3 on a plane may function as the gate electrode of the third data write transistor T2*c*.

The fourth gate line GBL may overlap the first to third semiconductor patterns ACT1, ACT2, and ACT3 on a plane.

A portion of the fourth gate line GBL that overlaps the seventh channel area CH7*a* of the first semiconductor pattern ACT1 on a plane may function as the gate electrode of the first anode initialization transistor T7*a*. A portion of the fourth gate line GBL that overlaps the seventh channel area CH7*b* of the second semiconductor pattern ACT2 on a plane may function as the gate electrode of the second anode initialization transistor T7*b*. A portion of the fourth gate line GBL that overlaps the seventh channel area CH7*c* of the third semiconductor pattern ACT3 on a plane may function as the gate electrode of the third anode initialization transistor T7*c*.

The first gate electrode pattern G1 may include a first driving gate electrode G1*a*, a second driving gate electrode G1*b*, and a third driving gate electrode G1*c*.

The first driving gate electrode G1*a* may overlap the first semiconductor pattern ACT1 on a plane. A portion of the first driving gate electrode G1*a* that overlaps the first channel area CH1*a* of the first semiconductor pattern ACT1 on a plane may function as the gate electrode of the first driving transistor T1*a*.

The second driving gate electrode G1*b* may overlap the second semiconductor pattern ACT2 on a plane. A portion of the second driving gate electrode G1*b* that overlaps the first channel area CH1*b* of the second semiconductor pattern ACT2 on a plane may function as the gate electrode of the second driving transistor T1*b*.

The third driving gate electrode G1*c* may overlap the third semiconductor pattern ACT3 on a plane. A portion of the third driving gate electrode G1*c* that overlaps the first channel area CH1*c* of the third semiconductor pattern ACT3 on a plane may function as the gate electrode of the third driving transistor T1*c*.

The emission control gate electrode pattern GP may include a first emission control gate electrode GPa, a second emission control gate electrode GPb, and a third emission control gate electrode GPc.

The first emission control gate electrode GPa may overlap the first semiconductor pattern ACT1 on a plane. A portion of the first emission control gate electrode GPa that overlaps the fifth channel area CH5*a* of the first semiconductor pattern ACT1 on a plane may function as the gate electrode of the (1-2)-th emission control transistor T5*a*. A portion of the first emission control gate electrode GPa that overlaps the sixth channel area CH6*a* of the first semiconductor pattern ACT1 on a plane may function as the gate electrode of the (1-1)-th emission control transistor T6*a*.

The second emission control gate electrode GPb may overlap the second semiconductor pattern ACT2 on a plane. A portion of the second emission control gate electrode GPb that overlaps the fifth channel area CH5*b* of the second semiconductor pattern ACT2 on a plane may function as the gate electrode of the (2-2)-th emission control transistor T5*b*. A portion of the second emission control gate electrode GPb that overlaps the sixth channel area CH6*b* of the second semiconductor pattern ACT2 on a plane may function as the gate electrode of the (2-1)-th emission control transistor T6*b*.

The third emission control gate electrode GPc may overlap the third semiconductor pattern ACT3 on a plane. A portion of the third emission control gate electrode GPc that overlaps the fifth channel area CH5*c* of the third semiconductor pattern ACT3 on a plane may function as the gate electrode of the (3-2)-th emission control transistor T6*c*. A portion of the third emission control gate electrode GPc that overlaps the sixth channel area CH6*c* of the third semiconductor pattern ACT3 on a plane may function as the gate electrode of the (3-1)-th emission control transistor T6*c*.

Figure 10:
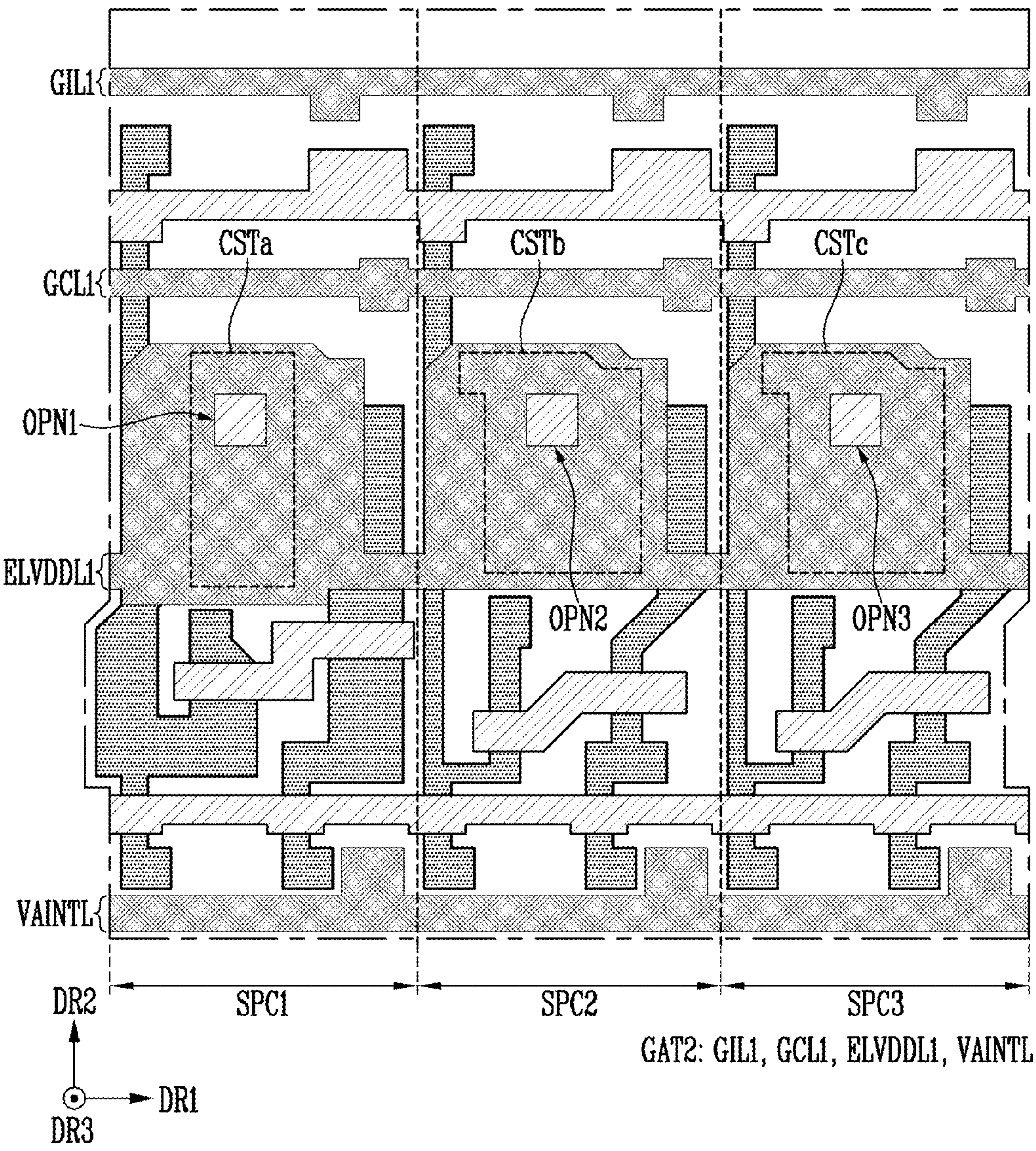

Referring to FIG. 10, patterns implemented with the second gate conductive layer GAT2, and the semiconductor pattern layer ACT and the first gate conductive layer GAT1 described with reference to FIGS. 8 and 9 are shown.

The second gate conductive layer GAT2 may include a (3-1)-th gate line GIL1, a (2-1)-th gate line GCL1, a first horizontal power line ELVDDL1, and the anode initialization line VAINTL.

The (3-1)-th gate line GIL1 may define the third gate line GIL together with a (3-2)-th gate line GIL2 (refer to FIG. 12) to be described later. The (3-1)-th gate line GIL1 may transmit the third gate signal GI.

The (2-1)-th gate line GCL1 may define the second gate line GCL together with a (2-2)-th gate line GCL2 (refer to FIG. 12) to be described later. The (2-1)-th gate line GCL1 may transmit the second gate signal GC.

The first horizontal power line ELVDDL1 may define the first power line ELVDDL together with a first vertical power line ELVDDL2 (e.g., refer to FIG. 14) to be described later. The first horizontal power line ELVDDL1 may transmit the first power voltage ELVDD.

The first horizontal power line ELVDDL1 may overlap the first driving gate electrode G1*a* on a plane to form the first storage capacitor CSTa. In this case, the first driving gate electrode G1*a* may function as the first electrode of the first storage capacitor CSTa and a portion of the first horizontal power line ELVDDL1 that overlaps the first driving gate electrode G1*a* on a plane may function as the second electrode of the first storage capacitor CSTa.

The first horizontal power line ELVDDL1 may overlap the second driving gate electrode G1*b* on a plane to form the second storage capacitor CSTb. In this case, the second driving gate electrode G1*b* may function as the first electrode of the second storage capacitor CSTb and a portion of the first horizontal power line ELVDDL1 that overlaps the second driving gate electrode G1*b* on a plane may function as the second electrode of the second storage capacitor CSTb.

The first horizontal power line ELVDDL1 may overlap the third driving gate electrode G1*c* on a plane to form the third storage capacitor CSTc. In this case, the third driving gate electrode G1*c* may function as the first electrode of the third storage capacitor CSTc and a portion of the first horizontal power line ELVDDL1 that overlaps the third driving gate electrode G1*c* on a plane may function as the second electrode of the third storage capacitor CSTc.

The first horizontal power line ELVDDL1 may include first to third openings OPN1, OPN2, and OPN3. The first opening OPN1 may overlap the first driving gate electrode G1*a* on a plane, and expose a portion of the first driving gate electrode G1*a*. The second opening OPN2 may overlap the second driving gate electrode G1*b* on a plane, and expose a portion of the second driving gate electrode G1*b*. The third opening OPN3 may overlap the third driving gate electrode G1*c* on a plane, and expose a portion of the third driving gate electrode G1*c*.

Figure 11:
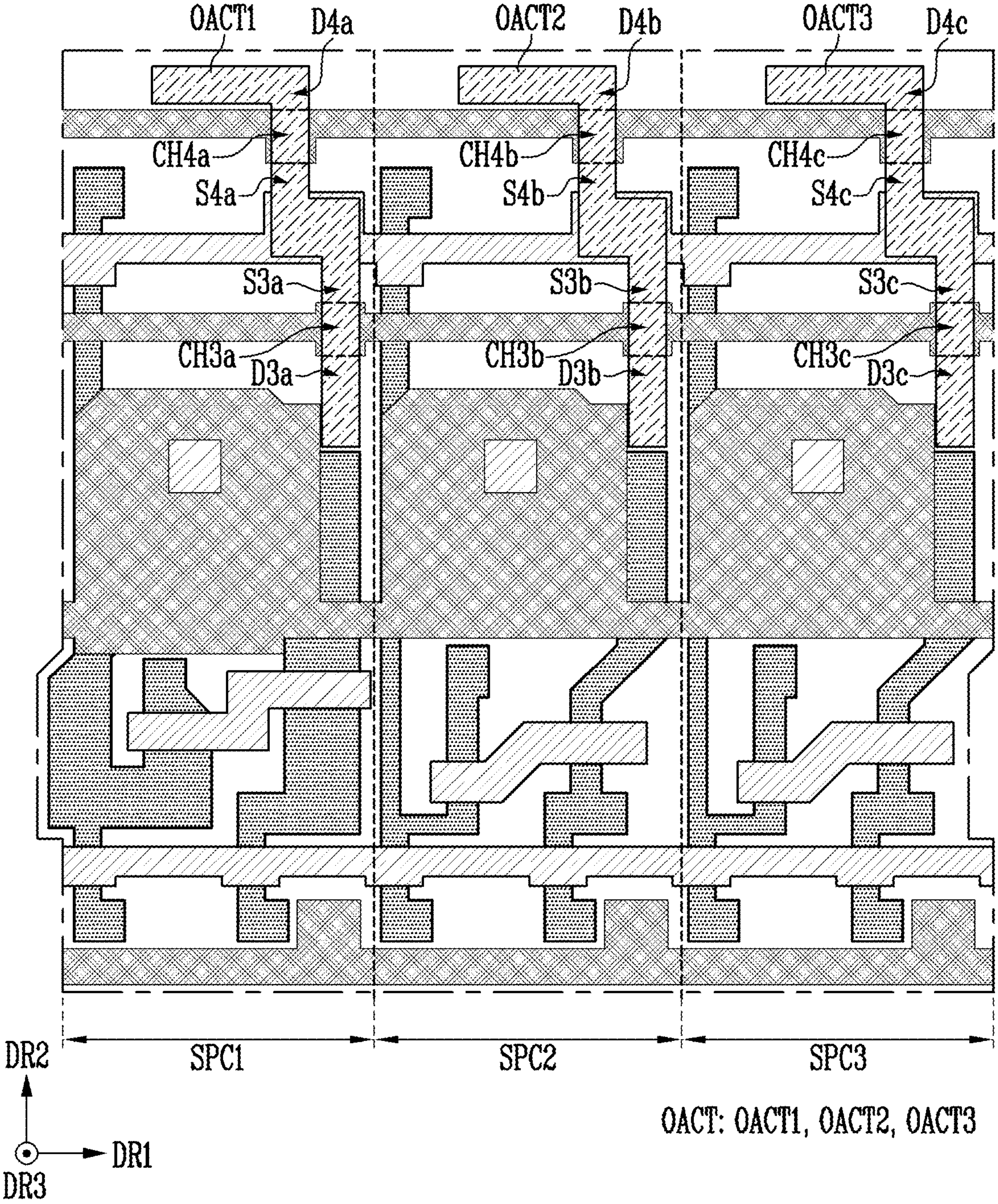

Referring to FIG. 11, patterns implemented with the oxide semiconductor pattern layer OACT, and the semiconductor pattern layer ACT and the first and second gate conductive layers GAT1 and GAT2 described with reference to FIGS. 8-10 are shown.

The oxide semiconductor pattern layer OACT may include first to third oxide semiconductor patterns OACT1, OACT2, and OACT3.

The first oxide semiconductor pattern OACT1 may be disposed in an area where the first sub-pixel circuit SPC1 is provided. The second oxide semiconductor pattern OACT2 may be disposed in an area where the second sub-pixel circuit SPC2 is provided. The third oxide semiconductor pattern OACT3 may be disposed in an area where the third sub-pixel circuit SPC3 is provided.

The first oxide semiconductor pattern OACT1 may include third and fourth channel areas CH3*a* and CH4*a*. The third and fourth channel areas CH3*a* and CH4*a* may be areas exhibiting a semiconductor property. The third and fourth channel areas CH3*a* and CH4*a* may function as channels of the third and fourth transistors T3*a* and T4*a* of the first sub-pixel circuit SPC1.

The third channel area CH3*a* may overlap a portion of the (2-1)-th gate line GCL1 on a plane. In this case, the portion of the (2-1)-th gate line GCL1 may function as a bottom gate electrode of the first diode transistor T3*a*.

The fourth channel area CH4*a* may overlap a portion of the (3-1)-th gate line GIL1 on a plane. In this case, the portion of the (3-1)-th gate line GCL1 may function as a bottom gate electrode of the first initialization transistor T4*a*.

Areas excluding the third and fourth channel areas CH3*a* and CH4*a* in the first oxide semiconductor pattern OACT1 may be conductive areas. These areas may function as terminals of transistors or lines connecting them to each other.

One area S3*a* adjacent to the third channel area CH3*a* may function as the first terminal of the first diode transistor T3*a*, and another area D3*a* may function as the second terminal of the first diode transistor T3*a*.

One area S4*a* adjacent to the fourth channel area CH4*a* may function as the first terminal of the first initialization transistor T4*a*, and another area D4*a* may function as the second terminal of the first initialization transistor T4*a*.

The second oxide semiconductor pattern OACT2 may include third and fourth channel areas CH3*b* and CH4*b*. The third and fourth channel areas CH3*b* and CH4*b* may be areas exhibiting a semiconductor property. The third and fourth channel areas CH3*b* and CH4*b* may function as channels of the third and fourth transistors T3*b* and T4*b* of the second sub-pixel circuit SPC2.

The third channel area CH3*b* may overlap a portion of the (2-1)-th gate line GCL1 on a plane. In this case, the portion of the (2-1)-th gate line GCL1 may function as a bottom gate electrode of the second diode transistor T3*b*.

The fourth channel area CH4*b* may overlap a portion of the (3-1)-th gate line GIL1 on a plane. In this case, the portion of the (3-1)-th gate line GIL1 may function as a bottom gate electrode of the second initialization transistor T4*b*.

Areas excluding the third and fourth channel areas CH3*b* and CH4*b* in the second oxide semiconductor pattern OACT2 may be conductive areas. These areas may function as terminals of transistors or lines connecting them to each other.

One area S3*b* adjacent to the third channel area CH3*b* may function as the first terminal of the second diode transistor T3*b*, and another area D3*b* may function as the second terminal of the second diode transistor T3*b*.

One area S4*b* adjacent to the fourth channel area CH4*b* may function as the first terminal of the second initialization transistor T4*b*, and another area D4*b* may function as the second terminal of the second initialization transistor T4*b*.

The third oxide semiconductor pattern OACT3 may include third and fourth channel areas CH3*c* and CH4*c*. The third and fourth channel areas CH3*c* and CH4*c* may be areas exhibiting a semiconductor property. The third and fourth channel areas CH3*c* and CH4*c* may function as channels of the third and fourth transistors T3*c* and T4*c* of the third sub-pixel circuit SPC3.

The third channel area CH3*c* may overlap a portion of the (2-1)-th gate line GCL1 on a plane. In this case, the portion of the (2-1)-th gate line GCL1 may function as a bottom gate electrode of the third diode transistor T3*c*.

The fourth channel area CH4*c* may overlap a portion of the (3-1)-th gate line GIL1 on a plane. In this case, the portion of the (3-1)-th gate line GIL1 may function as a bottom gate electrode of the third initialization transistor T4c.

Areas excluding the third and fourth channel areas CH3c and CH4c in the third oxide semiconductor pattern OACT3 may be conductive areas. These areas may function as terminals of transistors or lines connecting them to each other.

One area S3c adjacent to the third channel area CH3c may function as the first terminal of the third diode transistor T3c, and another area D3c may function as the second terminal of the third diode transistor T3c.

One area S4c adjacent to the fourth channel area CH4c may function as the first terminal of the third initialization transistor T4c, and another area D3c may function as the second terminal of the third initialization transistor T4c.

Figure 12:
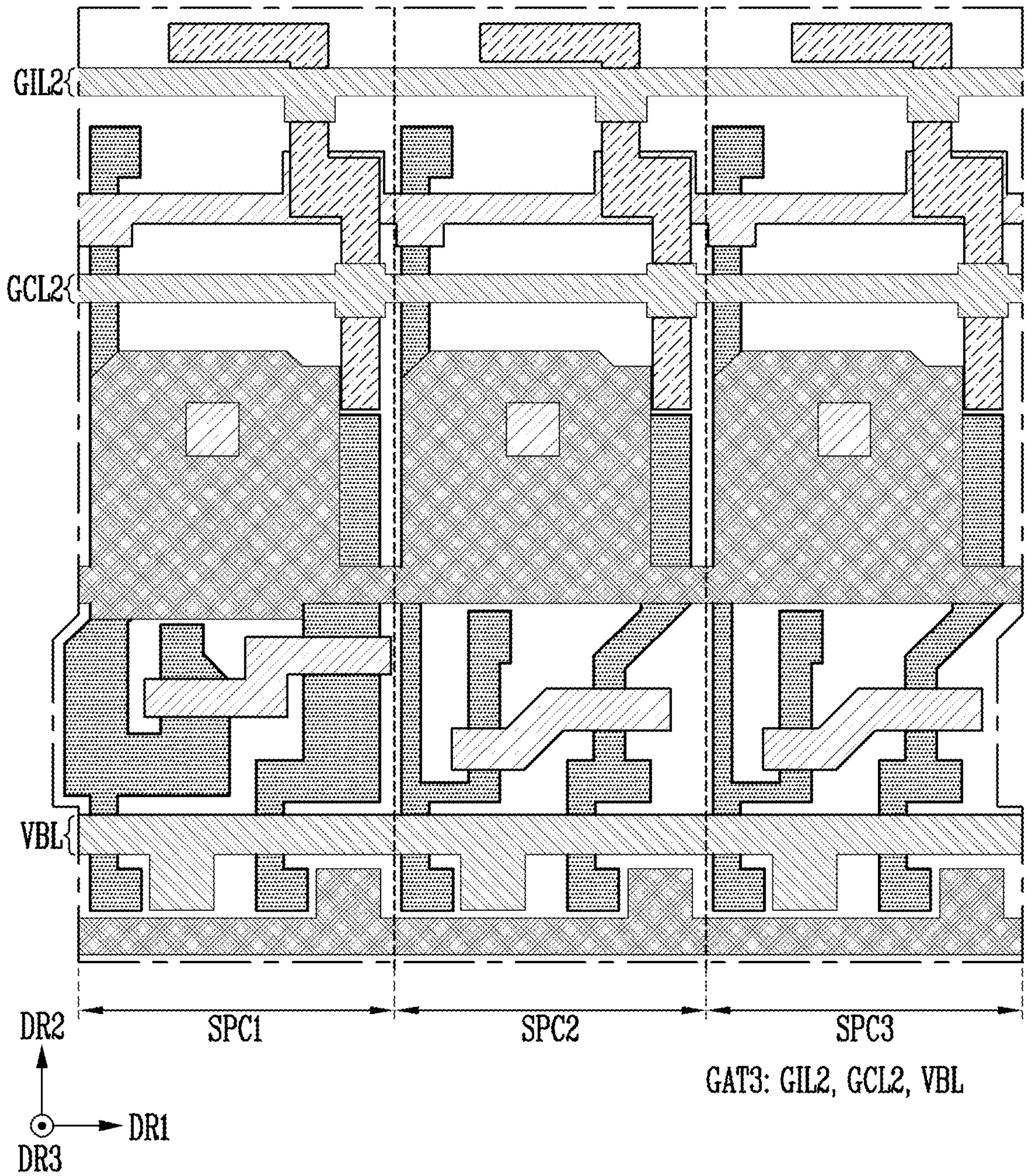

Referring to FIG. 12, patterns implemented with the third gate conductive layer GAT3, and the semiconductor pattern layer ACT, the first and second gate conductive layers GAT1 and GAT2, and the oxide semiconductor pattern layer OACT described with reference to FIGS. 8-11 are shown.

The third gate conductive layer GAT3 may include a (3-2)-th gate line GIL2, a (2-2)-th gate line GCL2, and the bias control line VBL.

The (3-2)-th gate line GIL2 may overlap the first to third oxide semiconductor patterns OACT1, OACT2, and OACT3 on a plane. The (3-2)-th gate line GIL2 may transmit the third gate signal GI.

A portion of the (3-2)-th gate line GIL2 that overlaps the fourth channel area CH4a of the first oxide semiconductor pattern OACT1 on a plane may function as an upper gate electrode of the first initialization transistor T4a. A portion of the (3-2)-th gate line GIL2 that overlaps the fourth channel area CH4b of the second oxide semiconductor pattern OACT2 on a plane may function as an upper gate electrode of the second initialization transistor T4b. A portion of the (3-2)-th gate line GIL2 that overlaps the fourth channel area CH4c of the third oxide semiconductor pattern OACT3 on a plane may function as an upper gate electrode of the third initialization transistor T4c.

The (2-2)-th gate line GCL2 may overlap the first to third oxide semiconductor patterns OACT1, OACT2, and OACT3 on a plane. The (2-2)-th gate line GCL2 may transmit the second gate signal GC.

A portion of the (2-2)-th gate line GCL2 that overlaps the third channel area CH3a of the first oxide semiconductor pattern OACT1 on a plane may function as an upper gate electrode of the first diode transistor T3a. A portion of the (2-2)-th gate line GCL2 that overlaps the third channel area CH3b of the second oxide semiconductor pattern OACT2 on a plane may function as an upper gate electrode of the second diode transistor T3b. A portion of the (2-2)-th gate line GCL2 that overlaps the third channel area CH3c of the third oxide semiconductor pattern OACT3 on a plane may function as an upper gate electrode of the third diode transistor T3c.

Figure 13:
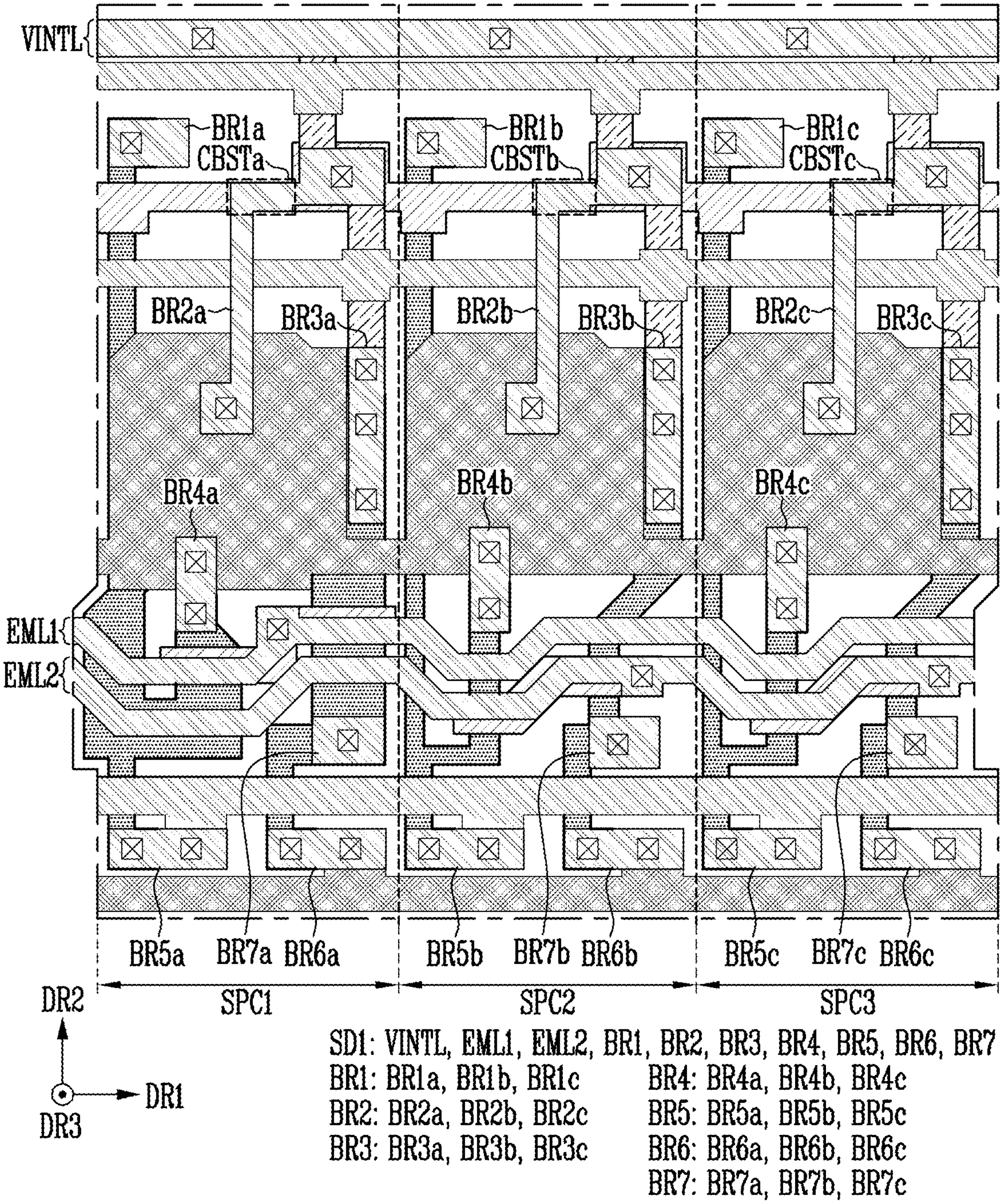

Referring to FIG. 13, patterns implemented with the first SD conductive layer

SD1, and the semiconductor pattern layer ACT, the first to third gate conductive layers GAT1, GAT2, and GAT3, and the oxide semiconductor pattern layer OACT described with reference to FIGS. 8-12 are shown.

The first SD conductive layer SD1 may include the initialization line VINTL, a first emission control signal line EML1, a second emission control signal line EML2, and first to seventh bridge electrodes BR1, BR2, BR3, BR4, BR5, BR6, and BR7.

The initialization line VINTL may be connected to the first to third oxide semiconductor patterns OACT1, OACT2, and OACT3 through contact holes. Through the initialization line VINTL, the initialization voltage VINT may be transmitted to the second terminal D4a of the first initialization transistor T4a, the second terminal D4b of the second initialization transistor T4b, and the second terminal D4c of the third initialization transistor T4c.

The first emission control signal line EML1 may be connected to the first emission control gate electrode GPa through a contact hole.

The second emission control signal line EML2 may be connected to the second and third emission control gate electrodes GPb and GPc through contact holes.

The first bridge electrode BR1 may include a (1-1)-th bridge electrode BR1a, a (1-2)-th bridge electrode BR1b, and a (1-3)-th bridge electrode BR1c.

The (1-1)-th bridge electrode BR1a may be connected to the first semiconductor pattern ACT1 through a contact hole. The (1-1)-th bridge electrode BR1a may be connected to the first terminal S2a of the first data write transistor T2a.

The (1-2)-th bridge electrode BR1b may be connected to the second semiconductor pattern ACT2 through a contact hole. The (1-2)-th bridge electrode BR1b may be connected to the first terminal S2b of the second data write transistor T2b.

The (1-3)-th bridge electrode BR1c may be connected to the third semiconductor pattern ACT3 through a contact hole. The (1-3)-th bridge electrode BR1c may be connected to the first terminal S2c of the third data write transistor T2c.

The second bridge electrode BR2 may include a (2-1)-th bridge electrode BR2a, a (2-2)-th bridge electrode BR2b, and a (2-3)-th bridge electrode BR2c.

The (2-1)-th bridge electrode BR2a may be connected to the first oxide semiconductor pattern OACT1 and the first driving gate electrode G1a through contact holes. The first terminal S3a of the first diode transistor T3a, the first terminal S4a of the first initialization transistor T4a, and the first driving gate electrode G1a may be connected to each other through the (2-1)-th bridge electrode BR2a.

The (2-2)-th bridge electrode BR2b may be connected to the second oxide semiconductor pattern OACT2 and the second driving gate electrode G1b through contact holes. The first terminal S3b of the second diode transistor T3b, the first terminal S4b of the second initialization transistor T4b, and the second driving gate electrode G1b may be connected to each other through the (2-2)-th bridge electrode BR2b.

The (2-3)-th bridge electrode BR2c may be connected to the third oxide semiconductor pattern OACT3 and the third driving gate electrode G1c through contact holes. The first terminal S3c of the third diode transistor T3c, the first terminal S4c of the third initialization transistor T4c, and the third driving gate electrode G1c may be connected to each other through the (2-3)-th bridge electrode BR2c.

The (2-1)-th bridge electrode BR2a may overlap the first gate line GWL on a plane to form the first boosting capacitor CBSTa. In this case, the first gate line GWL may function as the first electrode of the first boosting capacitor CBSTa, and the (2-1)-th bridge electrode BR2a may function as the second electrode of the first boosting capacitor CBSTa.

The (2-2)-th bridge electrode BR2b may overlap the first gate line GWL on a plane to form the second boosting capacitor CBSTb. In this case, the first gate line GWL may function as the first electrode of the second boosting capacitor CBSTb, and the (2-2)-th bridge electrode BR2b may function as the second electrode of the second boosting capacitor CBSTb.

The (2-3)-th bridge electrode BR2*c* may overlap the first gate line GWL on a plane to form the third boosting capacitor CBSTc. In this case, the first gate line GWL may function as the first electrode of the third boosting capacitor CBSTc, and the (2-3)-th bridge electrode BR2*c* may function as the second electrode of the third boosting capacitor CBSTc.

The third bridge electrode BR3 may include a (3-1)-th bridge electrode BR3*a*, a (3-2)-th bridge electrode BR3*b*, and a (3-3)-th bridge electrode BR3*c*.

The (3-1)-th bridge electrode BR3*a* may be connected to the first oxide semiconductor pattern OACT1 and the first semiconductor pattern ACT1 through contact holes. The second terminal D3*a* of the first diode transistor T3*a* may be connected to the second terminal Dla of the first driving transistor T1*a* through the (3-1)-th bridge electrode BR3*a*.

The (3-2)-th bridge electrode BR3*b* may be connected to the second oxide semiconductor pattern OACT2 and the second semiconductor pattern ACT2 through contact holes. The second terminal D3*b* of the second diode transistor T3*b* may be connected to the second terminal D1*b* of the second driving transistor T1*b* through the (3-2)-th bridge electrode BR3*b*.

The (3-3)-th bridge electrode BR3*c* may be connected to the third oxide semiconductor pattern OACT3 and the third semiconductor pattern ACT3 through contact holes. The second terminal D3*c* of the third diode transistor T3*c* may be connected to the second terminal D1*c* of the third driving transistor T1*c* through the (3-3)-th bridge electrode BR3*c*.

The fourth bridge electrode BR4 may include a (4-1)-th bridge electrode BR4*a*, a (4-2)-th bridge electrode BR4*b*, and a (4-3)-th bridge electrode BR4*c*.

The (4-1)-th bridge electrode BR4*a* may be connected to the first semiconductor pattern ACT1 and the first horizontal power line ELVDDL1 through contact holes. The first power voltage ELVDD may be transmitted to the first terminal S5*a* of the (1-2)-th emission control transistor T5*a* through the (4-1)-th bridge electrode BR4*a*.

The (4-2)-th bridge electrode BR4*b* may be connected to the second semiconductor pattern ACT2 and the first horizontal power line ELVDDL1 through contact holes. The first power voltage ELVDD may be transmitted to the first terminal S5*b* of the (2-2)-th emission control transistor T5*b* through the (4-2)-th bridge electrode BR4*b*.

The (4-3)-th bridge electrode BR4*c* may be connected to the third semiconductor pattern ACT3 and the first horizontal power line ELVDDL1 through contact holes. The first power voltage ELVDD may be transmitted to the first terminal S5*c* of the (3-2)-th emission control transistor T5*c* through the (4-3)-th bridge electrode BR4*c*.

The fifth bridge electrode BR5 may include a (5-1)-th bridge electrode BR5*a*, a (5-2)-th bridge electrode BR5*b*, and a (5-3)-th bridge electrode BR5*c*.

The (5-1)-th bridge electrode BR5*a* may be connected to the first semiconductor pattern ACT1 and the bias control line VBL through contact holes. The bias voltage VB may be transmitted to the first terminal S8*a* of the first bias transistor T8*a* through the (5-1)-th bridge electrode BR5*a*.

The (5-2)-th bridge electrode BR5*b* may be connected to the second semiconductor pattern ACT2 and the bias control line VBL through contact holes. The bias voltage VB may be transmitted to the first terminal S8*b* of the second bias transistor T8*b* through the (5-2)-th bridge electrode BR5*b*.

The (5-3)-th bridge electrode BR5*c* may be connected to the third semiconductor pattern ACT3 and the bias control line VBL through contact holes. The bias voltage VB may be transmitted to the first terminal S8*c* of the third bias transistor T8*c* through the (5-3)-th bridge electrode BR5*c*.

The sixth bridge electrode BR6 may include a (6-1)-th bridge electrode BR6*a*, a (6-2)-th bridge electrode BR6*b*, and a (6-3)-th bridge electrode BR6*c*.

The (6-1)-th bridge electrode BR6*a* may be connected to the first semiconductor pattern ACT1 and the anode initialization line VAINTL through contact holes. The anode initialization voltage VAINT may be transmitted to the first terminal S7*a* of the first anode initialization transistor T7*a* through the (6-1)-th bridge electrode BR6*a*.

The (6-2)-th bridge electrode BR6*b* may be connected to the second semiconductor pattern ACT2 and the anode initialization line VAINTL through contact holes. The anode initialization voltage VAINT may be transmitted to the first terminal S7*b* of the second anode initialization transistor T7*b* through the (6-2)-th bridge electrode BR6*b*.

The (6-3)-th bridge electrode BR6*c* may be connected to the third semiconductor pattern ACT3 and the anode initialization line VAINTL through contact holes. The anode initialization voltage VAINT may be transmitted to the first terminal S7*c* of the third anode initialization transistor T7*c* through the (6-3)-th bridge electrode BR6*c*.

The seventh bridge electrode BR7 may include a (7-1)-th bridge electrode BR7*a*, a (7-2)-th bridge electrode BR7*b*, and a (7-3)-th bridge electrode BR7*c*.

The (7-1)-th bridge electrode BR7*a* may be connected to the first semiconductor pattern ACT1 through a contact hole. The (7-1)-th bridge electrode BR7*a* may be connected to the second terminal D6*a* of the (1-1)-th emission control transistor T6*a* and the second terminal D7*a* of the first anode initialization transistor T7*a*.

The (7-2)-th bridge electrode BR7*b* may be connected to the second semiconductor pattern ACT2 through a contact hole. The (7-2)-th bridge electrode BR7*b* may be connected to the second terminal D6*b* of the (2-1)-th emission control transistor T6*b* and the second terminal D7*b* of the second anode initialization transistor T7*b*.

The (7-3)-th bridge electrode BR7*c* may be connected to the third semiconductor pattern ACT3 through a contact hole. The (7-3)-th bridge electrode BR7*c* may be connected to the second terminal D6*c* of the (3-1)-th emission control transistor T6*c* and the second terminal D7*c* of the second anode initialization transistor T7*c*.

Figure 14:
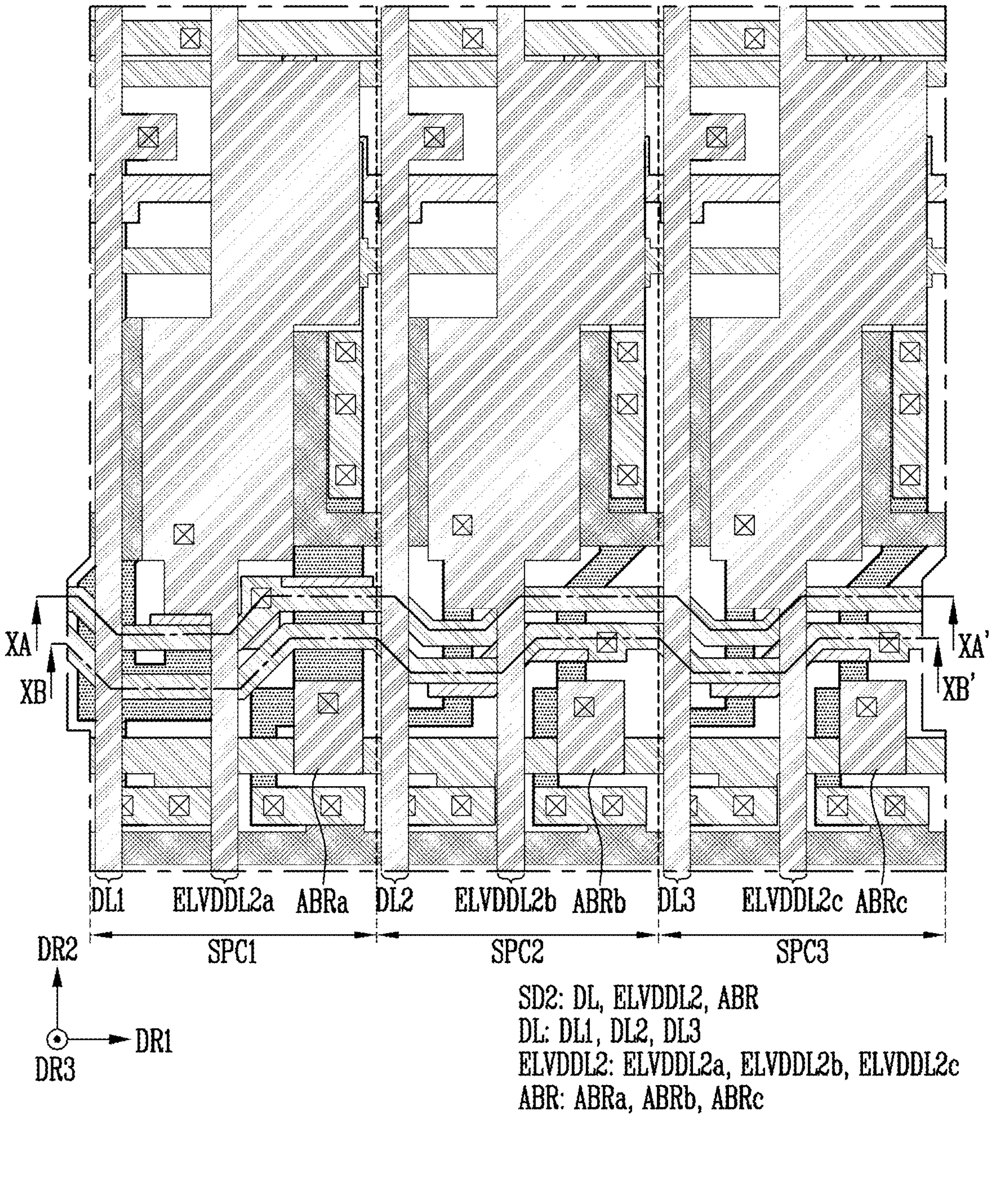

Referring to FIG. 14, patterns implemented with the second SD conductive layer SD2, and the semiconductor pattern layer ACT, the first to third gate conductive layers GAT1, GAT2, and GAT3, the oxide semiconductor pattern layer OACT, and the first SD conductive layer SD1 described with reference to FIGS. 8-13 are shown.

The second SD conductive layer SD2 may include a data line DL, the first vertical power line ELVDDL2, and an anode bridge electrode ABR.

The data line DL may include a first data line DL1, a second data line DL2, and a third data line DL3.

The first data line DL1 may be connected to the (1-1)-th bridge electrode BR1*a* through a contact hole. The first data signal DATA1 may be transmitted to the first terminal S2*a* of the first data write transistor T2*a* through the first data line DL1 and the (1-1)-th bridge electrode BR1*a* connected thereto.

The second data line DL2 may be connected to the (1-2)-th bridge electrode BR1*b* through a contact hole. The second data signal DATA2 may be transmitted to the first terminal S2*b* of the second data write transistor T2*b* through the second data line DL2 and the (1-2)-th bridge electrode BR1*b* connected thereto.

The third data line DL3 may be connected to the (1-3)-th bridge electrode BR1*c* through a contact hole. The third data signal DATA3 may be transmitted to the first terminal S2*c* of the third data write transistor T2*c* through the third data line DL3 and the (1-3)-th bridge electrode BR1*c* connected thereto.

The first vertical power line ELVDDL2 may transmit the first power voltage ELVDD. The first vertical power line ELVDDL2 may include a (1-1)-th vertical power line ELVDDL2*a*, a (1-2)-th vertical power line ELVDDL2*b*, and a (1-3)-th vertical power line ELVDDL2*c*.

The (1-1)-th vertical power line ELVDDL2*a* may be connected to the first horizontal power line ELVDDL1 through a contact hole in an area where the first sub-pixel circuit SPC1 is provided. The (1-2)-th vertical power line ELVDDL2*b* may be connected to the first horizontal power line ELVDDL1 through a contact hole in an area where the second sub-pixel circuit SPC2 is provided. The (1-3)-th vertical power line ELVDDL2*c* may be connected to the first horizontal power line ELVDDL1 through a contact hole in an area where the third sub-pixel circuit SPC3 is provided.

The anode bridge electrode ABR may include a first anode bridge electrode ABRa, a second anode bridge electrode ABRb, and a third anode bridge electrode ABRc.

The first anode bridge electrode ABRa may be connected to the (7-1)-th bridge electrode BR7*a* through a contact hole. The first anode bridge electrode ABRa may be connected to the first anode electrode AE1.

The second anode bridge electrode ABRb may be connected to the (7-2)-th bridge electrode BR7*b* through a contact hole. The second anode bridge electrode ABRb may be connected to the second anode electrode AE2.

The third anode bridge electrode ABRc may be connected to the (7-3)-th bridge electrode BR7*c* through a contact hole. The third anode bridge electrode ABRc may be connected to the third anode electrode AE3.

Figure 15:
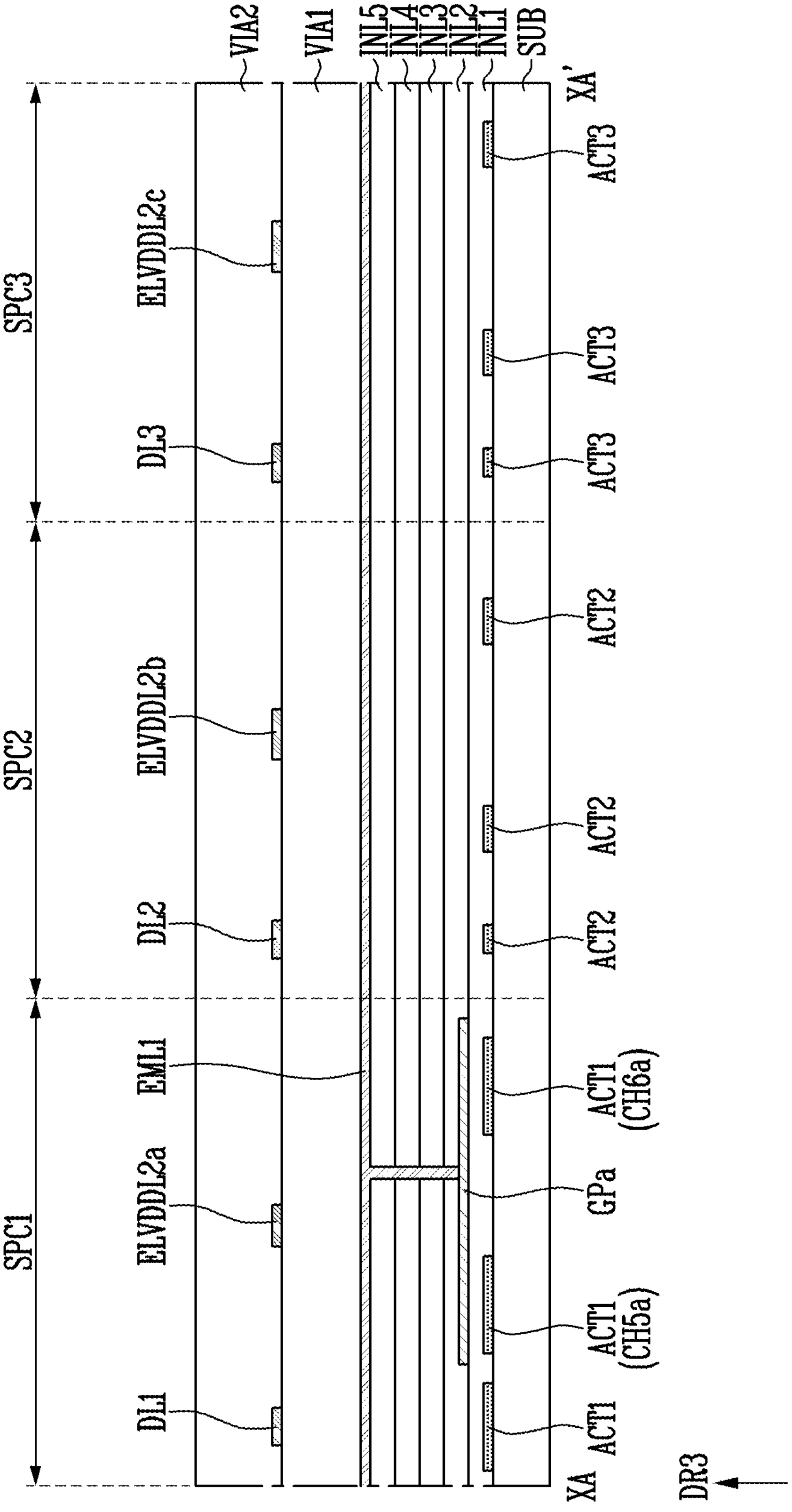
FIG. 15 is a cross-sectional view taken along the line XA-XA' of FIG. 14.
Figure 16:
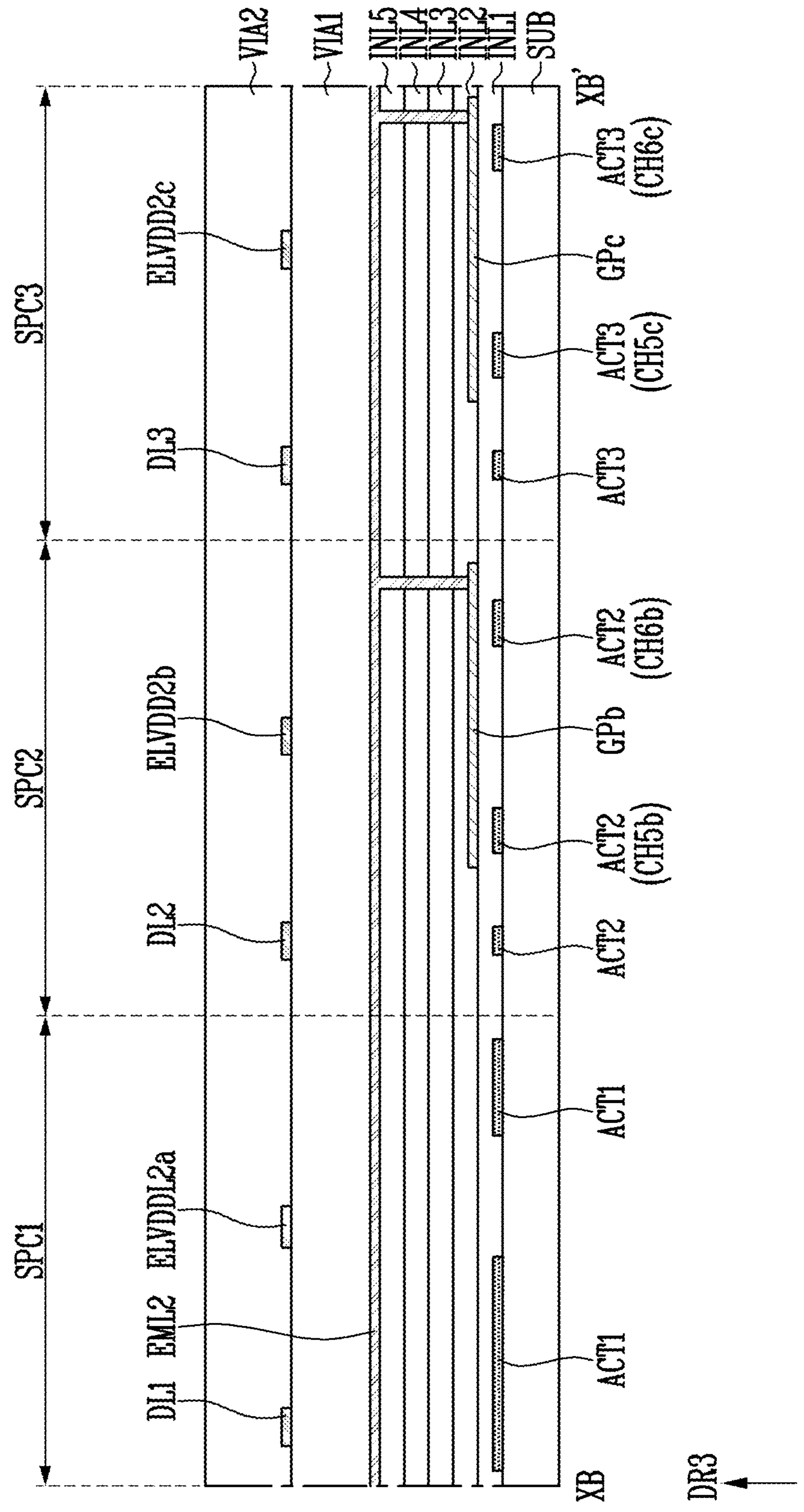
FIG. 16 is a cross-sectional view taken along the line XB-XB' of FIG. 14.

FIG. 15 is a cross-sectional view taken along the line XA-XA' of FIG. 14. FIG. 16 is a cross-sectional view taken along the line XB-XB' of FIG. 14.

Referring to FIGS. 15 and 16, the first emission control signal line EML1 may be connected to the first emission control gate electrode GPa, and the second emission control signal line EML2 may be connected to the second and third emission control gate electrodes GPb and GPc.

The first emission control signal line EML1 may not be connected to the second and third emission control gate electrodes GPb and GPc, and the second emission control signal line EML2 may not be connected to the first emission control gate electrode GPa.

Accordingly, the first emission control signal EM1 may be transmitted to the first sub-pixel circuit SPC1 through the first emission control signal line EML1 and the second emission control signal EM2 different from the first emission control signal EM1 may be transmitted to the second and third sub-pixel circuits SPC2 and SPC3 through the second emission control signal line EML2, to correspond to an optimal driving characteristic of the first to third sub-pixels SP1, SP2, and SP3.

Figure 17:
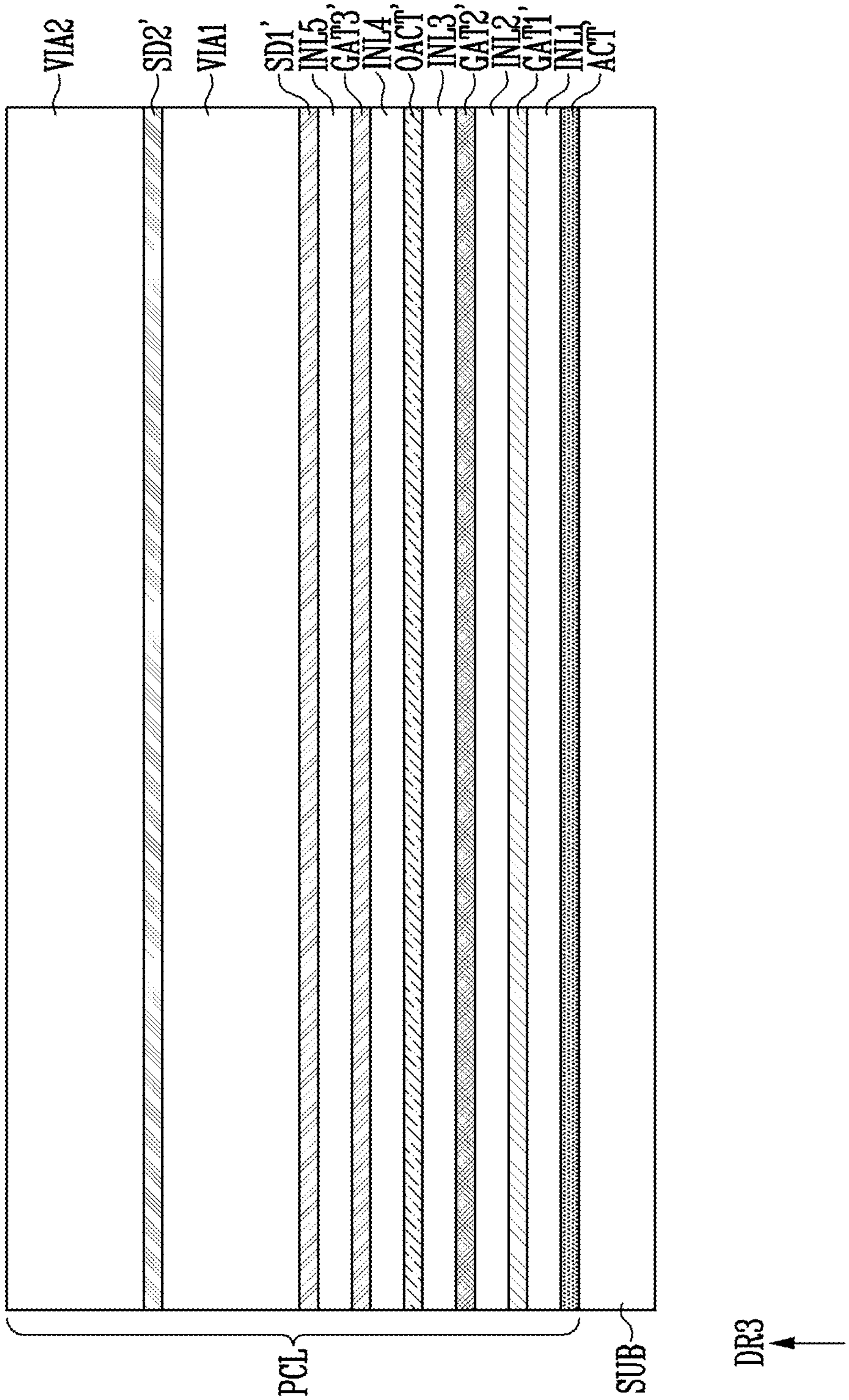
FIG. 17 is a cross-sectional view illustrating another embodiment of the pixel circuit layer included in the pixel of FIG. 6.

FIG. 17 is a cross-sectional view illustrating another embodiment of the pixel circuit layer included in the pixel of FIG. 6.

Hereinafter, in describing another embodiment of the pixel circuit layer PCL, a difference compared to an embodiment of the pixel circuit layer PCL described with reference to FIG. 7 is mainly described, and a part omitted from the description is replaced with the content described above.

Referring to FIG. 17, the pixel circuit layer PCL may include a semiconductor pattern layer ACT', a first insulating layer INL1, a first gate conductive layer GAT1', a second insulating layer INL2, a second gate conductive layer GAT2', a third insulating layer INL3, an oxide semiconductor pattern layer OACT', a fourth insulating layer INL4, a third gate conductive layer GAT3', a fifth insulating layer INL5, a first SD conductive layer SD1', a first via insulating layer VIA1, a second SD conductive layer SD2', and a second via insulating layer VIA2 sequentially stacked in along the third direction DR3.

The first to third gate conductive layers GAT1', GAT2', and GAT3', and the first and second SD conductive layers SD1' and SD2' may include a conductive material. The semiconductor pattern layer ACT' may include a silicon semiconductor (for example, LTPS). The oxide semiconductor pattern layer OACT' may include an oxide semiconductor (for example, LTPO). If necessary, two or more components of the first to third gate conductive layers GAT1', GAT2', and GAT3', the first and second SD conductive layers SD1' and SD2', the semiconductor pattern layer ACT', and the oxide semiconductor pattern layer OACT' may be connected to each other through a contact hole formed in the first to fifth insulating layers INL1, INL2, INL3, INL4, and INL5 and the first and second via insulating layers VIA1 and VIA2.

FIGS. 18-24 are plan views illustrating the pixel circuit layer of FIG. 17. Hereinafter, in describing the pixel circuit layer of FIG. 17, a difference compared to the pixel circuit layer described with reference to FIGS. 7-16 is mainly described, and a part omitted from the description is replaced with the content described above.

Figure 18:
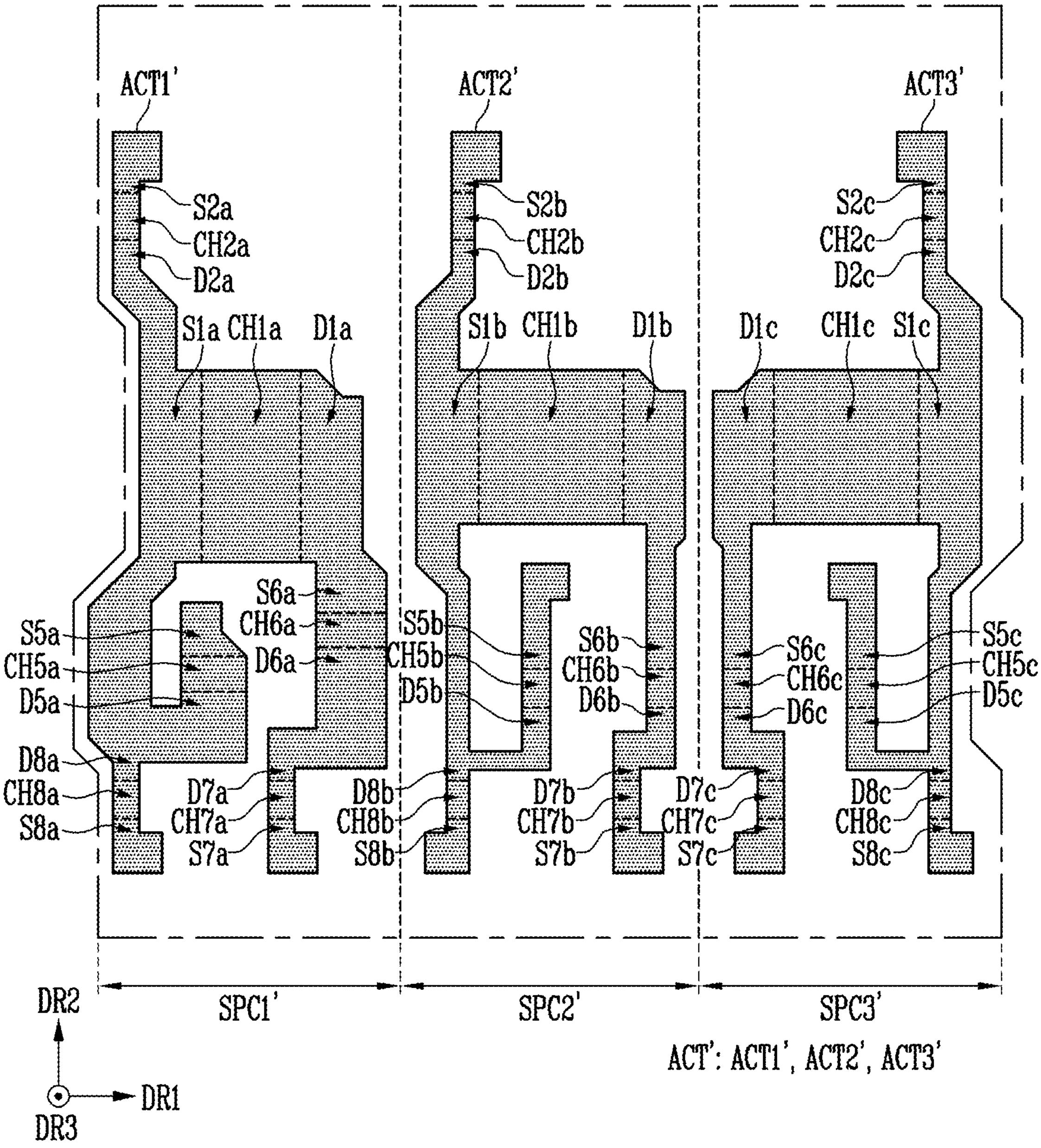
FIGS. 18-24 are plan views illustrating the pixel circuit layer of FIG. 17.

Referring to FIG. 18, patterns implemented with a semiconductor pattern layer ACT' are shown.

The semiconductor pattern layer ACT' may include first to third semiconductor patterns ACT1', ACT2', and ACT3'.

The first semiconductor pattern ACT1' may be disposed in an area where a first sub-pixel circuit SPC1' is provided. The second semiconductor pattern ACT2' may be disposed in an area where a second sub-pixel circuit SPC2' is provided. The third semiconductor pattern ACT3' may be disposed in an area where a third sub-pixel circuit SPC3' is provided.

The first semiconductor pattern ACT1' may include first, second, and fifth to eighth channel areas CH1*a*, CH2*a*, CH5*a*, CH6*a*, CH7*a*, and CH8*a*. The first, second, and fifth to eighth channel areas CH1*a*, CH2*a*, CH5*a*, CH6*a*, CH7*a*, CH8*a* may function as channels of the first, second, and fifth to eighth transistors T1*a*, T2*a*, T5*a*, T6*a*, T7*a*, and T8*a* included in the first sub-pixel circuit SPC1'.

Areas excluding the first, second, and fifth to eighth channel areas CH1*a*, CH2*a*, CH5*a*, CH6*a*, CH7*a*, and CH8*a* in the first semiconductor pattern ACT1' may be conductive areas doped with an impurity. These areas may function as terminals of transistors or lines connecting them to each other.

The second semiconductor pattern ACT2' may include first, second, and fifth to eighth channel areas CH1*b*, CH2*b*, CH5*b*, CH6*b*, CH7*b*, and CH8*b*. The first, second, and fifth to eighth channel areas CH1*b*, CH2*b*, CH5*b*, CH6*b*, CH7*b*, and CH8*b* may function as channels of the first, second, and fifth to eighth transistors T1*b*, T2*b*, T5*b*, T6*b*, T7*b*, and T8*b* included in the second sub-pixel circuit SPC2'.

Areas excluding the first, second, and fifth to eighth channel areas CH1*b*, CH2*b*, CH5*b*, CH6*b*, CH7*b*, and CH8*b* in the second semiconductor pattern ACT2' may be conductive areas. These areas may function as terminals of transistors or lines connecting them to each other.

The third semiconductor pattern ACT3' may include first, second, and fifth to eighth channel areas CH1*c*, CH2*c*, CH5*c*, CH6*c*, CH7*c*, and CH8*c*. The first, second, and fifth to eighth channel areas CH1*c*, CH2*c*, CH5*c*, CH6*c*, CH7*c*, and CH8*c* may function as channels of the first, second, and fifth to eighth transistors T1*c*, T2*c*, T5*c*, T6*c*, T7*c*, and T8*c* included in the third sub-pixel circuit SPC3'.

Areas excluding the first, second, and fifth to eighth channel areas CH1*c*, CH2*c*, CH5*c*, CH6*c*, CH7*c*, and CH8*c* in the third semiconductor pattern ACT3' may be conductive areas. These areas may function as terminals of transistors or lines connecting them to each other.

The description of the channel width and the channel length described with reference to FIG. 8 may be applied substantially identically to the semiconductor pattern layer ACT' shown in FIG. 18.

Unlike the semiconductor pattern layer ACT described with reference to FIG. 8, the semiconductor pattern layer ACT' shown in FIG. 18 may have shape in which the second semiconductor pattern ACT2' and the third semiconductor pattern ACT3' are substantially symmetrical to each other. That is, the semiconductor pattern layer ACT' configuring the second and third sub-pixel circuits SPC2' and SPC3' may be implemented as a flip type.

Figure 19:
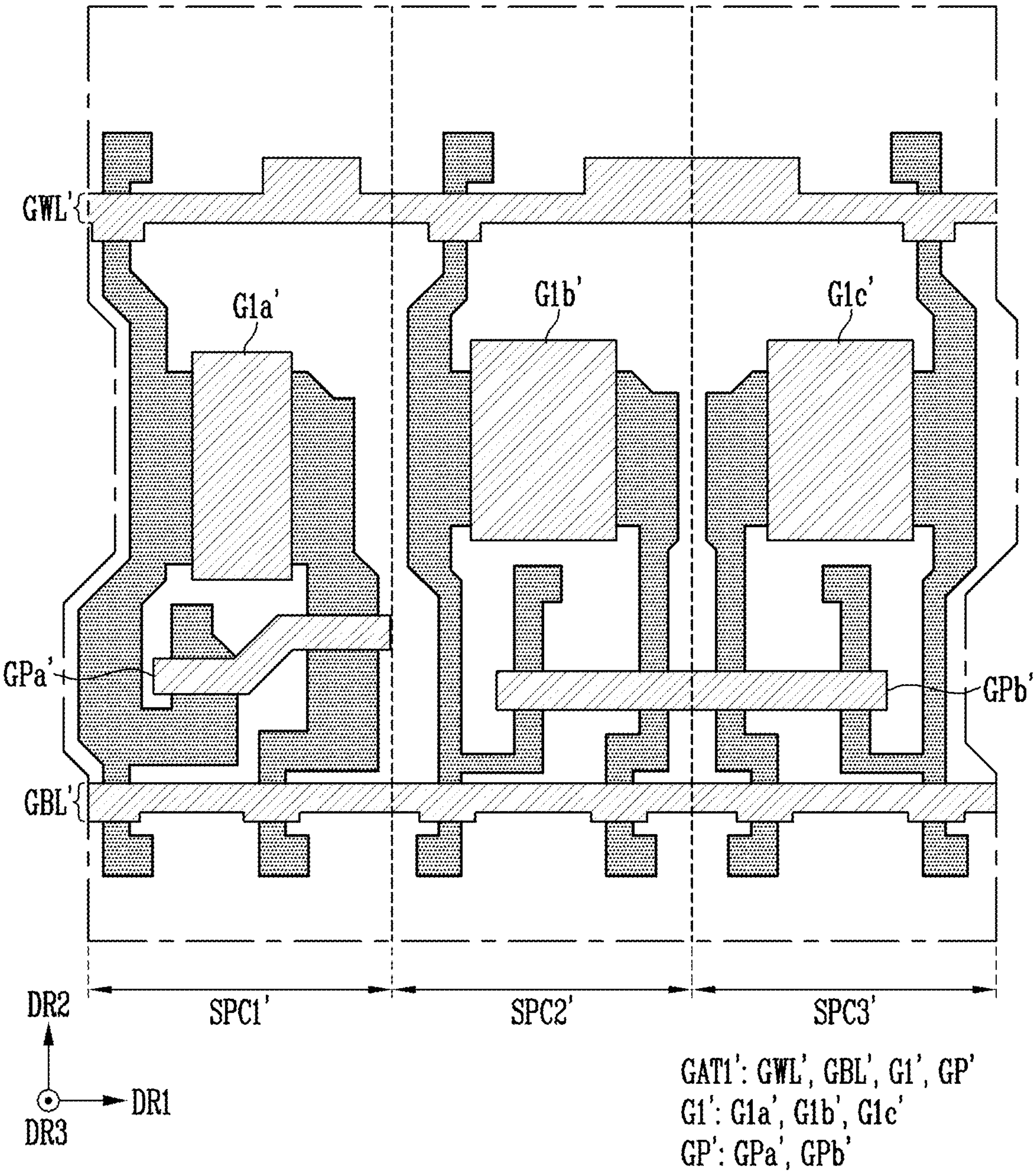

Referring to FIG. 19, patterns implemented with the first gate conductive layer GAT1' and the semiconductor pattern layer ACT' described with reference to FIG. 18 are shown.

The first gate conductive layer GAT1' may include a first gate line GWL', a fourth gate line GBL', a first gate electrode pattern G1', and an emission control gate electrode pattern GP'.

The first gate line GWL' and the fourth gate line GBL' may be described similarly to the first gate line GWL and the fourth gate line GBL described with reference to FIG. 9. Therefore, a description of an overlapping content is omitted.

The first gate electrode pattern G1' may include a first driving gate electrode G1*a*', a second driving gate electrode G1*b*', and a third driving gate electrode G1*c*'. The first gate electrode pattern G1' may be described similarly to the first gate electrode pattern G1 described with reference to FIG. 9. Therefore, a description of an overlapping content is omitted.

The emission control gate electrode pattern GP' may include a first emission control gate electrode GPa' and a second emission control gate electrode GPb'.

The first emission control gate electrode GPa' may be described similarly to the first emission control gate electrode GPa described with reference to FIG. 9. Therefore, a description of an overlapping content is omitted.

The second emission control gate electrode GPb' may overlap the second and third semiconductor patterns ACT2' and ACT3' on a plane.

A portion of the second emission control gate electrode GPb' that overlaps the fifth channel area CH5*b* of the second semiconductor pattern ACT2' on a plane may function as the gate electrode of the (2-2)-th emission control transistor T5*b*.

A portion of the second emission control gate electrode GPb' that overlaps the sixth channel area CH6*b* of the second semiconductor pattern ACT2' on a plane may function as the gate electrode of the (2-1)-th emission control transistor T6*b*.

A portion of the second emission control gate electrode GPb' that overlaps the fifth channel area CH5*c* of the third semiconductor pattern ACT3' on a plane may function as the gate electrode of the (3-2)-th emission control transistor T6*c*.

A portion of the second emission control gate electrode GPb' that overlaps the sixth channel area CH6*c* of the third semiconductor pattern ACT3' on a plane may function as the gate electrode of the (3-1)-th emission control transistor T6*c*.

Figure 20:
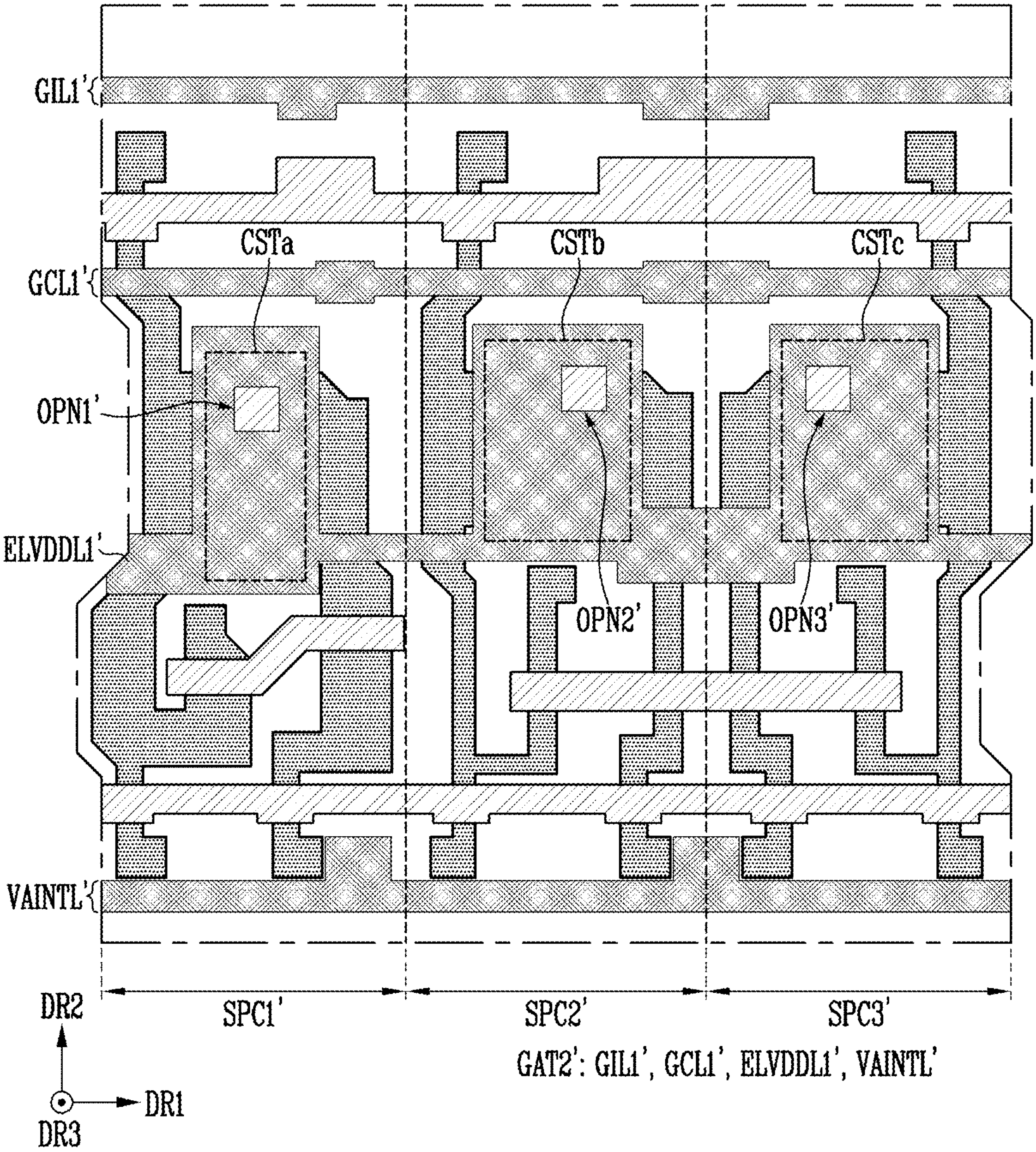

Referring to FIG. 20, patterns implemented with the second gate conductive layer GAT2', and the semiconductor pattern layer ACT' and the first gate conductive layer GAT1' described with reference to FIGS. 18 and 19 are shown.

The second gate conductive layer GAT2' may include a (3-1)-th gate line GIL1', a (2-1)-th gate line GCL1', a first horizontal power line ELVDDL1', and an anode initialization line VAINTL'.

The (3-1)-th gate line GIL1', the (2-1)-th gate line GCL1', and the anode initialization line VAINTL' may be described similarly to the (3-1)-th gate line GIL1, the (2-1)-th gate line GCL1, and the anode initialization line VAINTL described with reference to FIG. 10. Therefore, a description of an overlapping content is omitted.

The first horizontal power line ELVDDL1' may be described similarly to the first horizontal power line ELVDDL1 described with reference to FIG. 10. For example, the first horizontal power line ELVDDL1' may overlap the first gate electrode pattern G1' on a plane to form the first to third storage capacitors CSTa, CSTb, and CSTc.

The first horizontal power line ELVDDL1' may include first to third openings OPN1', OPN2', and OPN3' overlapping the first to third driving gate electrodes G1*a*', G1*b*', and G1*c*' on a plane.

Figure 21:
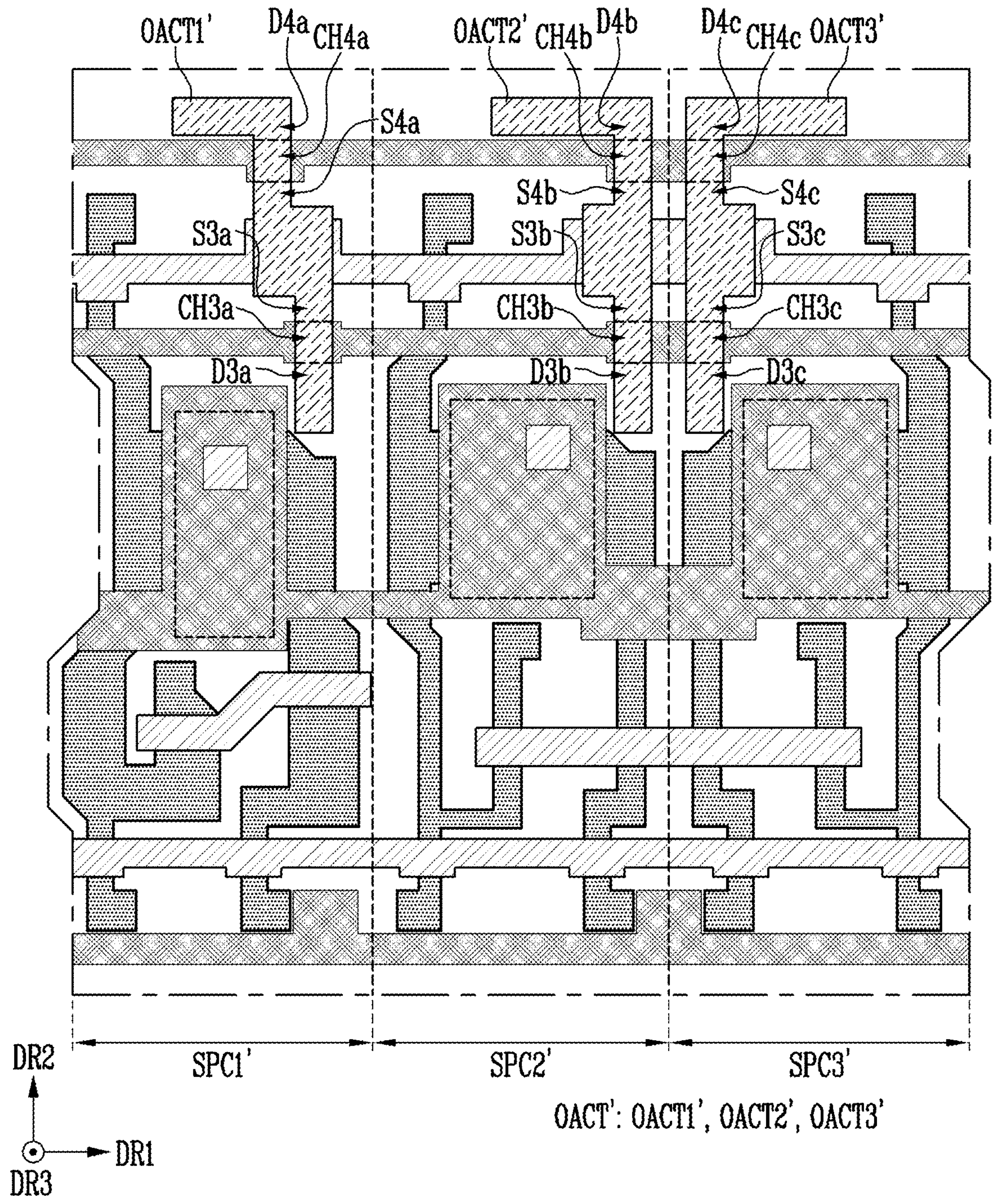

Referring to FIG. 21, patterns implemented with the oxide semiconductor pattern layer OACT', and the semiconductor pattern layer ACT' and the first and second gate conductive layers GAT1 and GAT2' described with reference to FIGS. 18-20 are shown.

The oxide semiconductor pattern layer OACT' may include first to third oxide semiconductor patterns OACT1', OACT2', and OACT3'.

The first oxide semiconductor pattern OACT1' may be disposed in an area where the first sub-pixel circuit SPC1' is provided. The second oxide semiconductor pattern OACT2' may be disposed in an area where the second sub-pixel circuit SPC2' is provided. The third oxide semiconductor pattern OACT3' may be disposed in an area where the third sub-pixel circuit SPC3' is provided.

The first oxide semiconductor pattern OACT1' may include the third and fourth channel areas CH3*a* and CH4*a*. The third and fourth channel areas CH3*a* and CH4*a* may function as channels of the third and fourth transistors T3*a* and T4*a* of the first sub-pixel circuit SPC1'.

Areas excluding the third and fourth channel areas CH3*a* and CH4*a* in the first oxide semiconductor pattern OACT1' may be conductive areas. These areas may function as terminals of transistors or lines connecting them to each other.

The second oxide semiconductor pattern OACT2' may include the third and fourth channel areas CH3*b* and CH4*b*. The third and fourth channel areas CH3*b* and CH4*b* may function as channels of the third and fourth transistors T3*b* and T4*b* of the second sub-pixel circuit SPC2'.

Areas excluding the third and fourth channel areas CH3*b* and CH4*b* in the second oxide semiconductor pattern OACT2' may be conductive areas. These areas may function as terminals of transistors or lines connecting them to each other.

The third oxide semiconductor pattern OACT3' may include the third and fourth channel areas CH3*c* and CH4*c*. The third and fourth channel areas CH3*c* and CH4*c* may function as channels of the third and fourth transistors T3*c* and T4*c* of the third sub-pixel circuit SPC3'.

Areas excluding the third and fourth channel areas CH3*c* and CH4*c* in the third oxide semiconductor pattern OACT3' may be conductive areas. These areas may function as terminals of transistors or lines connecting them to each other.

Differently from the oxide semiconductor pattern layer OACT described with reference to FIG. 11, the oxide semiconductor pattern layer OACT' shown in FIG. 21 may have a shape in which the second oxide semiconductor pattern OACT2' and the third oxide semiconductor pattern OACT3' are substantially symmetrical to each other. That is, the oxide semiconductor pattern layer OACT' configuring the second and third sub-pixel circuits SPC2' and SPC3' may be implemented as a flip type.

Figure 22:
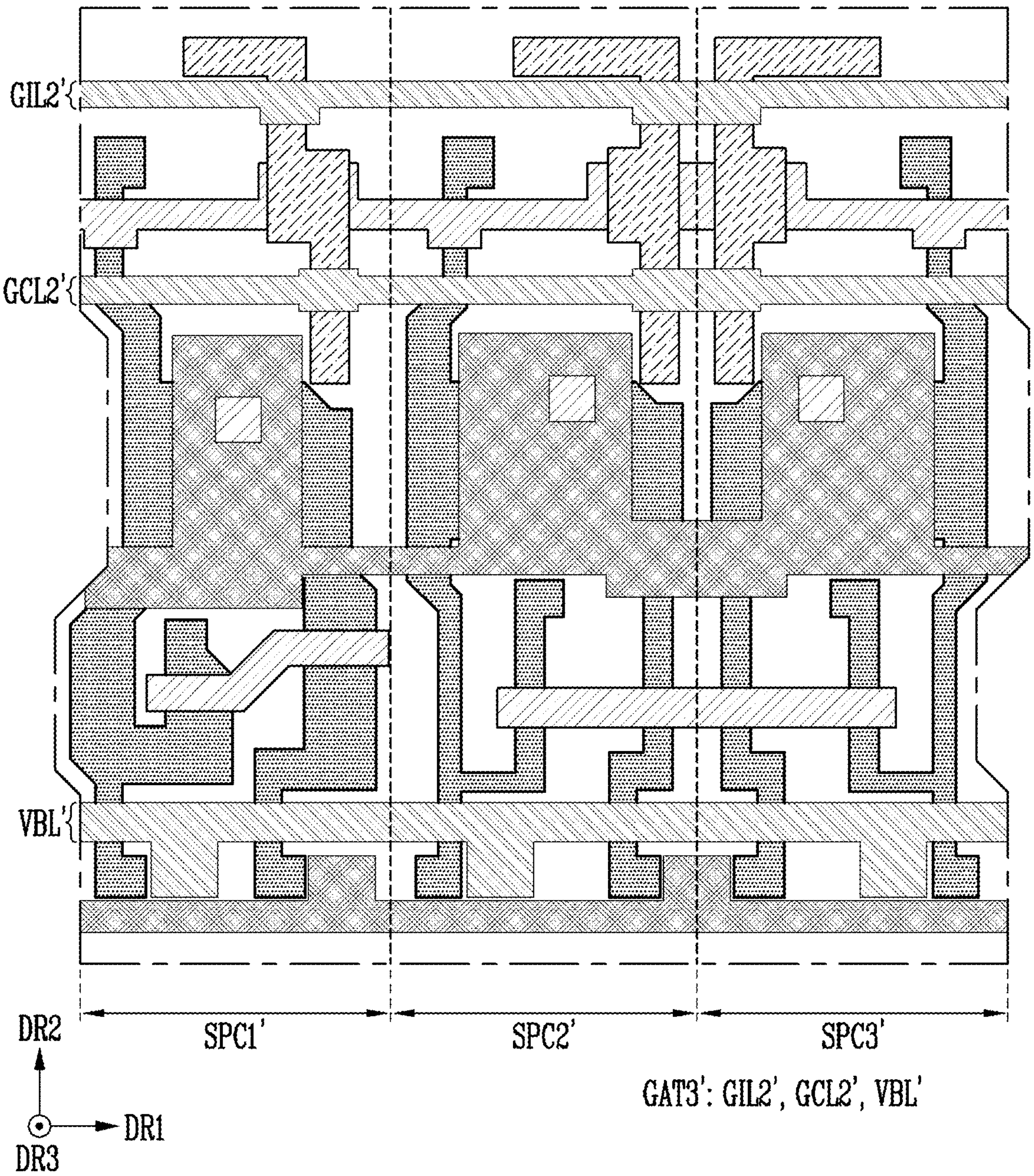

Referring to FIG. 22, patterns implemented with the third gate conductive layer GAT3', and the semiconductor pattern layer ACT', the first and second gate conductive layers GAT1' and GAT2', and the oxide semiconductor pattern layer OACT' described with reference to FIGS. 18-21 are shown.

The third gate conductive layer GAT3' may include a (3-2)-th gate line GIL2', a (2-2)-th gate line GCL2', and a bias control line VBL'.

The (3-2)-th gate line GIL2', the (2-2)-th gate line GCL2', and the bias control line VBL' may be described similarly to the (3-2)-th gate line GIL2, the (2-2)-th gate line GCL2, and the bias control line VBL described with reference to FIG. 11. Therefore, a description of an overlapping content is omitted.

Figure 23:
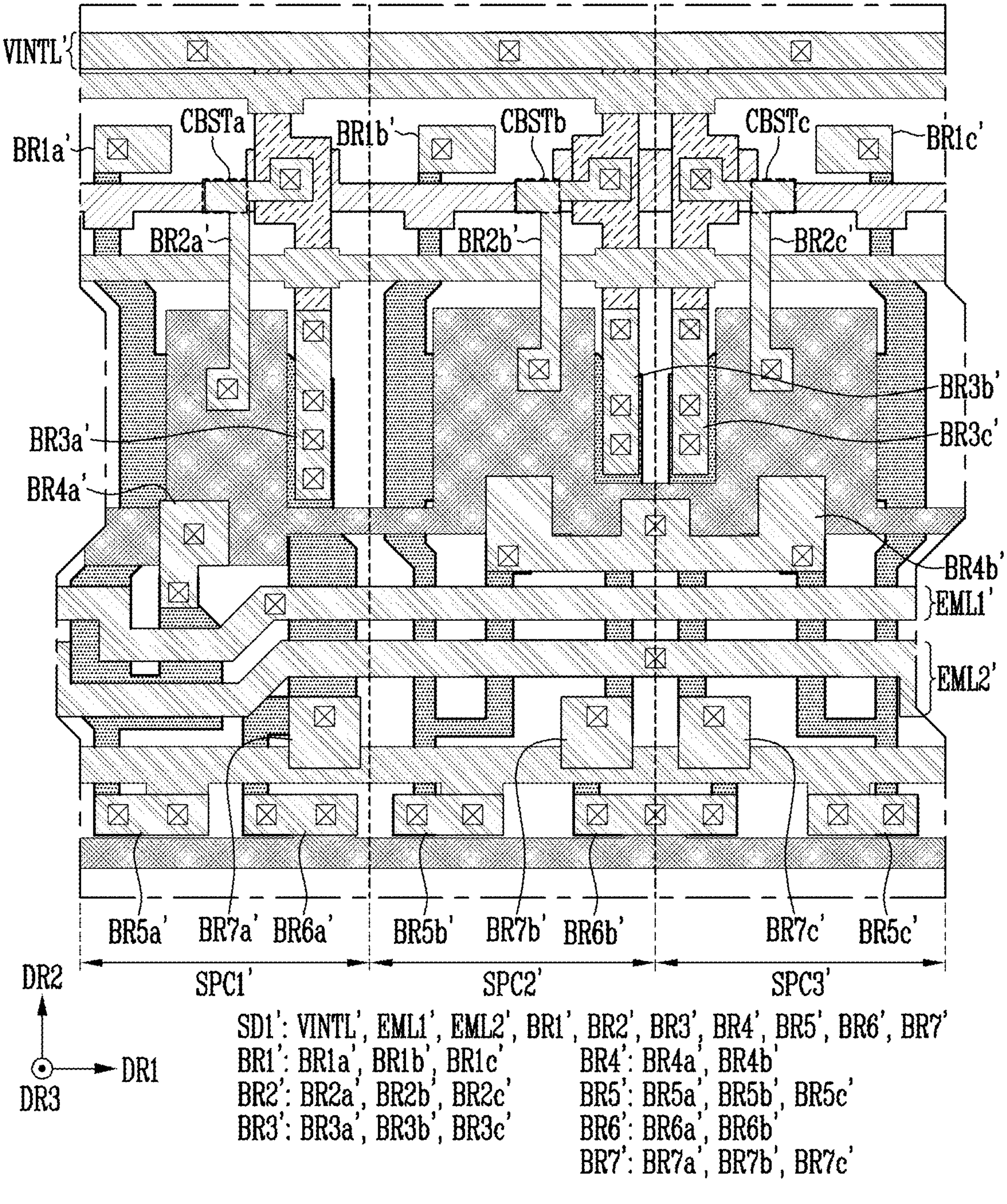

Referring to FIG. 23, patterns implemented with the first SD conductive layer SD1', and the semiconductor pattern layer ACT', the first to third gate conductive layers GAT1', GAT2', and GAT3', and the oxide semiconductor pattern layer OACT' described with reference to FIGS. 18-22 are shown.

The first SD conductive layer SD1' may include an initialization line VINTL', a first emission control signal line EML1', a second emission control signal line EML2', and first to seventh bridge electrodes BR1', BR2', BR3', BR4', BR5', BR6', and BR7'.

The initialization line VINTL' may be described similarly to the initialization line VINTL described with reference to FIG. 13. Therefore, a description of an overlapping content is omitted.

The first emission control signal line EML1' may be connected to the first emission control gate electrode GPa' through a contact hole.

The second emission control signal line EML2' may be connected to the second emission control gate electrode GPb' through a contact hole.

The first bridge electrode BR1' may include a (1-1)-th bridge electrode BR1*a*', a (1-2)-th bridge electrode BR1*b*', and a (1-3)-th bridge electrode BR1*c*'. The first bridge electrode BR1' may be described similarly to the first bridge electrode BR1 described with reference to FIG. 13. Therefore, a description of an overlapping content is omitted.

The second bridge electrode BR2' may include a (2-1)-th bridge electrode BR2*a*', a (2-2)-th bridge electrode BR2*b*', and a (2-3)-th bridge electrode BR2*c*'. The second bridge electrode BR2' may be described similarly to the second bridge electrode BR2 described with reference to FIG. 13. For example, the (2-1)-th bridge electrode BR2*a*', the (2-2)-th bridge electrode BR2*b*', and the (2-3)-th bridge electrode BR2*c*' may overlap the first gate line GWL' on a plane to form the first to third boosting capacitors CBSTa, CBSTb, and CBSTc. Hereinafter, a description of an overlapping content is omitted.

The third bridge electrode BR3' may include a (3-1)-th bridge electrode BR3*a*', a (3-2)-th bridge electrode BR3*b*', and a (3-3)-th bridge electrode BR3*c*'. The third bridge electrode BR3' may be described similarly to the third bridge electrode BR3 described with reference to FIG. 13. Therefore, a description of an overlapping content is omitted.

The fourth bridge electrode BR4' may include a (4-1)-th bridge electrode BR4*a*' and a (4-2)-th bridge electrode BR4*b*'.

The (4-1)-th bridge electrode BR4*a*' may be described similarly to the (4-1)-th bridge electrode BR4*a* described with reference to FIG. 13. Therefore, a description of an overlapping content is omitted.

The (4-2)-th bridge electrode BR4*b*' may be connected to the second semiconductor pattern ACT2', the third semiconductor pattern ACT3', and the first horizontal power line ELVDDL1' through contact holes. The first power voltage ELVDDL may be transmitted to the first terminal S5*b* of the (2-2)-th emission control transistor T5*b* and the first terminal S5*c* of the (3-2)-th emission control transistor T5*c* through the (4-2)-th bridge electrode BR4*b*'.

The fifth bridge electrode BR5' may include a (5-1)-th bridge electrode BR5*a*', a (5-2)-th bridge electrode BR5*b*', and a (5-3)-th bridge electrode BR5*c*'. The fifth bridge electrode BR5' may be described similarly to the fifth bridge electrode BR5 described with reference to FIG. 13. Therefore, a description of an overlapping content is omitted.

The sixth bridge electrode BR6' may include a (6-1)-th bridge electrode BR6*a*' and a (6-2)-th bridge electrode BR6*b*'.

The (6-1)-th bridge electrode BR6*a*' may be described similarly to the (6-1)-th bridge electrode BR6*a* described with reference to FIG. 13. Therefore, a description of an overlapping content is omitted.

The (6-2)-th bridge electrode BR6*b*' may be connected to the second semiconductor pattern ACT2', the third semiconductor pattern ACT3', and the anode initialization line VAINTL' through contact holes. The anode initialization voltage VAINT may be transmitted to the first terminal S7*b* of the second anode initialization transistor T7*b* and the first terminal S7*c* of the third anode initialization transistor T7*c* through the (6-2)-th bridge electrode BR6*b*'.

The seventh bridge electrode BR7' may include a (7-1)-th bridge electrode BR7*a*', a (7-2)-th bridge electrode BR7*b*', and a (7-3)-th bridge electrode BR7*c*'. The seventh bridge electrode BR7' may be described similarly to the seventh bridge electrode BR7 described with reference to FIG. 13. Therefore, a description of an overlapping content is omitted.

Figure 24:
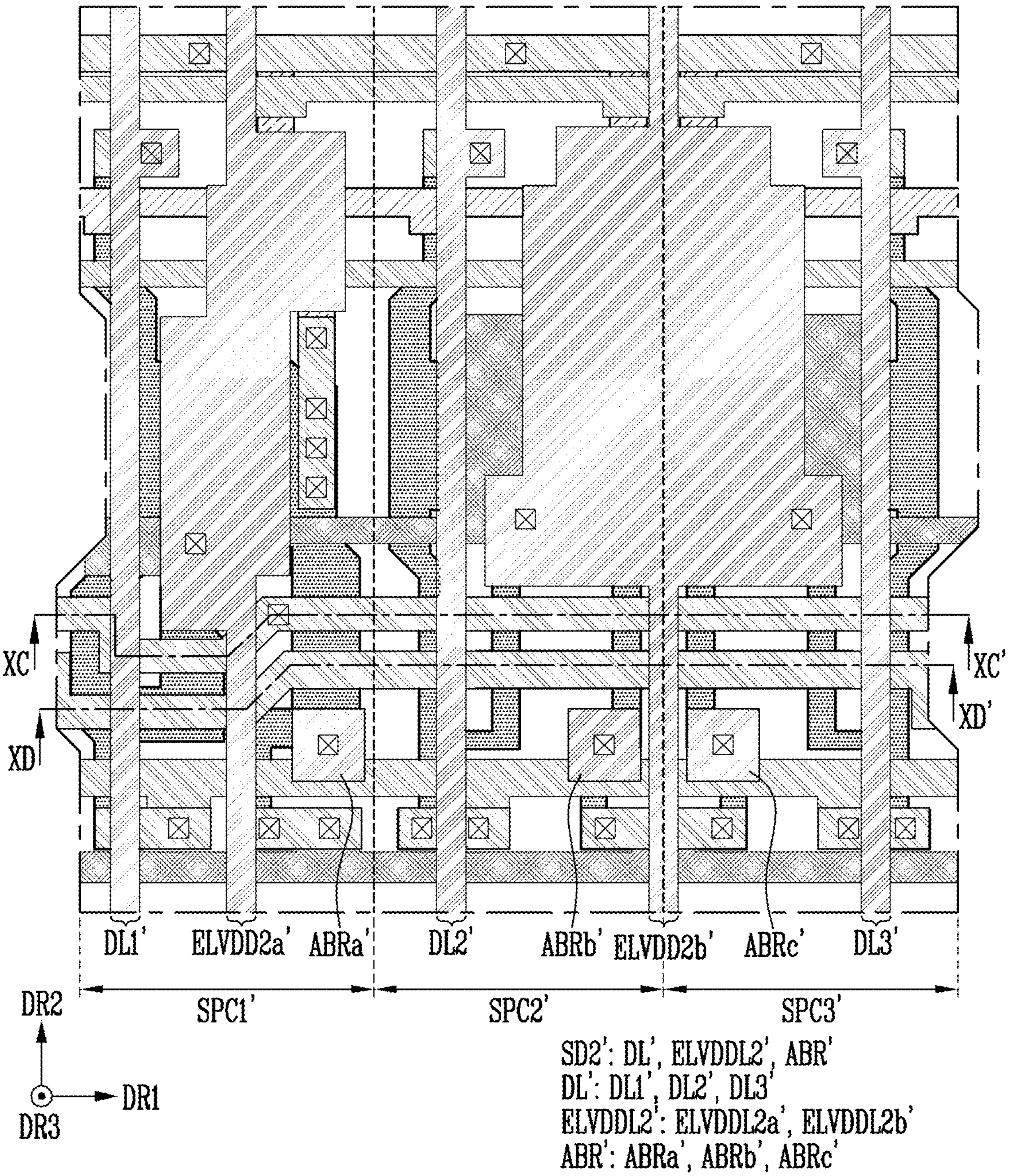

Referring to FIG. 24, patterns implemented with the second SD conductive layer SD2', and the semiconductor pattern layer ACT', the first to third gate conductive layers GAT1', GAT2', and GAT3', the oxide semiconductor pattern layer OACT', and the first SD conductive layer SD1' described with reference to FIGS. 18-23 are shown.

The second SD conductive layer SD2' may include a data line DL', a first vertical power line ELVDDL2', and an anode bridge electrode ABR'.

The data line DL' may include a first data line DL1', a second data line DL2', and a third data line DL3'. The data line DL' may be described similarly to the data line DL described with reference to FIG. 14. Therefore, a description of an overlapping content is omitted.

The first vertical power line ELVDDL2' may transmit the first power voltage ELVDD. The first vertical power line ELVDDL2' may include a (1-1)-th vertical power line ELVDDL2a' and a (1-2)-th vertical power line ELVDDL2b'.

The (1-1)-th vertical power line ELVDDL2a' may be connected to the first horizontal power line ELVDDL1' through a contact hole in an area where the first sub-pixel circuit SPC1' is provided.

The (1-2)-th vertical power line ELVDDL2b' may be connected to the first horizontal power line ELVDDL1' through a contact hole in an area where the second sub-pixel circuit SPC2' is provided, and may be connected to the first horizontal power line ELVDDL1' through another contact hole in an area where the third sub-pixel circuit SPC3 is provided.

The anode bridge electrode ABR' may include a first anode bridge electrode ABRa', a second anode bridge electrode ABRb', and a third anode bridge electrode ABRc'. The anode bridge electrode ABR' may be described similarly to the first anode bridge electrode ABR described with reference to FIG. 14. Therefore, a description of an overlapping content is omitted.

Figure 25:
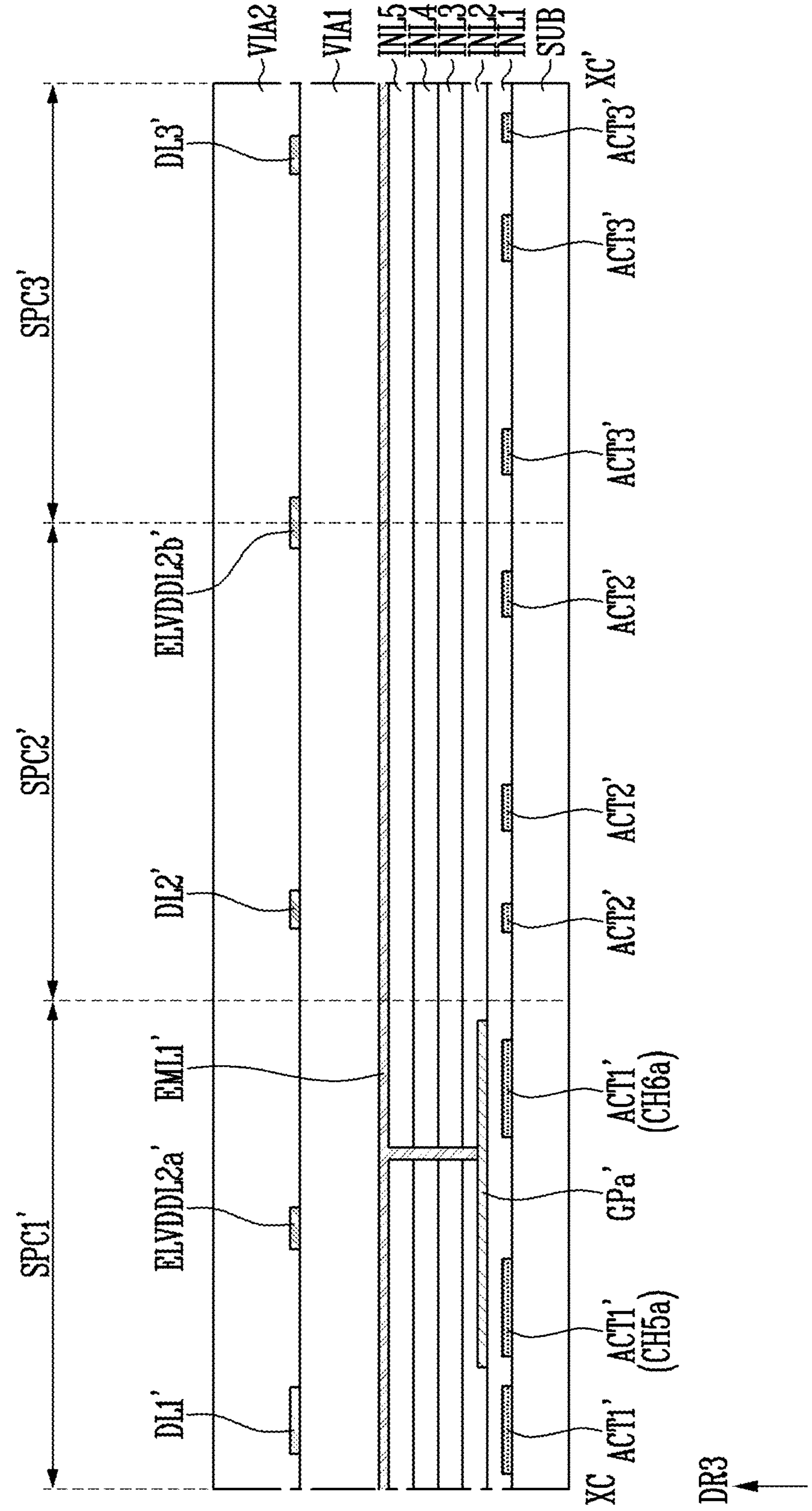
FIG. 25 is a cross-sectional view taken along the line XC-XC' of FIG. 24.
Figure 26:
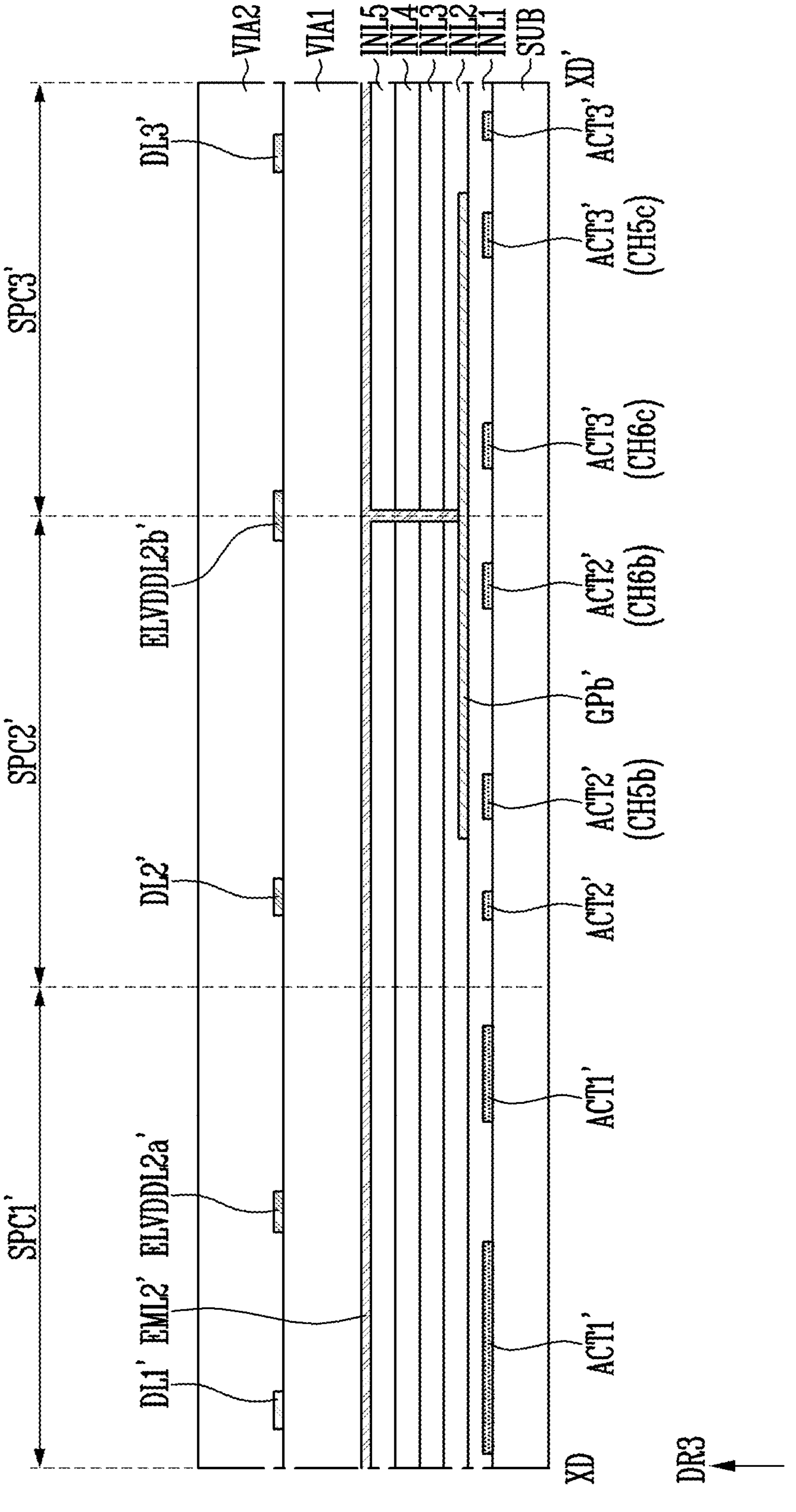
FIG. 26 is a cross-sectional view taken along the line XD-XD' of FIG. 24.

FIG. 25 is a cross-sectional view taken along the line XC-XC' of FIG. 24. FIG. 26 is a cross-sectional view taken along the line XD-XD' of FIG. 24.

Referring to FIGS. 25 and 26, the first emission control signal line EML1' may be connected to the first emission control gate electrode GPa', and the second emission control signal line EML2' may be connected to the second emission control gate electrode GPb'.

The first emission control signal line EML1' may not be connected to the second emission control gate electrode GPb', and the second emission control signal line EML2' may not be connected to the first emission control gate electrode GPa'.

Accordingly, the first emission control signal EM1 may be transmitted to the first sub-pixel circuit SPC1' through the first emission control signal line EML1' and the second emission control signal EM2 different from the first emission control signal EM1 may be transmitted to the second and third sub-pixel circuits SPC2' and SPC3' through the second emission control signal line EML2', to correspond to an optimal driving characteristic of the first to third sub-pixels SP1, SP2, and SP3.

Figure 27:
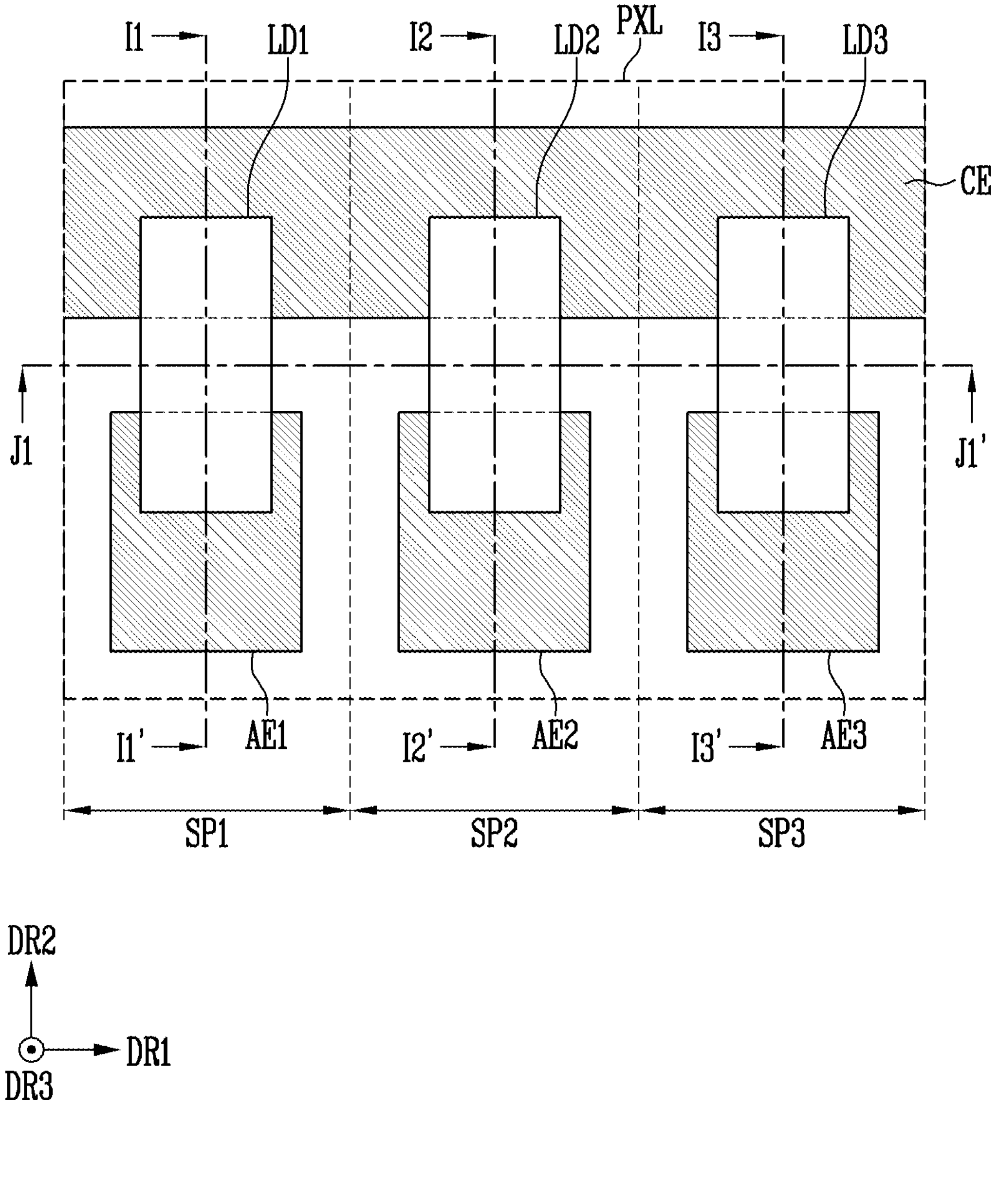
FIG. 27 is a plan view illustrating an embodiment of one pixel from among the pixels included in the display panel of FIG. 3.

FIG. 27 is a plan view illustrating an embodiment of one pixel from among the pixels included in the display panel of FIG. 3.

Referring to FIG. 27, the pixel PXL may include the first to third sub-pixels SP1, SP2, and SP3. The first to third sub-pixels SP1, SP2, and SP3 may be arranged along the first direction DR1. However, an arrangement of the first to third sub-pixels SP1, SP2, and SP3 is not limited thereto. The first to third sub-pixels SP1, SP2, and SP3 may be arranged variously according to one or more embodiments. For example, the first to third sub-pixels SP1, SP2, and SP3 may be arranged in a zigzag pattern.

The first to third anode electrodes AE1, AE2, and AE3 may be disposed in the first to third sub-pixels SP1, SP2, and SP3, respectively. The first anode electrode AE1 may be connected to the first sub-pixel circuit SPC1 or SPC1' of the first sub-pixel SP1. The second anode electrode AE2 may be connected to the second sub-pixel circuit SPC2 or SPC2' of the second sub-pixel SP2. The third anode electrode AE3 may be connected to the third sub-pixel circuit SPC3 or SPC3' of the third sub-pixel SP3.

The cathode electrode CE may be spaced (e.g., spaced apart) from the first to third anode electrodes AE1, AE2, and AE3. In one or more embodiments, the cathode electrode CE may be disposed in (e.g., at) the same layer as the first to third anode electrodes AE1, AE2, and AE3. In this case, the cathode electrode CE may be spaced (e.g., spaced apart) from the first to third anode electrodes AE1, AE2, and AE3 in the second direction DR2.

In one or more embodiments, the cathode electrode CE may extend in the first direction DR1 and may be used as a common electrode for the pixel PXL and other pixels adjacent to the pixel PXL. In one or more embodiments, the cathode electrode CE may extend not only in the first direction DR1 but also in the second direction DR2 and may be used as the common electrode for all of the sub-pixels SP of FIG. 3. As described above, the cathode electrode CE may have various shapes.

The first to third light emitting elements LD1, LD2, and LD3 may be disposed on the first to third anode electrodes AE1, AE2, and AE3, and the cathode electrode CE. The first light emitting element LD1 may be electrically connected to the first anode electrode AE1 and the cathode electrode CE. The first light emitting element LD1 may be provided as a light emitting element connected to the first sub-pixel circuit SPC1 or SPC1' of the first sub-pixel SP1. The second light emitting element LD2 may be electrically connected to the second anode electrode AE2 and the cathode electrode CE. The second light emitting element LD2 may be provided as a light emitting element connected to the second sub-pixel circuit SPC2 or SPC2' of the second sub-pixel SP2. The third light emitting element LD3 may be electrically connected to the third anode electrode AE3 and the cathode electrode CE. The third light emitting element LD3 may be provided as a light emitting element connected to the third sub-pixel circuit SPC3 or SPC3' of the third sub-pixel SP3.

The first to third light emitting elements LD1, LD2, and LD3 may be inorganic light emitting diodes including an inorganic light emitting material.

Figure 28:
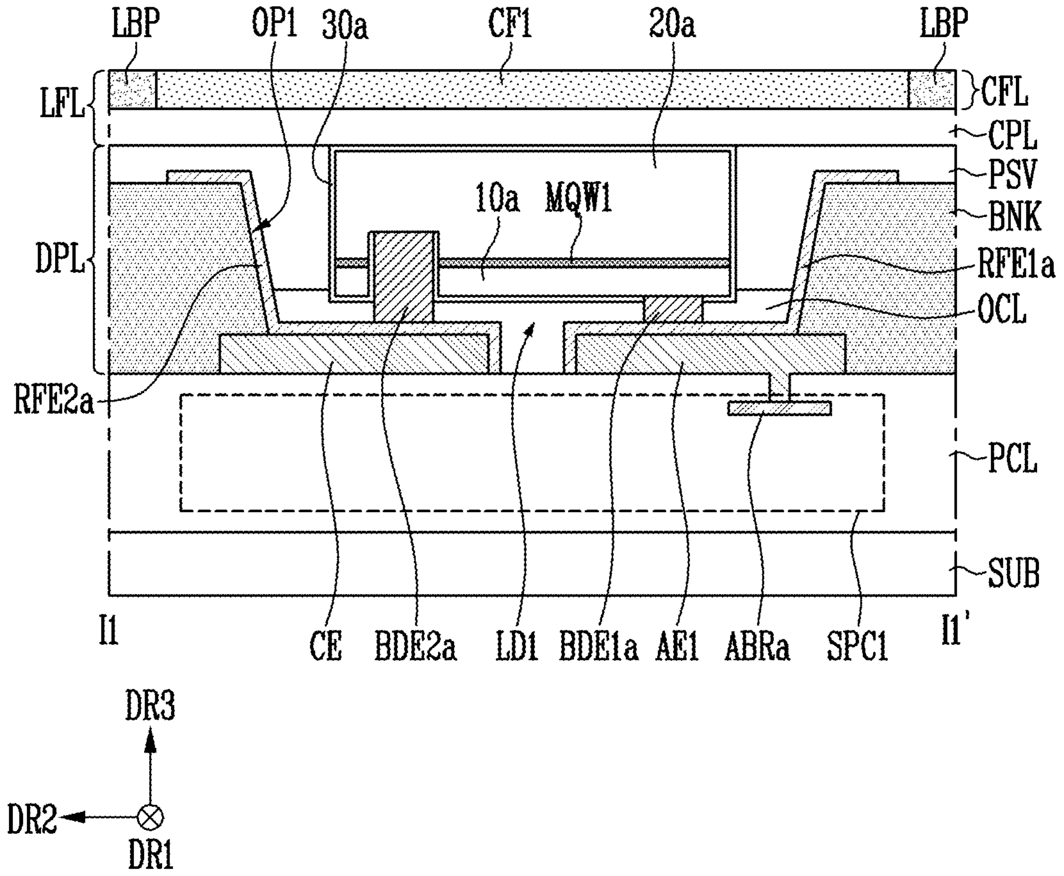
FIG. 28 is a cross-sectional view taken along the line 11-11' of FIG. 27.

FIG. 28 is a cross-sectional view taken along the line 11-11' of FIG. 27. FIG. 28 is a cross-sectional view illustrating the first sub-pixel.

Referring to FIGS. 27 and 28, the pixel circuit layer PCL, the display element layer DPL, and the light functional layer LFL may be sequentially disposed on the substrate SUB.

The pixel circuit layer PCL may be described similarly to that described with reference to FIGS. 6-26. For example, the pixel circuit layer PCL may include various components configuring the first sub-pixel circuit SPC1 or SPC1'.

The display element layer DPL may include the first anode electrode AE1, the cathode electrode CE, a bank layer BNK, a (1-1)-th reflective electrode RFE1a, a (1-2)-th reflective electrode RFE2a, the first light emitting element LD1, an overcoat layer OCL, and a passivation layer PSV.

The first anode electrode AE1 may be disposed on the pixel circuit layer PCL. The first anode electrode AE1 may be connected to the first anode bridge electrode ABRa or ABRa' through a contact hole.

The cathode electrode CE may be disposed on the pixel circuit layer PCL. The cathode electrode CE may be spaced (e.g., spaced apart) from the first anode electrode AE1. The cathode electrode CE may transmit the second power voltage ELVSS.

The bank layer BNK may be disposed on the first anode electrode AE1 and the cathode electrode CE. The bank layer BNK may have a first pixel opening OP1 exposing portions of the first anode electrode AE1 and the cathode electrode CE. The first light emitting element LD1 may be disposed in the first pixel opening OP1 of the bank layer BNK. As described above, the bank layer BNK may be provided as a pixel defining layer that defines an area where the first light emitting element LD1 is positioned.

The bank layer BNK may be configured to include a light blocking material and may serve to prevent light mixing between adjacent sub-pixels. In one or more embodiments, the bank layer BNK may include an organic material. For example, the bank layer BNK may include an organic insulating material such as acryl resin, epoxy resin, phenol resin, polyamide resin, and/or polyimide resin.

The (1-1)-th reflective electrode RFE1*a* may be disposed on an exposed portion of the first anode electrode AE1 and a side surface of the bank layer BNK adjacent thereto. The (1-2)-th reflective electrode RFE2*a* may be disposed on an exposed portion of the cathode electrode CE and a side surface of the bank layer BNK adjacent thereto. The (1-1)-th reflective electrode RFE1*a* and the (1-2)-th reflective electrode RFE2*a* may include conductive materials suitable for reflecting light. Accordingly, emission efficiency of the first light emitting element LD1 may be improved. In one or more embodiments, the (1-1)-th reflective electrode RFE1*a* and the (1-2)-th reflective electrode RFE2*a* may include aluminum (Al), silver (Ag), magnesium (Mg), platinum (Pt), palladium (Pd), gold (Au), nickel (Ni), neodymium (Nd), iridium (Ir), chromium (Cr), titanium (Ti), and/or an alloy of two or more materials selected from them. However, the present disclosure is not limited thereto.

The first light emitting element LD1 may include a (1-1)-th semiconductor layer 10*a*, a first active layer MQW1, a (1-2)-th semiconductor layer 20*a*, a first insulating film 30*a*, a (1-1)-th bonding electrode BDE1*a*, and a (1-2)-th bonding electrode BDE2*a*.

The (1-1)-th semiconductor layer 10*a* may be configured to provide a hole. The (1-1)-th semiconductor layer 10*a* may have a first polarity. For example, the (1-1)-th semiconductor layer 10*a* may include at least one p-type semiconductor layer. For example, the (1-1)-th semiconductor layer 10*a* may include gallium nitride (GaN), aluminum gallium nitride (AlGaN), indium gallium nitride (InGaN), aluminum nitride (AlN), and/or indium nitride (InN), and may be a p-type semiconductor layer doped with a first conductive dopant (or a p-type dopant) such as magnesium (Mg), zinc (Zn), calcium (Ca), strontium (Sr), and/or barium (Ba). However, a material configuring the (1-1)-th semiconductor layer 10*a* is not limited thereto, and various other materials may configure the (1-1)-th semiconductor layer 10*a*. In one or more embodiments of the disclosure, the (1-1)-th semiconductor layer 10*a* may include a gallium nitride (GaN) semiconductor material doped with the first conductive dopant (or the p-type dopant).

The first active layer MQW1 may be disposed on the (1-1)-th semiconductor layer 10*a*. The first active layer MQW1 may be interposed between the (1-1)-th semiconductor layer 10*a* and the (1-2)-th semiconductor layer 20*a* to provide an area where an electron and a hole recombine. As the electron and the hole recombine in the first active layer MQW1, the electron and the hole may transition to a low energy level, and thus light having a wavelength corresponding thereto may be generated. The first active layer MQW1 may be formed as a single or multiple quantum well structure. When the first active layer MQW1 is formed as the multiple quantum well structure, a unit including a barrier layer, a strain reinforcement layer, and a well layer may be repeatedly stacked to form the first active layer MQW1. However, the first active layer MQW1 is not limited to the structure described above.

In one or more embodiments, the first active layer MQW1 may be configured to generate light of a first color. In this case, the first active layer MQW1 may include a material suitable for generating the light of the first color. For example, the first active layer MQW1 may include a barrier layer formed of $Al_{Z1}$GaInP and a well layer formed of $Al_{Z2}$GaInP (Z1>Z2).

The (1-2)-th semiconductor layer 20*a* may be disposed on the first active layer MQW1. The (1-2)-th semiconductor layer 20*a* may be configured to provide an electron. The (1-2)-th semiconductor layer 20*a* may have a second polarity different from the first polarity. For example, the (1-2)-th semiconductor layer 20*a* may include at least one n-type semiconductor layer. For example, the (1-2)-th semiconductor layer 20*a* may include gallium nitride (GaN), aluminum gallium nitride (AlGaN), indium gallium nitride (InGaN), aluminum nitride (AlN), and/or indium nitride (InN), and/or may be an n-type semiconductor layer doped with a second conductive dopant (or an n-type dopant) such as silicon (Si), germanium (Ge), and/or tin (Sn). However, a material configuring the (1-2)-th semiconductor layer 20*a* is not limited thereto, and various other materials may configure the (1-2)-th semiconductor layer 20*a*. In one or more embodiments of the present disclosure, the (1-2)-th semiconductor layer 20*a* may include a gallium nitride (GaN) semiconductor material doped with the second conductive dopant (or the n-type dopant).

The (1-1)-th bonding electrode BDE1*a* may be bonded and fixed on the first anode electrode AE1. The (1-1)-th bonding electrode BDE1*a* may be electrically connected to the (1-1)-th semiconductor layer 10*a* and the (1-1)-th reflective electrode RFE1*a*. The (1-1)-th semiconductor layer 10*a* and the first anode electrode AE1 may be electrically connected through the (1-1)-th bonding electrode BDE1*a*. In one or more embodiments, the (1-1)-th bonding electrode BDE1*a* may include a eutectic metal.

The (1-2)-th bonding electrode BDE2*a* may be bonded and fixed on the cathode electrode CE. The (1-2)-th bonding electrode BDE2*a* may be connected to the (1-2)-th semiconductor layer 20*a* and the (1-2)-th reflective electrode RFE2*a*. The (1-2)-th semiconductor layer 20*a* and the cathode electrode CE may be electrically connected through the (1-2)-th bonding electrode BDE2*a*. In one or more embodiments, the (1-2)-th bonding electrode BDE2*a* may include a eutectic metal.

The first insulating layer 30*a* may cover at least a portion of an outer peripheral surface of a light emitting stack configured of the (1-1)-th semiconductor layer 10*a*, the first active layer MQW1, and the (1-2)-th semiconductor layer 20*a* sequentially stacked. The first insulating layer 30*a* may be interposed between the (1-2)-th bonding electrode BDE2*a* and the first active layer MQW1 and between the (1-2)-th bonding electrode BDE2*a* and the (1-1)-th semiconductor layer 10*a*, to prevent an electrical short circuit that may occur when the (1-2)-th bonding electrode BDE2*a* contacts the first active layer MQW1 and the (1-1)-th semiconductor layer 10*a*. The first insulating layer 30*a* may have a single layer structure or multiple layer structure including a transparent insulating material, for example, silicon oxide, silicon nitride, silicon oxynitride, or the like.

The overcoat layer OCL may be disposed in the first pixel opening OP1 where the (1-1)-th reflective electrode RFE1*a*, the (1-2)-th reflective electrode RFE2*a*, and the first light emitting element LD1 are disposed. The overcoat layer OCL may fix the first light emitting element LD1 bonded to the (1-1)-th reflective electrode RFE1*a* and the (1-2)-th reflective electrode RFE2*a* so that the first light emitting element LD1 does not move. In addition, the overcoat layer OCL may protect components disposed under the overcoat layer OCL from a foreign substance such as dust and/or moisture. The overcoat layer OCL may include at least one of an inorganic insulating layer and an organic insulating layer. For example, the overcoat layer OCL may include epoxy, but the present disclosure is not limited thereto.

The passivation layer PSV may be disposed on the bank layer BNK and the overcoat layer OCL. The passivation layer PSV may protect components disposed under the passivation layer PSV. In one or more embodiments, the passivation layer PSV may not be disposed on an upper surface of the first light emitting element LD1. The passivation layer PSV may include an inorganic insulating layer including an inorganic material and/or an organic insulating layer including an organic material. The inorganic insulating layer may include, for example, silicon oxide, silicon nitride, silicon oxynitride, and/or aluminum oxide. The organic insulating layer may include, for example, acrylic resin, epoxy resin, phenol resin, polyamide resin, polyimide resin, unsaturated polyester resin, poly-phenylene ether resin, poly-phenylene sulfide resin, and/or benzocyclobutene resin.

The light functional layer LFL may include a capping layer CPL and a color filter layer CFL.

The capping layer CPL may be disposed on the display element layer DPL. The capping layer CPL may serve to protect components under the capping layer CPL, such as the first light emitting element LD1, from external moisture, humidity, and/or the like. In one or more embodiments, the capping layer CPL may include silicon nitride, silicon oxide, silicon oxynitride, and/or aluminum oxide. However, a material of the capping layer CPL is not limited thereto.

The color filter layer CFL may include a first color filter CF1 and light blocking patterns LBP. The first color filter CF1 may selectively transmit light of a desired wavelength range. For example, the first color filter CF1 may selectively transmit the light of the first color having a peak wavelength at about 610 nm or longer and about 650 nm or shorter. The light blocking patterns LBP may include at least one of various types of light blocking materials.

Figure 29:
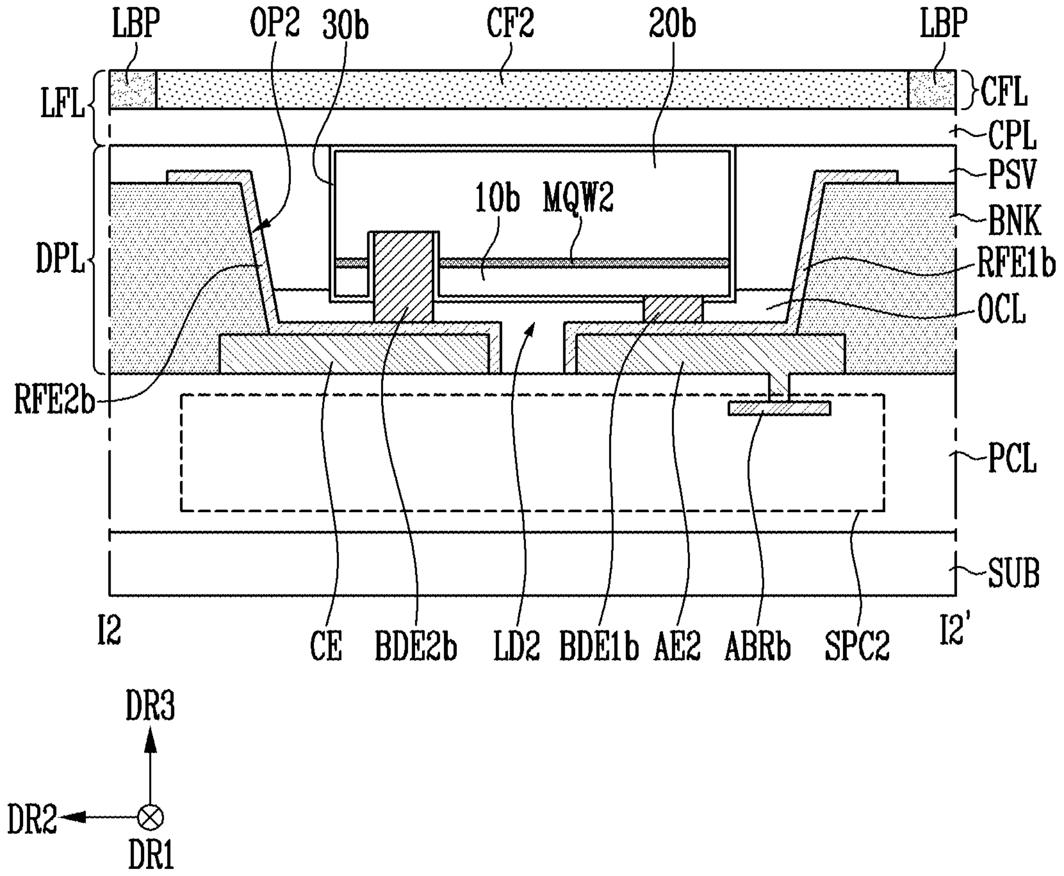
FIG. 29 is a cross-sectional view taken along the line 12-12' of FIG. 27.

FIG. 29 is a cross-sectional view taken along the line 12-12' of FIG. 27. FIG. 29 is a cross-sectional view illustrating the second sub-pixel.

In describing the second sub-pixel SP2, a difference compared to the first sub-pixel SP1 described with reference to FIG. 28 is mainly described, and a part omitted from the description is replaced with the content described above.

Referring to FIGS. 27 and 29, the pixel circuit layer PCL, the display element layer DPL, and the light functional layer LFL may be sequentially disposed on the substrate SUB.

The pixel circuit layer PCL may be described similarly to that described with reference to FIGS. 6-26. For example, the pixel circuit layer PCL may include various components configuring the second sub-pixel circuit SPC2 or SPC2'.

The display element layer DPL may include the second anode electrode AE2, the cathode electrode CE, the bank layer BNK, a (2-1)-th reflective electrode RFE1*b*, a (2-2)-th reflective electrode RFE2*b*, the second light emitting element LD2, the overcoat layer OCL, and the passivation layer PSV.

The second anode electrode AE2 may be disposed on the pixel circuit layer PCL. The second anode electrode AE2 may be connected to the second anode bridge electrode ABRb or ABRb' through a contact hole. The second anode electrode AE2 may be spaced (e.g., spaced apart) from the cathode electrode CE.

The bank layer BNK may be disposed on the second anode electrode AE2 and the cathode electrode CE. The bank layer BNK may have a second pixel opening OP2 exposing portions of the second anode electrode AE2 and the cathode electrode CE. The second light emitting element LD2 may be disposed in the second pixel opening OP2 of the bank layer BNK.

The (2-1)-th reflective electrode RFE1*b* may be disposed on an exposed portion of the second anode electrode AE2 and a side surface of the bank layer BNK adjacent thereto. The (2-2)-th reflective electrode RFE2*b* may be disposed on an exposed portion of the cathode electrode CE and a side surface of the bank layer BNK adjacent thereto. The (2-1)-th reflective electrode RFE1*b* and the (2-2)-th reflective electrode RFE2*b* may include a conductive material suitable for reflecting light.

The second light emitting element LD2 may include a (2-1)-th semiconductor layer 10*b*, a second active layer MQW2, a (2-2)-th semiconductor layer 20*b*, a second insulating layer 30*b*, a (2-1)-th bonding electrode BDE1*b*, and a (2-2)-th bonding electrode BDE2*b*.

The (2-1)-th semiconductor layer 10*b* may be configured to provide a hole. The (2-1)-th semiconductor layer 10*b* may have a first polarity. For example, the (2-1)-th semiconductor layer 10*b* may include at least one p-type semiconductor layer. In one or more embodiments of the present disclosure, the (2-1)-th semiconductor layer 10*b* may include a gallium nitride (GaN) semiconductor material doped with a first conductive dopant (or a p-type dopant).

The second active layer MQW2 may be disposed on the (2-1)-th semiconductor layer 10*b*. The second active layer MQW2 may be interposed between the (2-1)-th semiconductor layer 10*b* and the (2-2)-th semiconductor layer 20*b* to provide an area where an electron and a hole recombine. As the electron and the hole recombine in the second active layer MQW2, the electron and the hole may transition to a low energy level, and thus light having a wavelength corresponding thereto may be generated. The second active layer MQW2 may be formed as a single or multiple quantum well structure.

In one or more embodiments, the second active layer MQW2 may be configured to generate light of a second color. In this case, the second active layer MQW2 may include a material suitable for generating the light of the second color. For example, a material configuring the second active layer MQW2 may be different from a material configuring the first active layer MQW1. For example, the second active layer MQW2 may include a barrier layer formed of GaN and a well layer formed of InGaN.

The (2-2)-th semiconductor layer 20*b* may be disposed on the second active layer MQW2. The (2-2)-th semiconductor layer 20*b* may be configured to provide an electron. The (2-2)-th semiconductor layer 20*b* may have a second polarity. For example, the (2-2)-th semiconductor layer 20*b* may include at least one n-type semiconductor layer. In one or more embodiments of the present disclosure, the (2-2)-th semiconductor layer 20*b* may include a gallium nitride (GaN) semiconductor material doped with a second conductive dopant (or an n-type dopant).

The (2-1)-th bonding electrode BDE1*b* may be bonded and fixed on the second anode electrode AE2. The (2-1)-th bonding electrode BDE1*b* may be connected to the (2-1)-th semiconductor layer 10*b* and the (2-1)-th reflective electrode RFE1*b*. The (2-1)-th semiconductor layer 10*b* and the second anode electrode AE2 may be electrically connected through the (2-1)-th bonding electrode BDE1*b*. In one or more embodiments, the (2-1)-th bonding electrode BDE1*b* may include a eutectic metal.

The (2-2)-th bonding electrode BDE2*b* may be bonded and fixed on the cathode electrode CE. The (2-2)-th bonding electrode BDE2*b* may be connected to the (2-2)-th semiconductor layer 20*b* and the (2-2)-th reflective electrode RFE2*b*. The (2-2)-th semiconductor layer 20*b* and the cathode electrode CE may be electrically connected through the (2-2)-th bonding electrode BDE2*b*. In one or more embodiments, the (2-2)-th bonding electrode BDE2*b* may include a eutectic metal.

The second insulating layer 30*b* may cover at least a portion of an outer peripheral surface of a light emitting stack configured of the (2-1)-th semiconductor layer 10*b*, the second active layer MQW2, and the (2-2)-th semiconductor layer 20*b* sequentially stacked. The second insulating layer 30*b* may be interposed between the (2-2)-th bonding electrode BDE2*b* and the second active layer MQW2 and between the (2-2)-th bonding electrode BDE2*b* and the (2-1)-th semiconductor layer 10*b*, to prevent an electrical short circuit that may occur when the (2-2)-th bonding electrode BDE2*b* contacts the second active layer MQW2 and the (2-1)-th semiconductor layer 10*b*. The second insulating layer 30*b* may include a transparent insulating material, and have a single layer structure or multiple layer structure.

The overcoat layer OCL may be disposed in the second pixel opening OP2 where the (2-1)-th reflective electrode RFE1*b*, the (2-2)-th reflective electrode RFE2*b*, and the second light emitting element LD2 are disposed. The overcoat layer OCL may fix the second light emitting element LD2 bonded to the (2-1)-th reflective electrode RFE1*b* and the (2-2)-th reflective electrode RFE2*b* so that the second light emitting element LD2 does not move.

The passivation layer PSV may be disposed on the bank layer BNK and the overcoat layer OCL.

The light functional layer LFL may include a capping layer CPL and a color filter layer CFL.

The capping layer CPL may be disposed on the display element layer DPL. The capping layer CPL may serve to protect components under the capping layer CPL, such as the second light emitting element LD2, from external moisture, humidity, and/or the like.

The color filter layer CFL may include a second color filter CF2 and light blocking patterns LBP. The second color filter CF2 may selectively transmit light of a desired wavelength range. For example, the second color filter CF2 may selectively transmit the light of the second color having a peak wavelength at about 500 or longer nm and about 540 nm or shorter.

Figure 30:
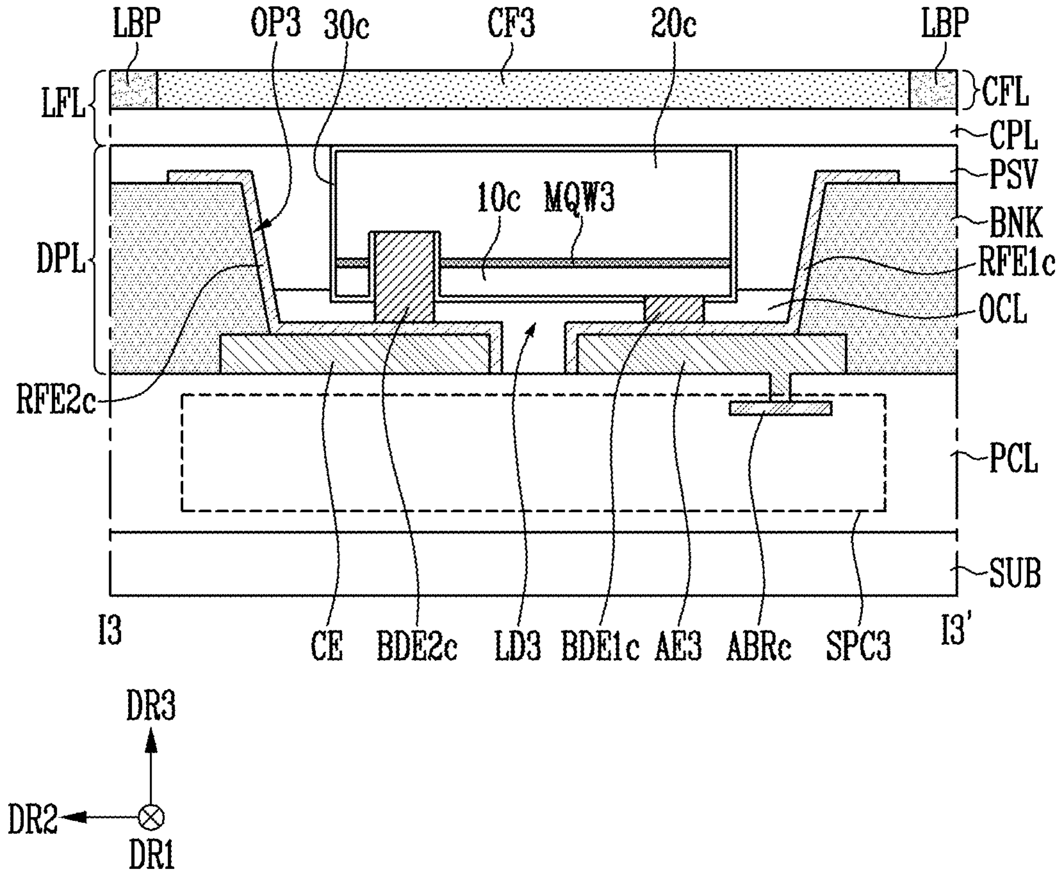
FIG. 30 is a cross-sectional view taken along the line 13-13' of FIG. 27.

FIG. 30 is a cross-sectional view taken along the line 13-13' of FIG. 27. FIG. 30 is a cross-sectional view illustrating the third sub-pixel.

In describing the third sub-pixel SP3, a difference compared to the first sub-pixel SP1 described with reference to FIG. 28 is mainly described, and a part omitted from the description is replaced with the content described above.

Referring to FIGS. 27 and 30, the pixel circuit layer PCL, the display element layer DPL, and the light functional layer LFL may be sequentially disposed on the substrate SUB.

The pixel circuit layer PCL may be described similarly to that described with reference to FIGS. 6-26. For example, the pixel circuit layer PCL may include various components configuring the third sub-pixel circuit SPC3 or SPC3'.

The display element layer DPL may include the third anode electrode AE3, the cathode electrode CE, the bank layer BNK, a (3-1)-th reflective electrode RFE1*c*, a (3-2)-th reflective electrode RFE2*c*, the third light emitting electrode LD3, the overcoat layer OCL, and the passivation layer PSV.

The third anode electrode AE3 may be disposed on the pixel circuit layer PCL. The third anode electrode AE3 may be connected to the third anode bridge electrode ABRc or ABRc' through a contact hole. The third anode electrode AE3 may be spaced (e.g., spaced apart) from the cathode electrode CE.

The bank layer BNK may be disposed on the third anode electrode AE3 and the cathode electrode CE. The bank layer BNK may have a third pixel opening OP3 exposing portions of the third anode electrode AE3 and the cathode electrode CE. The third light emitting element LD3 may be disposed in the third pixel opening OP3 of the bank layer BNK.

The (3-1)-th reflective electrode RFE1*c* may be disposed on an exposed portion of the third anode electrode AE3 and a side surface of the bank layer BNK adjacent thereto. The (3-2)-th reflective electrode RFE2*c* may be disposed on an exposed portion of the cathode electrode CE and a side surface of the bank layer BNK adjacent thereto. The (3-1)-th reflective electrode RFE1*c* and the (3-2)-th reflective electrode RFE2*c* may include a conductive material suitable for reflecting light.

The third light emitting element LD3 may include a (3-1)-th semiconductor layer 10*c*, a third active layer MQW3, a (3-2)-th semiconductor layer 20*c*, a third insulating layer 30*c*, a (3-1)-th bonding electrode BDE1*c*, and a (3-2)-th bonding electrode BDE2*c*.

The (3-1)-th semiconductor layer 10*c* may be configured to provide a hole. The (3-1)-th semiconductor layer 10*c* may have a first polarity. For example, the (3-1)-th semiconductor layer 10*c* may include at least one p-type semiconductor layer. In one or more embodiments of the present disclosure, the (3-1)-th semiconductor layer 10*c* may include a gallium nitride (GaN) semiconductor material doped with a first conductive dopant (or a p-type dopant).

The third active layer MQW3 may be disposed on the (3-1)-th semiconductor layer 10*c*. The third active layer MQW3 may be interposed between the (3-1)-th semiconductor layer 10*c* and the (3-2)-th semiconductor layer 20*c* to provide an area where an electron and a hole recombine. As the electron and the hole recombine in the third active layer MQW3, the electron and the hole may transition to a low energy level, and thus light having a wavelength corresponding thereto may be generated. The third active layer MQW3 may be formed as a single or multiple quantum well structure.

In one or more embodiments, the third active layer MQW3 may be configured to generate light of a third color. In this case, the third active layer MQW3 may include a material suitable for generating the light of the third color. For example, a material configuring the third active layer MQW3 may be different from a material configuring the first active layer MQW1. For example, the third active layer MQW3 may include a barrier layer formed of GaN and a well layer formed of InGaN.

The (3-2)-th semiconductor layer 20*c* may be disposed on the third active layer MQW3. The (3-2)-th semiconductor layer 20*c* may be configured to provide an electron. The (3-2)-th semiconductor layer 20*c* may have a second polarity. For example, the (3-2)-th semiconductor layer 20*c* may include at least one n-type semiconductor layer. In one or more embodiments of the present disclosure, the (3-2)-th semiconductor layer 20*c* may include a gallium nitride (GaN) semiconductor material doped with a second conductive dopant (or an n-type dopant).

The (3-1)-th bonding electrode BDE1*c* may be bonded and fixed on the third anode electrode AE3. The (3-1)-th bonding electrode BDE1*c* may be connected to the (3-1)-th semiconductor layer 10*c* and the (3-1)-th reflective electrode RFE1*c*. The (3-1)-th semiconductor layer 10*c* and the third anode electrode AE3 may be electrically connected through the (3-1)-th bonding electrode BDE1*c*. In one or more embodiments, the (3-1)-th bonding electrode BDE1*c* may include a eutectic metal.

The (3-2)-th bonding electrode BDE2*c* may be bonded and fixed on the cathode electrode CE. The (3-2)-th bonding electrode BDE2*c* may be connected to the (3-2)-th semiconductor layer 20*c* and the (3-2)-th reflective electrode RFE2*c*. The (3-2)-th semiconductor layer 20*c* and the cathode electrode CE may be electrically connected through the (3-2)-th bonding electrode BDE2*c*. In one or more embodiments, the (3-2)-th bonding electrode BDE2*c* may include a eutectic metal.

The third insulating layer 30*c* may cover at least a portion of an outer peripheral surface of a light emitting stack configured of the (3-1)-th semiconductor layer 10*c*, the third active layer MQW3, and the (3-2)-th semiconductor layer 20*c* sequentially stacked. The third insulating layer 30*c* may be interposed between the (3-2)-th bonding electrode BDE2*c* and the third active layer MQW3 and between the (3-2)-th bonding electrode BDE2*c* and the (3-1)-th semiconductor layer 10*c*, to prevent an electrical short circuit that may occur when the (3-2)-th bonding electrode BDE2*c* contacts the third active layer MQW3 and the (3-1)-th semiconductor layer 10*c*. The third insulating layer 30*c* may include a transparent insulating material and have a single layer structure or multiple layer structure.

The overcoat layer OCL may be disposed in the third pixel opening OP3 where the (3-1)-th reflective electrode RFE1*c*, the (3-2)-th reflective electrode RFE2*c*, and the third light emitting element LD3 are disposed. The overcoat layer OCL may fix the third light emitting element LD3 bonded to the (3-1)-th reflective electrode RFE1*c* and the (3-2)-th reflective electrode RFE2*c* so that the third light emitting element LD3 does not move.

The passivation layer PSV may be disposed on the bank layer BNK and the overcoat layer OCL.

The light functional layer LFL may include a capping layer CPL and a color filter layer CFL.

The capping layer CPL may be disposed on the display element layer DPL. The capping layer CPL may serve to protect components under the capping layer CPL, such as the third light emitting element LD3, from external moisture, humidity, and/or the like.

The color filter layer CFL may include a third color filter CF3 and light blocking patterns LBP. The third color filter CF3 may selectively transmit light of a desired wavelength range. For example, the third color filter CF3 may selectively transmit light of third color having a peak wavelength at about 440 nm or longer and about 480 nm or shorter.

Figure 31:
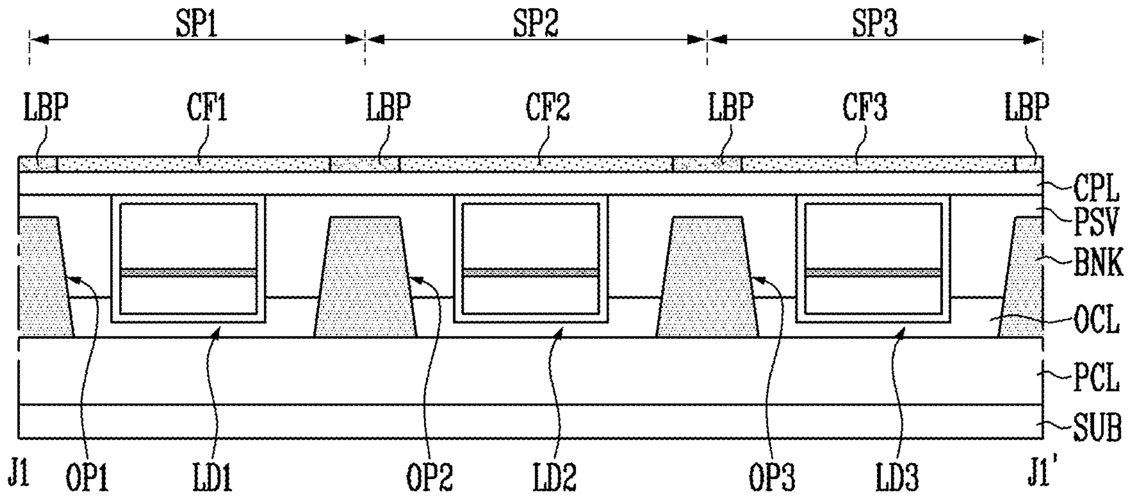
FIG. 31 is a cross-sectional view taken along the line J1-J1' of FIG. 27.

FIG. 31 is a cross-sectional view taken along the line J1-J1' of FIG. 27.

Hereinafter, a description of a content that overlaps the content described with reference to FIGS. 28-30 is omitted.

Referring to FIGS. 27 and 31, the color filter layer CFL may include the first to third color filters CF1, CF2, and CF3 and the light blocking patterns LBP.

The light blocking patterns LBP may be disposed between the first to third color filters CF1, CF2, and CF3. It may be understood that emission areas of the first to third sub-pixels SP1, SP2, and SP3 are defined by the light blocking patterns LBP. For example, an area overlapping the light blocking patterns LBP may be a non-emission area, and an area that does not overlap the light blocking patterns LBP may be an emission area.

In one or more embodiments, each of the light blocking patterns LBP may be provided in a form of multiple layers in which at least two color filters from among the first to third color filters CF1, CF2, and CF3 overlap. For example, each of the light blocking patterns LBP may be formed by overlapping the first to third color filters CF1, CF2, and CF3. As another example, the light blocking pattern between the first and second color filters CF1 and CF2 from among the light blocking patterns LBP may be formed in multiple layers in which the first and second color filters CF1 and CF2 overlap, the light blocking pattern between the second and third color filters CF2 and CF3 from among the light blocking patterns LBP may be formed in multiple layers in which the second and third color filters CF2 and CF3 overlap, and the light blocking pattern between the first color filter CF1 and the third color filter CF3 of neighboring sub-pixels from among the light blocking patterns LBP may be formed in multiple layers in which the first and third color filters CF1 and CF3 overlap.

Figure 32:
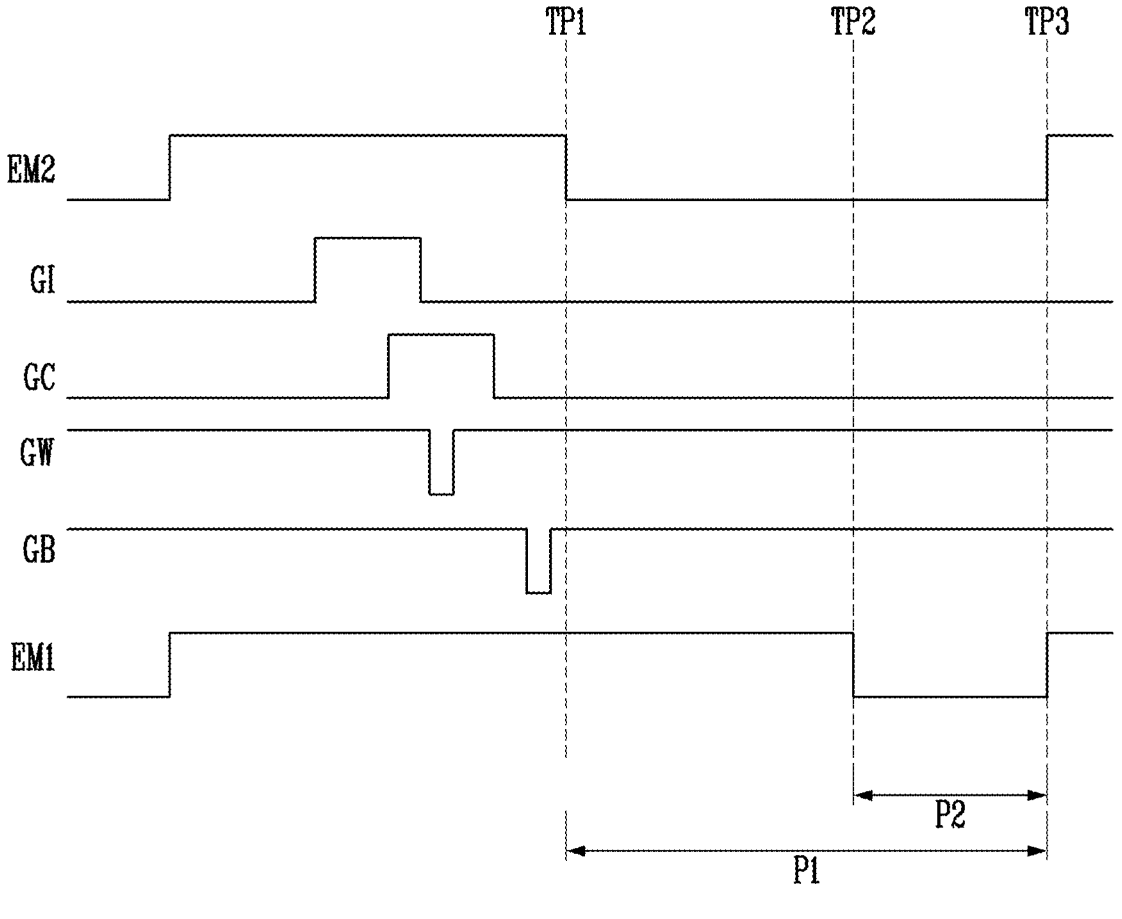
FIG. 32 is a timing diagram illustrating a method of driving a pixel according to one or more embodiments of the present disclosure.

FIG. 32 is a timing diagram illustrating a method of driving a pixel according to one or more embodiments of the present disclosure.

Referring to FIGS. 6 and 32, as the first emission control signal EM1 of a turn-off level (high level) is applied to the first emission control signal line EML1, and the second emission control signal EM2 of a turn-off level (high level) is applied to the second emission control signal line EML2, the fifth and sixth transistors T5*a*, T5*b*, T5*c*, T6*a*, T6*b*, and T6*c* are turned off, and thus the pixel PXL is in a non-emission state.

Next, as the third gate signal GI of a turn-on level (high level) is applied to the third gate line GIL, the fourth transistors T4*a*, T4*b*, and T4*c* of the first to third sub-pixel circuits SPC1, SPC2, and SPC3 are turned on. Accordingly, the initialization voltage VINT is applied to the second nodes N2*a*, N2*b*, and N2*c*. The initialization voltage VINT may be a relatively low voltage and may cause the first transistors T1*a*, T1*b*, and T1*c* to be on-biased.

Next, as the second gate signal GC of a turn-on level (high level) is applied to the second gate line GCL, the third transistors T3*a*, T3*b*, and T3*c* of the first to third sub-pixel circuits SPC1, SPC2, and SPC3 are turned on. In addition, as the first gate signal GW of a turn-on level (low level) is applied to the first gate line GWL, the second transistor T2*a*, T2*b*, and T2*c* of the first to third sub-pixel circuits SPC1, SPC2, and SPC3 are turned on.

Accordingly, the first data signal DATA1 of the first data line DL1 may be applied to the second node N2*a* of the first sub-pixel circuit SPC1 through the second transistor T2*a*, the first transistor T1*a*, and the third transistor T3*a* in a turn-on state. At this time, a voltage of the second node N2*a* may be a first compensation voltage obtained by subtracting a threshold voltage of the first transistor T1*a* from the first data signal DATA1, that is, a first data voltage. The first storage capacitor CSTa may maintain a difference between the first power voltage ELVDD and the first compensation voltage.

In addition, the second data signal DATA2 of the second data line DL2 may be applied to the second node N2*b* of the second sub-pixel circuit SPC2 through the second transistor T2*b*, the first transistor T1*b*, and the third transistor T3*b* in a turn-on state. At this time, a voltage of the second node N2*b* may be a second compensation voltage obtained by subtracting a threshold voltage of the first transistor T1*b* from the second data signal DATA2, that is, a second data voltage. The second storage capacitor CSTb may maintain a difference between the first power voltage ELVDD and the second compensation voltage.

In addition, the third data signal DATA3 of the third data line DL3 may be applied to the second node N2*c* of the third sub-pixel circuit SPC3 through the second transistor T2*c*, the first transistor T1*c*, and the third transistor T3*c* in a turn-on state. At this time, a voltage of the second node N2*c* may be a third compensation voltage obtained by subtracting a threshold voltage of the first transistor T1*c* from the third data signal DATA3, that is, a third data voltage. The third storage capacitor CSTc may maintain a difference between the first power voltage ELVDD and the third compensation voltage.

Next, as the fourth gate signal GB of a turn-on level (low level) is applied to the fourth gate line GBL, the seventh and eighth transistors T7*a*, T7*b*, T7*c*, T8*a*, T8*b*, and T8*c* of the first to third sub-pixel circuits SPC1, SPC2, and SPC3 are turned on. As the seventh transistors T7*a*, T7*b*, and T7*c* are turned on, the anode initialization voltage VAINT may be applied to the first to third anode electrodes AE1, AE2, and AE3, and the first to third light emitting elements LD1, LD2, and LD3 may be initialized with a charge amount corresponding to a voltage difference between the anode initialization voltage VAINT and the second power voltage ELVSS. In addition, as the eighth transistors T8*a*, T8*b*, and T8*c* are turned on, a voltage of the first nodes N1*a*, N1*b*, and Nic of the first to third sub-pixel circuits SPC1, SPC2, and SPC3 may be set to the bias voltage VB.

Next, at a first time point TP1, as the second emission control signal EM2 of a turn-on level (low level) is applied to the second emission control signal line EML2, the fifth and sixth transistors T5*b*, T5*c*, T6*b*, and T6*c* of the second and third sub-pixel circuits SPC2 and SPC3 may be turned on. Therefore, a path of a driving current flowing from the first power voltage ELVDD to the second power voltage ELVSS via the fifth and sixth transistors T5*b*, T5*c*, T6*b*, and T6*c*, and the second and third light emitting elements LD2 and LD3. Accordingly, the second light emitting element LD2 may emit light with a luminance corresponding to an amount of the second driving current, and the third light emitting element LD3 may emit light with a luminance corresponding to an amount of the third driving current.

Next, at a second time point TP2 after the first time point TP1, as the first emission control signal EM1 of a turn-on level (low level) is applied to the first emission control signal line EML1, the fifth and sixth transistors T5*a* and Ta of the first sub-pixel circuit SPC1 may be turned on. Therefore, a path of a driving current flowing from the first power voltage ELVDD to the second power voltage ELVSS via the fifth and sixth transistors T5*a* and Tea and the first light emitting element LD1 is formed. Accordingly, the first light emitting element LD1 may emit light with a luminance corresponding to an amount of the first driving current.

Next, at a third time point TP3 after the second time point TP2, as the first and second emission control signals EM1 and EM2 of a turn-off level (high level) applied to the first and second emission control signal lines EML1 and EML2, the fifth and sixth transistors T5*a*, T5*b*, T5*c*, T6*a*, T6*b*, and T6*c* of the first to third sub-pixel circuits SPC1, SPC2, and SPC3 may be turned off. Accordingly, emission of the first to third light emitting elements LD1, LD2, and LD3 may be ended.

In one or more embodiments, a period in which the second emission control signal EM2 of the turn-on level (low level) is output to the second emission control signal line EML2 may be referred to as a first period P1. A period in which the first emission control signal EM1 of the turn-on level (low level) is output to the first emission control signal line EML1 may be referred to as a second period P2. For example, the first period P1 may be a period from the first time point TP1 to the third time point TP3, and the second period P2 may be a period from the second time point TP2 to the third time point TP3.

In one or more embodiments, the second period P2 may be in the first period P1, and the second period P2 may be shorter than the first period P1. In this case, a current density of the first driving current provided to the first light emitting element LD1 in the second period P2 may be relatively large. For example, the current density of the first driving current provided to the first light emitting element LD1 in the second period P2 may be greater than the current density of the second driving current provided to the second light emitting element LD2 in the first period P1. For example, the current density of the first driving current provided to the first light emitting element LD1 in the second period P2 may be greater than a current density of the third driving current provided to the third light emitting element LD3 in the first period P1.

Figure 33:
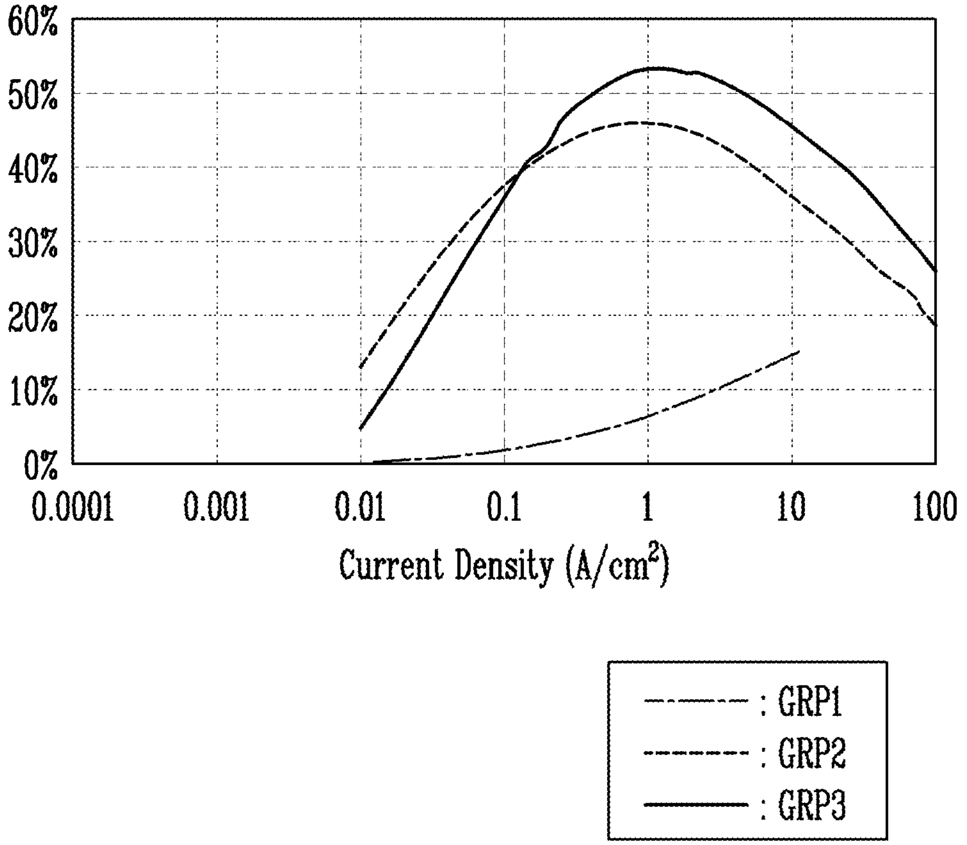
FIG. 33 is a diagram illustrating an effect according to the pixel and the method of driving the same of the present disclosure.

FIG. 33 is a diagram illustrating an effect of the pixel and the method of driving the same of the present disclosure.

Referring to FIG. 33, first to third graphs GRP1, GRP2, and GRP3 are shown. In FIG. 33, an X-axis represents a current density, and a Y-axis represents a relative value of emission efficiency. Here, the emission efficiency refers to external quantum efficiency (EQE) of the light emitting element.

The first graph GRP1 shows current density dependence of emission efficiency of the first light emitting element LD1. The second graph GRP2 shows current density dependence of emission efficiency of the second light emitting element LD2. The third graph GPR3 shows current density dependence of emission efficiency of the third light emitting element LD3.

As described with reference to FIGS. 28-30, the first to third light emitting elements LD1, LD2, and LD3 may be configured to generate light of different colors. The first light emitting element LD1 may be configured to be suitable for generating the light of the first color. The second light emitting element LD2 may be configured to be suitable for generating the light of the second color. The third light emitting element LD3 may be configured to be suitable for generating the light of the third color. For example, the first light emitting element LD1 may include the first active layer MQW1 that generates the light of the first color, the second light emitting element LD2 may include the second active layer MQW2 that generates the light of the second color, and the third light emitting element LD3 may include the third active layer MQW3 that generates the light of the third color.

In this case, as shown in the first to third graphs GRP1, GRP2, and GRP3, an optimal current density for the first light emitting element LD1 to exhibit maximum emission efficiency (or emission efficiency adjacent thereto) may be different from an optimal current density for the second light emitting element LD2 to exhibit maximum emission efficiency (or emission efficiency adjacent thereto), and an optimal current density for the third light emitting element LD3 to exhibit maximum emission efficiency (or emission efficiency adjacent thereto).

The optimal current density for the first light emitting element LD1 to exhibit the maximum emission efficiency (or the emission efficiency adjacent thereto) may be greater than the optimal current density for the second light emitting element LD2 to exhibit the maximum emission efficiency (or the emission efficiency adjacent thereto).

The optimal current density for the first light emitting element LD1 to exhibit the maximum emission efficiency (or the emission efficiency adjacent thereto) may be greater than the optimal current density for the third light emitting element LD3 to exhibit the maximum emission efficiency (or the emission efficiency adjacent thereto).

The optimal current density for the second light emitting element LD2 to exhibit the maximum emission efficiency (or the emission efficiency adjacent thereto) may be substantially similarly to the optimal current density for the third light emitting element LD3 to exhibit the maximum emission efficiency (or the emission efficiency adjacent thereto).

In the present disclosure, as described with reference to FIGS. 6-31, as the first emission control signal line EML1 or EML1' and the second emission control signal line EML2 or EML2' are provided as components separated from each other, the first driving current having a relatively high current density may be provided to the first light emitting element LD1 and the second and third driving currents having a relatively low current density may be respectively provided to the second and third light emitting elements LD2 and LD3. Accordingly, emission efficiency of the pixel PXL including the first to third light emitting elements LD1, LD2, and LD3 that emit light of different colors may be improved.

Figure 34:
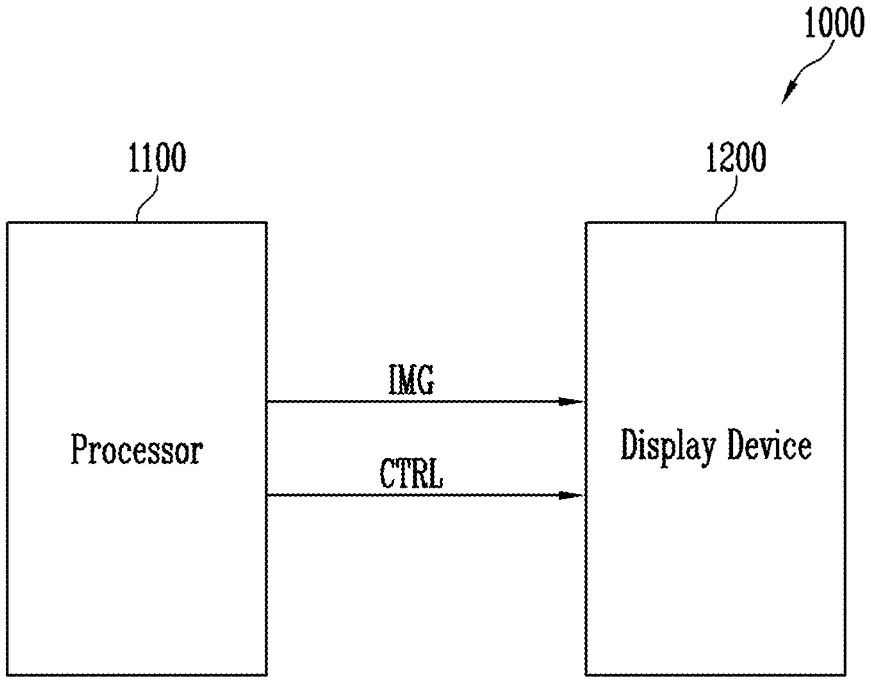
FIG. 34 is a block diagram illustrating a display system according to one or more embodiments.

FIG. 34 is a block diagram illustrating a display system according to one or more embodiments.

Referring to FIG. 34, the display system 1000 may include a processor 1100 and a display device 1200.

The processor 1100 may perform various tasks and calculations. In one or more embodiments, the processor 1100 may include an application processor, a graphics processor, a microprocessor, a central processing unit (CPU), and the like. The processor 1100 may be connected to other components of the display system 1000 through a bus system to control the other components.

The processor 1100 may transmit image data IMG and a control signal CTRL to the display device 1200. The display device 1200 may display an image based on the image data IMG and the control signal CTRL. The display device 1200 may be configured similarly to the display device DD described with reference to FIG. 1. In this case, the image data IMG and the control signal CTRL may be provided as the input image data IMG and the control signal CTRL of FIG. 1, respectively.

The display system 1000 may include a computing system providing an image display function, such as a smart watch, a mobile phone, a smart phone, a portable computer, a tablet personal computer (PC), a watch phone, an automotive display, smart glasses, a portable multimedia player (PMP), a navigation device, and an ultra mobile personal computer (UMPC). In addition, the display system 1000 may include at least one of a head mounted display (HMD) device, a virtual reality (VR) device, a mixed reality (MR) device, and/or an augmented reality (AR) device.

FIGS. 35-38 are perspective views illustrating application examples of the display system of FIG. 34.

Figure 35:
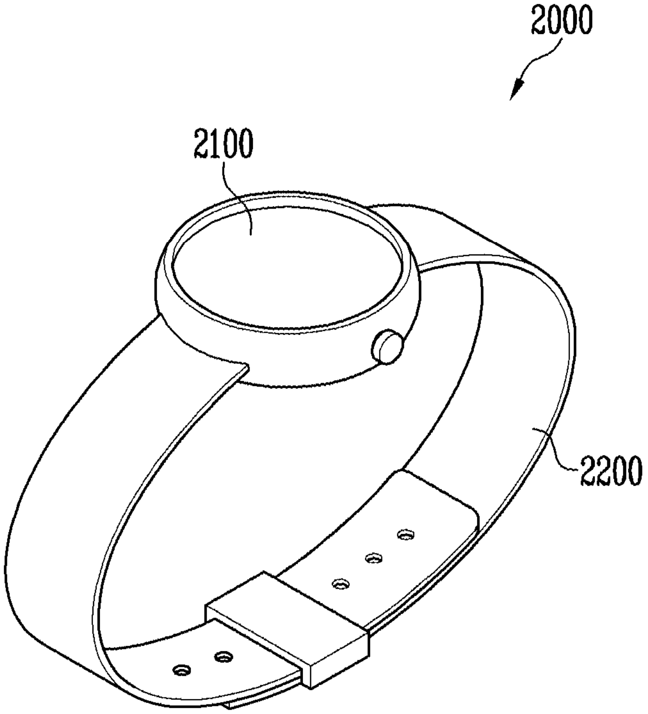
FIGS. 35-38 are perspective views illustrating application examples of the display system of FIG. 34.

Referring to FIG. 35, the display system 1000 of FIG. 34 may be applied to a smart watch 2000 including a display unit 2100 and a strap unit 2200.

The smart watch 2000 may be a wearable electronic device. For example, the smart watch 2000 may have a structure in which the strap unit 2200 is mounted on a user's wrist. Here, the display system 1000 and/or the display device 1200 may be applied to the display unit 2100, and image data including time information may be provided to a user.

Figure 36:
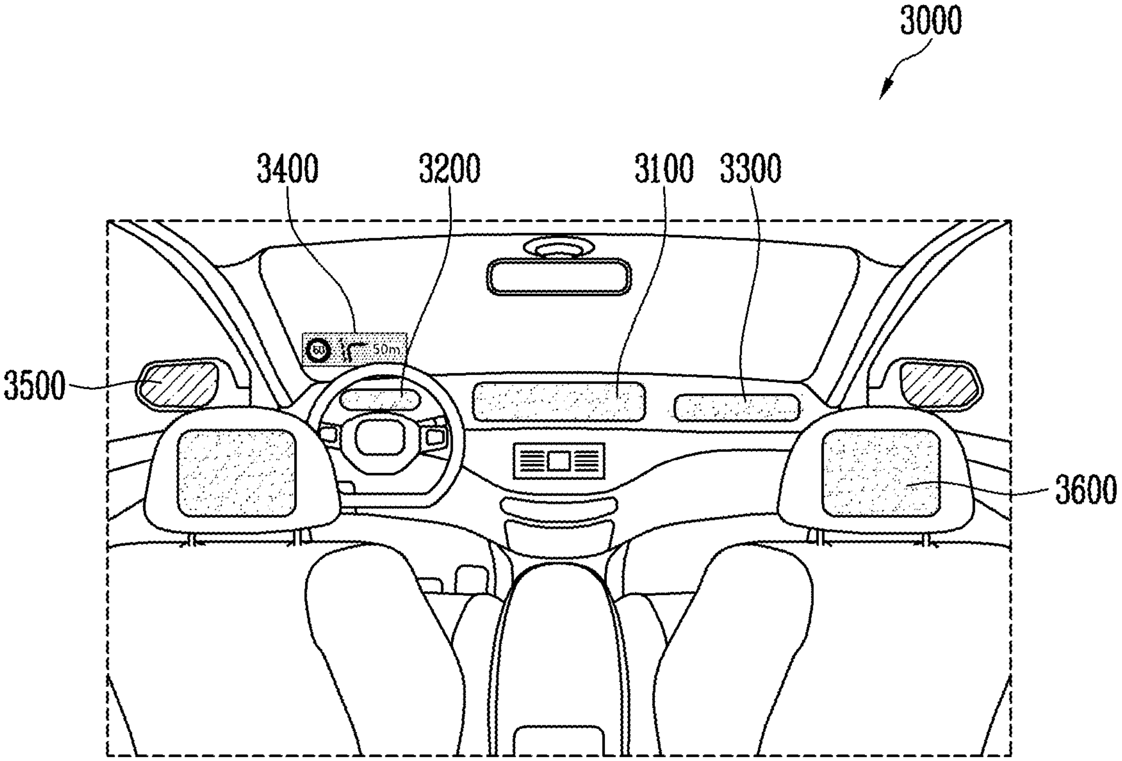

Referring to FIG. 36, the display system 1000 of FIG. 34 may be applied to an automotive display system 3000. Here, the automotive display system 3000 may include a computing system provided inside and/or outside a vehicle to provide image data.

For example, the display system 1000 and/or the display device 1200 may be applied to at least one of an infotainment panel 3100, a cluster 3200, a co-driver display 3300, a head-up display 3400, a side mirror display 3500, and a rear seat displays 3600 provided in a vehicle.

Figure 37:
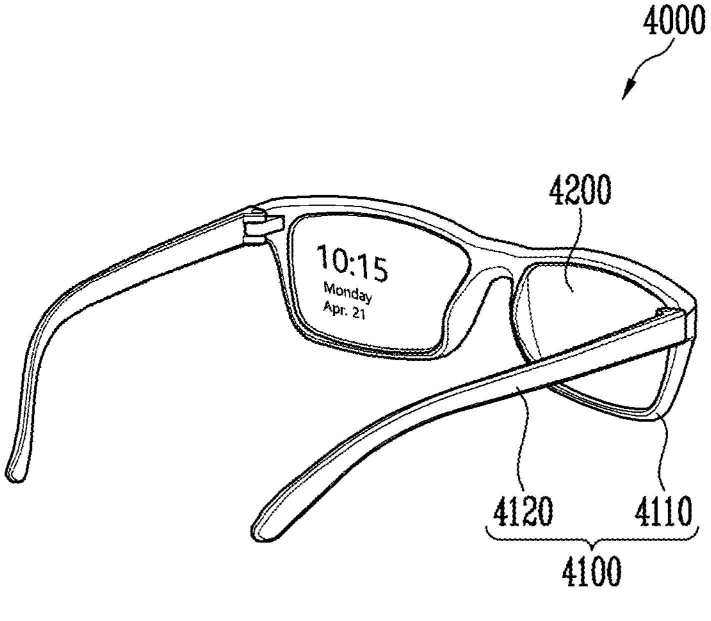

Referring to FIG. 37, the display system 1000 of FIG. 34 may be applied to smart glasses 4000. The smart glasses 4000 may be a wearable electronic device that may be worn on a user's head. For example, the smart glasses 4000 may be a wearable device for augmented reality.

The smart glasses 4000 may include a frame 4100 and a lens unit 4200. The frame 4100 may include a housing 4110 that supports the lens unit 4200 and a leg unit 4120 for the user to wear. The leg unit 4120 may be connected to the housing 4110 through a hinge and may be folded or unfolded relative to the housing 4110.

A battery, a touch pad, a microphone, a camera, and/or the like may be built in the frame 4100. In addition, a projector that outputs light, a processor that controls a light signal, and/or the like may be built in the frame 4100.

The lens unit 4200 may include an optical member that transmits or reflects light. For example, the lens unit 4200 may include glass, transparent synthetic resin, and/or the like.

In order for user's eyes to recognize visual information, the lens unit 4200 may reflect an image by the light signal transmitted from the projector of the frame 4100 by a rear surface (for example, a surface of a direction facing the user's eyes) of the lens unit 4200. For example, the user may recognize visual information such as time and date displayed on the lens unit 4200. At this time, the projector and/or the lens unit 4200 may be a type of display device. The display device 1200 may be applied to the projector and/or the lens unit 4200.

Figure 38:
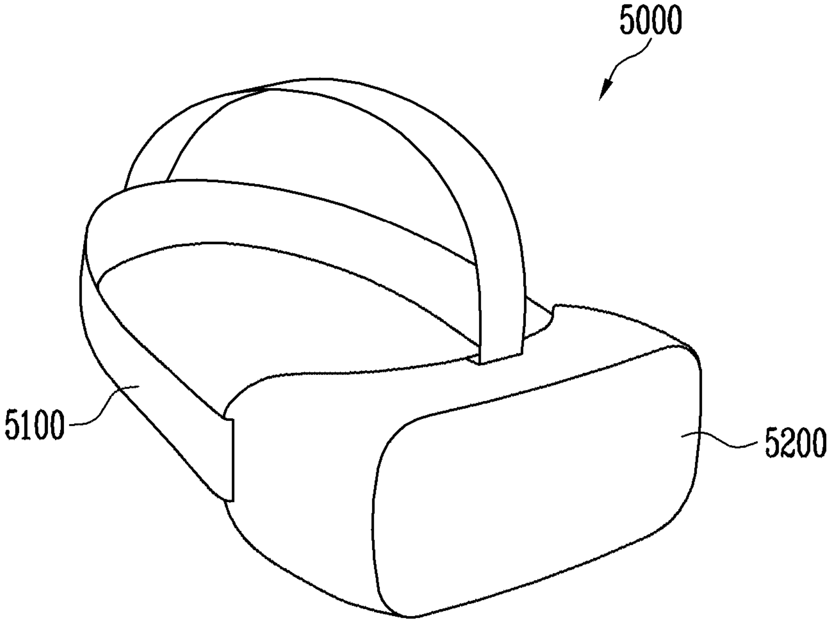

Referring to FIG. 38, the display system 1000 of FIG. 34 may be applied to a head mounted display device 5000.

The head mounted display device 5000 may be a wearable electronic device that may be worn on a user's head. For example, the head mounted display device 5000 may be a wearable device for virtual reality or mixed reality.

The head mounted display device 5000 may include a head mount band 5100 and a display device receiving case 5200. The head mount band 5100 may be connected to the display device receiving case 5200. The head mount band 5100 may include a horizontal band and/or a vertical band for fixing the head mounted display device 5000 to a user's head. The horizontal band may be configured to be around (e.g., surround) a side portion of the user's head, and the vertical band may be configured to be around (e.g., surround) an upper portion of the user's head. However, the present disclosure is not limited thereto. For example, the head mount band 5100 may be implemented in a form of a glasses frame, a helmet, and/or the like.

The display device receiving case 5200 may receive the display system 1000 and/or the display device 1200.

Although described with reference to the above embodiments, it will be understood that those skilled in the art can variously modify and change the present disclosure without departing from the spirit and scope of the present disclosure described in the claims below and their equivalents.

What is claimed is:

1. A pixel comprising:

a (1-1)-th emission control transistor comprising a first semiconductor pattern and a first emission control gate electrode overlapping a (1-1)-th emission control channel area of the first semiconductor pattern;

a (2-1)-th emission control transistor comprising a second semiconductor pattern and a second emission control gate electrode overlapping a (2-1)-th emission control channel area of the second semiconductor pattern;

a (1-2)-th emission control transistor comprising the first semiconductor pattern and the first emission control gate electrode overlapping a (1-2)-th emission control channel area of the first semiconductor pattern;

a (2-2)-th emission control transistor comprising the second semiconductor pattern and the second emission control gate electrode overlapping a (2-2)-th emission control channel area of the second semiconductor pattern, a first driving transistor connected between a first terminal of the (1-1)-th emission control transistor and a second terminal of the (1-2)-th emission control transistor;

a second driving transistor connected between a first terminal of the (2-1)-th emission control transistor and a second terminal of the (2-2)-th emission control transistor;

a first emission control signal line configured to transmit a first emission control signal and connected to the first emission control gate electrode of the (1-1)-th emission control transistor and the (1-2)-th emission control transistor;

a second emission control signal line configured to transmit a second emission control signal and connected to the second emission control gate electrode of the (2-1)-th emission control transistor and the (2-2)-th emission control transistor;

a first light emitting element connected to a second terminal of the (1-1)-th emission control transistor and configured to emit light of a first color; and a second light emitting element connected to a second terminal of the (2-1)-th emission control transistor and configured to emit light of a second color.

2. The pixel according to claim 1, further comprising:

a first anode electrode connected to a second terminal of the (1-1)-th emission control transistor;

a second anode electrode connected to a second terminal of the (2-1)-th emission control transistor and spaced from the first anode electrode; and a cathode electrode spaced from the first and second anode electrodes.

3. The pixel according to claim 2, wherein the first light emitting element is connected between the first anode electrode and the cathode electrode, and wherein the second light emitting element is connected between the second anode electrode and the cathode electrode.

4. The pixel according to claim 1, wherein the first light emitting element comprises a (1-1)-th semiconductor layer having a first polarity, a (1-2)-th semiconductor layer having a second polarity, and a first active layer interposed between the (1-1)-th semiconductor layer and the (1-2)-th semiconductor layer, and wherein the second light emitting element comprises a (2-1)-th semiconductor layer having the first polarity, a (2-2)-th semiconductor layer having the second polarity, and a second active layer interposed between the (2-1)-th semiconductor layer and the (2-2)-th semiconductor layer.

5. The pixel according to claim 4, wherein a material configuring the first active layer is different from a material configuring the second active layer.

6. The pixel according to claim 1, wherein:

the first driving transistor comprises a first driving gate electrode overlapping the first semiconductor pattern and a first driving channel area of the first semiconductor pattern; and the second driving transistor comprises a second driving gate electrode overlapping the second semiconductor pattern and a second driving channel area of the second semiconductor pattern.

7. The pixel according to claim 6, wherein a channel length of the first driving channel area is less than a channel length of the second driving channel area, and wherein a channel width of the first driving channel area is greater than a channel width of the second driving channel area.

8. The pixel according to claim 7, further comprising:

a first data line configured to transmit a first data signal;

a second data line configured to transmit a second data signal;

a first data write transistor connected between a first terminal of the first driving transistor and the first data line, and comprising a first data write gate electrode overlapping the first semiconductor pattern and a first data write channel area of the first semiconductor pattern; and a second data write transistor connected between a first terminal of the second driving transistor and the second data line, and comprising a second data write gate electrode overlapping the second semiconductor pattern and a second data write channel area of the second semiconductor pattern.

9. The pixel according to claim 1, wherein a channel width of the (1-1)-th emission control channel area of the first semiconductor pattern is greater than a channel width of the (2-1)-th emission control channel area of the second semiconductor pattern.

10. The pixel according to claim 9, wherein a resistance of conductive areas adjacent to the (1-1)-th emission control channel area of the first semiconductor pattern is less than a resistance of conductive areas adjacent to the (2-1)-th emission control channel area of the second semiconductor pattern.

11. The pixel according to claim 9, wherein a channel width of the (1-2)-th emission control channel area of the first semiconductor pattern is greater than a channel width of the (2-2)-th emission control channel area of the second semiconductor pattern.

12. The pixel according to claim 11, wherein a resistance of conductive areas adjacent to the (1-2)-th emission control channel area of the first semiconductor pattern is less than a resistance of conductive areas adjacent to the (2-2)-th emission control channel area of the second semiconductor pattern.

13. The pixel according to claim 1, wherein the first emission control signal line and the second emission control signal line are at a same layer.

14. The pixel according to claim 1, wherein each of the first and second emission control signal lines overlaps the first and second semiconductor patterns.

15. The pixel according to claim 1, further comprising:

a (3-1)-th emission control transistor comprising a third semiconductor pattern and a third emission control gate electrode overlapping a (3-1)-th emission control channel area of the third semiconductor pattern; and a third light emitting element connected to the (3-1)-th emission control transistor and configured to emit light of a third color wherein the third emission control gate electrode is connected to the second emission control signal line.

16. The pixel according to claim 15, wherein the third emission control gate electrode is formed integrally with the second emission control gate electrode.

17. The pixel according to claim 16, wherein the second semiconductor pattern and the third semiconductor pattern have planar shapes that are symmetrical to each other.

18. The pixel according to claim 15, wherein the light of the first color is light of a red color having a peak wavelength at 610 nm or longer and 650 nm or shorter, wherein the light of the second color is light of a green color having a peak wavelength at 500 nm or longer and 540 nm or shorter, and wherein the light of the third color is light of a blue color having a peak wavelength at 440 nm or longer and 480 nm or shorter.

19. A method of driving a pixel, wherein the pixel comprises:

a (1-1)-th emission control transistor comprising a first semiconductor pattern and a first emission control gate electrode overlapping a (1-1)-th emission control channel area of the first semiconductor pattern;

a (2-1)-th emission control transistor comprising a second semiconductor pattern and a second emission control gate electrode overlapping a (2-1)-th emission control channel area of the second semiconductor pattern;

a (1-2)-th emission control transistor comprising the first semiconductor pattern and the first emission control gate electrode overlapping a (1-2)-th emission control channel area of the first semiconductor pattern;

a (2-2)-th emission control transistor comprising the second semiconductor pattern and the second emission control gate electrode overlapping a (2-2)-th emission control channel area of the second semiconductor pattern, a first driving transistor connected between a first terminal of the (1-1)-th emission control transistor and a second terminal of the (1-2)-th emission control transistor;

a second driving transistor connected between a first terminal of the (2-1)-th emission control transistor and a second terminal of the (2-2)-th emission control transistor;

a first emission control signal line configured to transmit a first emission control signal and connected to the first emission control gate electrode of the (1-1)-th emission control transistor and the (1-2)-th emission control transistor;

a second emission control signal line configured to transmit a second emission control signal and connected to the second emission control gate electrode of the (2-1)-th emission control transistor and the (2-2)-th emission control transistor;

a first light emitting element connected to the (1-1)-th emission control transistor and configured to emit light of a first color; and a second light emitting element connected to the (2-1)-th emission control transistor and configured to emit light of a second color, wherein the method comprises outputting the second emission control signal of a turn-on level to the second emission control signal line in a first period, and outputting the first emission control signal of a turn-on level to the first emission control signal line in a second period, wherein the second period is in the first period, and the second period is shorter than the first period.

20. An electronic device comprising a display panel, the display panel comprising a plurality of pixels, a pixel from among the plurality of pixels comprising:

a (1-1)-th emission control transistor comprising a first semiconductor pattern and a first emission control gate electrode overlapping a (1-1)-th emission control channel area of the first semiconductor pattern;

a (2-1)-th emission control transistor comprising a second semiconductor pattern and a second emission control gate electrode overlapping a (2-1)-th emission control channel area of the second semiconductor pattern;

a (1-2)-th emission control transistor comprising the first semiconductor pattern and the first emission control gate electrode overlapping a (1-2)-th emission control channel area of the first semiconductor pattern;

a (2-2)-th emission control transistor comprising the second semiconductor pattern and the second emission control gate electrode overlapping a (2-2)-th emission control channel area of the second semiconductor pattern, a first driving transistor connected between a first terminal of the (1-1)-th emission control transistor and a second terminal of the (1-2)-th emission control transistor;

a second driving transistor connected between a first terminal of the (2-1)-th emission control transistor and a second terminal of the (2-2)-th emission control transistor;

a first emission control signal line configured to transmit a first emission control signal and connected to the first emission control gate electrode of the (1-1)-th emission control transistor and the (1-2)-th emission control transistor;

a second emission control signal line configured to transmit a second emission control signal and connected to the second emission control gate electrode of the (2-1)-th emission control transistor and the (2-2)-th emission control transistor;

a first light emitting element connected to the (1-1)-th emission control transistor and configured to emit light of a first color; and a second light emitting element connected to the (2-1)-th emission control transistor and configured to emit light of a second color, wherein each of the first and second emission control signal lines overlaps the first and second semiconductor patterns.

21. The electronic device of claim 20, wherein the electronic device comprises a smart watch, a mobile phone, a smart phone, a portable computer, a tablet personal computer (PC), a watch phone, an automotive display, smart glasses, a portable multimedia player (PMP), a navigation device, an ultra mobile personal computer (UMPC), a head mounted display (HMD) device, a virtual reality (VR) device, a mixed reality (MR) device, or an augmented reality (AR) device.

* * * * *